(12) United States Patent
Agarwal et al.

(10) Patent No.: US 11,321,217 B1
(45) Date of Patent: May 3, 2022

(54) GENERATING METRICS VALUES AT COMPONENT LEVELS OF A MONOLITHIC APPLICATION AND OF A MICROSERVICE OF A MICROSERVICES-BASED ARCHITECTURE

(71) Applicant: SPLUNK INC., San Francisco, CA (US)

(72) Inventors: Mayank Agarwal, Mountain View, CA (US); Steven Karis, Redwood City, CA (US); Justin Smith, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

(21) Appl. No.: 17/064,491

(22) Filed: Oct. 6, 2020

(51) Int. Cl.
*G06F 11/36* (2006.01)

(52) U.S. Cl.
CPC ...... *G06F 11/3616* (2013.01); *G06F 11/3612* (2013.01); *G06F 11/3636* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 9,942,409 B1 | 4/2018 | Blomgren et al. | |
| 10,127,258 B2 | 11/2018 | Lamas et al. | |
| 10,680,918 B1 * | 6/2020 | Mazzitelli | G06F 9/451 |
| 10,788,954 B1 | 9/2020 | Martin et al. | |
| 10,970,067 B1 * | 4/2021 | Gupta | G06F 8/76 |
| 10,986,012 B1 * | 4/2021 | Cote | G06F 11/327 |
| 2015/0082221 A1 | 3/2015 | Noel et al. | |
| 2018/0203795 A1 * | 7/2018 | Gadiya | G06F 11/3495 |
| 2018/0309637 A1 * | 10/2018 | Gill | H04L 41/12 |
| 2019/0098106 A1 | 3/2019 | Mungel et al. | |
| 2019/0303266 A1 | 10/2019 | Bonnell | |
| 2020/0259715 A1 * | 8/2020 | Schermann | H04L 41/22 |
| 2020/0328952 A1 * | 10/2020 | Makwarth | H04L 41/22 |

(Continued)

OTHER PUBLICATIONS

M. Cinque, R. Della Corte and A. Pecchia, "Microservices Monitoring with Event Logs and Black Box Execution Tracing," in IEEE Transactions on Services Computing, doi: 10.1109/TSC.2019.2940009. (Year: 2019).*

(Continued)

*Primary Examiner* — Andrew M. Lyons

(57) ABSTRACT

Monitoring and troubleshooting tools provide the capability to visualize different levels of a client's application that is deployed as a suite of independent but cooperating services (e.g., an application that includes a monolithic application and a microservices-based application), collect values of monitored or tracked metrics at those different levels, and visualize values of the metrics at those levels. For example, metrics values can be generated for components of the monolithic application and/or for components of a microservice of the microservice-based application.

20 Claims, 30 Drawing Sheets

(56) References Cited

U.S. PATENT DOCUMENTS

| | | | |
|---|---|---|---|
| 2020/0341876 A1* | 10/2020 | Gandhi | H04L 67/1095 |
| 2020/0366573 A1* | 11/2020 | White | H04L 43/50 |
| 2021/0026646 A1* | 1/2021 | Jha | G06F 9/541 |
| 2021/0026751 A1* | 1/2021 | Larkin | G06F 11/3072 |
| 2021/0173759 A1* | 6/2021 | Rupp | G06F 9/547 |
| 2021/0216295 A1 | 7/2021 | Vincent et al. | |

OTHER PUBLICATIONS

R. Picoreti, A. Pereira do Carmo, F. Mendonça de Queiroz, A. Salles Garcia, R. Frizera Vassallo and D. Simeonidou, "Multilevel Observability in Cloud Orchestration," 2018 IEEE (DASC/PiCom/DataCom/CyberSciTech), 2018, pp. 776-784, doi: 10.1109/DASC/PiCom/DataCom/CyberSciTec.2018.00134. (Year: 2018).*

F. Pina, J. Correia, R. Filipe, F. Araujo and J. Cardroom, "Nonintrusive Monitoring of Microservice-Based Systems," 2018 IEEE 17th International Symposium on Network Computing and Applications (NCA), 2018, pp. 1-8, doi: 10.1109/NCA.2018.8548311. (Year: 2018).*

Splunk Enterprise 8.0.0 Overview, available online, retrieved May 20, 2020 from docs.splunk.com.

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Ma et al., "Self-Adaptive Root Cause Diagnosis for Large-Scale Microservice Architecture," IEEE, 2020, 11 pg. (Year 2020).

Pompeo et al., "A Microservice Reference Case Study for Design-Runtime Interaction in MD E," CELI R-WS, 2019, 10pg. (Year: 2019).

Wang et al., "Workflow-Aware Automatic Fault Diagnosis for Microservice-Based Applications With Statistics," IEEE, 2020, 14pg. (Year: 2020).

* cited by examiner

| from service name | to service name | from span.kind | to span.kind | from region | to region | Request count |
|---|---|---|---|---|---|---|
| Service A | Service B | client | server | us-west | us-east | 2 |
| Service A | Service B | client | server | us-west | us-west | 1 |

1590 points to the first data row; 1592 points to the second data row.

FIG. 15

Edge_Health:

| from service name | to service name | from pod | to pod | from operation | to operation | request | error | Latency Bucket N | ts |
|---|---|---|---|---|---|---|---|---|---|
| frontend | product-catalog service | frontend-daliuytgq-dd58f | productcatalog service-18iodsfh27-r234t | /product | /GetProduct | 1 | 0 | 1 | 1576695520 |

Node_Health:

| svc_name | env | pod | code | operation | request | error | Root cause | Latency Bucket N | ts |
|---|---|---|---|---|---|---|---|---|---|
| frontend | prod | frontend-dalluytgq-dd58f | 200 | /product | 1 | 0 | 0 | 1 | 1576695520 |
| product catalog service | prod | productcatalongservice-18iodsfh27-r234t | 200 | /GetProduct | 1 | 1 | 0 | 1 | 1576695520 |

FIG. 16B

Node_Health Exemplars:

| svc_name | env | pod | code | operation | trace_ids | Exemplar type |
|---|---|---|---|---|---|---|
| frontend | prod | frontend-d aliuytgq-d d58f | 200 | /product | "ff0558ae875 a250e" | request |
| product catalog service | prod | productcat alongservi ce-18iodsf h27-r234t | 200 | /GetProduct | "ff0558ae875 a250e" | request |

Edge_Health Exemplars:

| from service name | to service name | from pod | to pod | from operation | to operation | trace_ids | Exemplar type |
|---|---|---|---|---|---|---|---|
| frontend | product catalog service | front end-d aliuy tgq -dd58f | product catalog service-18iodsfh 27-r234t | /Product | /GetProduct | "ff0558ae875 a250e" | request |

FIG. 16C

GENERATING METRICS VALUES AT COMPONENT LEVELS OF A MONOLITHIC APPLICATION AND OF A MICROSERVICE OF A MICROSERVICES-BASED ARCHITECTURE

RELATED APPLICATION

This application is related to the copending patent application entitled "Generating Metrics Values for Teams of Microservices of a Microservices-Based Architecture," by M. Agarwal et al., Ser. No. 17/064,442, filed Oct. 6, 2020, hereby incorporated by reference in its entirety.

BACKGROUND

Computer systems may run applications or services that are provided via a server or cloud computing environment. A client computer system may send a request to a server that retrieves application installation files in an underlying database. The applications or services may be developed and deployed as a single unit or as multiple units, such as a collection of microservices. Applications that are developed as a single unit may be monolithic applications that include a user interface and data access codes combined into a single program from a single platform. Conventionally, monolithic applications are self-contained and independent from other computing applications. With the advent of cloud computing, however, these large centralized monolithic systems are being decoupled and distributed to address scalability needs and to allow companies to deliver value faster.

Microservices or a "microservices architecture" are used in a software development method wherein software applications are developed as a suite of independently deployable smaller cooperating services. The cooperating services run processes and communicate to serve a business goal to form an enterprise application. More specifically, in a microservices architecture, an application is developed as a collection of small services; each service implements business capabilities, runs in its own process and communicates via Application Program Interfaces (APIs) (e.g., hypertext transfer protocol (HTTP) APIs) or messaging. Each microservice may be deployed, upgraded, scaled and restarted independent of other services in the application, typically as part of an automated system, enabling frequent updates to live applications without impacting end customers.

With the rise of cloud native applications, which include microservices, there has been a shift in the manner in which software is built and deployed, and also in the manner in which it is monitored and observed. Microservices-based applications have to operate within environments of dramatically increased complexity and many more layers of abstraction compared to previous generations of monolithic applications. Compared to monolithic applications, microservices architectures generally introduce complexity in network communication, feature short lifecycles and require resiliency in dynamic environments.

Diligent application performance monitoring (APM) is needed on the part of developers of microservices-based applications to ensure that their software delivers a steady baseline of performance. APM typically involves carefully managing the performance, availability and user experience of software applications. Using APM-based tools, software developers for microservices-based applications monitor different aspects of the software they develop by instrumenting the software. These aspects include performance of the software, disk utilization by the software, central processing unit (CPU) utilization by the software, errors encountered during execution of the software, significant events encountered during execution of the software, information describing which parts of code are being executed, and which parts are not being executed, among others. After development, similar aspects of the software are also monitored during production, such as when software is being executed in a cloud architecture.

Computing operations of the instrumented software may be described by spans and traces. The spans and traces are produced by various instrumented microservices in an architecture and are communicated to an analysis system that analyzes the traces and spans to enable a software developer to monitor and troubleshoot the services within their software.

As companies begin to increasingly rely on microservices architectures, they run into operational complexity and struggle to efficiently monitor their environments. Conventional microservices-based environments are complicated because they include many micro-transactions that are handled by a variety of hosts, containers and infrastructure platforms. One of the challenges associated with microservices architectures, for example, is computing metrics from significant amounts of span and trace data generated by various services in an application owner's architecture, and using the generated metrics to detect problematic conditions associated with network performance, an erroneous process, a failing service, etc. Another related challenge is providing relevant information associated with the problem in the event that a software developer decides to perform a more in-depth investigation.

Traditional monitoring and troubleshooting tools, designed as symptom-based solutions with single purpose capabilities, are simply unable to keep up with tracking the performance of dynamic cloud native applications and analyzing the significant amounts of span and trace data they generate. Conventional monitoring tools also are unable to ingest and analyze all the incoming spans to provide the user meaningful information regarding the performance of the incoming spans. Thus, systems that can efficiently and accurately monitor microservices architectures and microservices-based applications are the subject of considerable innovation.

A shortcoming of current monitoring and troubleshooting tools is a lack of capability to visualize different levels of a client's application. Another one of their shortcomings is a lack of capabilities to collect values of monitored or tracked metrics at those different levels and visualize values of the metrics at those levels.

BRIEF DESCRIPTION OF THE DRAWINGS

FIG. 15 is a table illustrating an example in which selected tags for each service in a cross-service span pair may be mapped to tag attributes and stored as part of a memory-resident data object associated with an edge in the service graph, in implementations according to the present disclosure.

FIG. 16B illustrates an example in which data in the metric events modality is persisted using an edge data object comprising a memory-resident table of tag attributes with associated counts and using a node data object comprising a memory-resident table of tags with associated counts, in implementations according to the present disclosure.

FIG. 16C illustrates an example in which data in the metric events modality is persisted using an edge data object comprising a memory-resident table of extracted indexed tag attributes with associated trace identifiers (Trace IDs) and using a node data object comprising a memory-resident table of extracted tags with associated Trace IDs, in implementations according to the present disclosure.

DETAILED DESCRIPTION

Figure 1A:
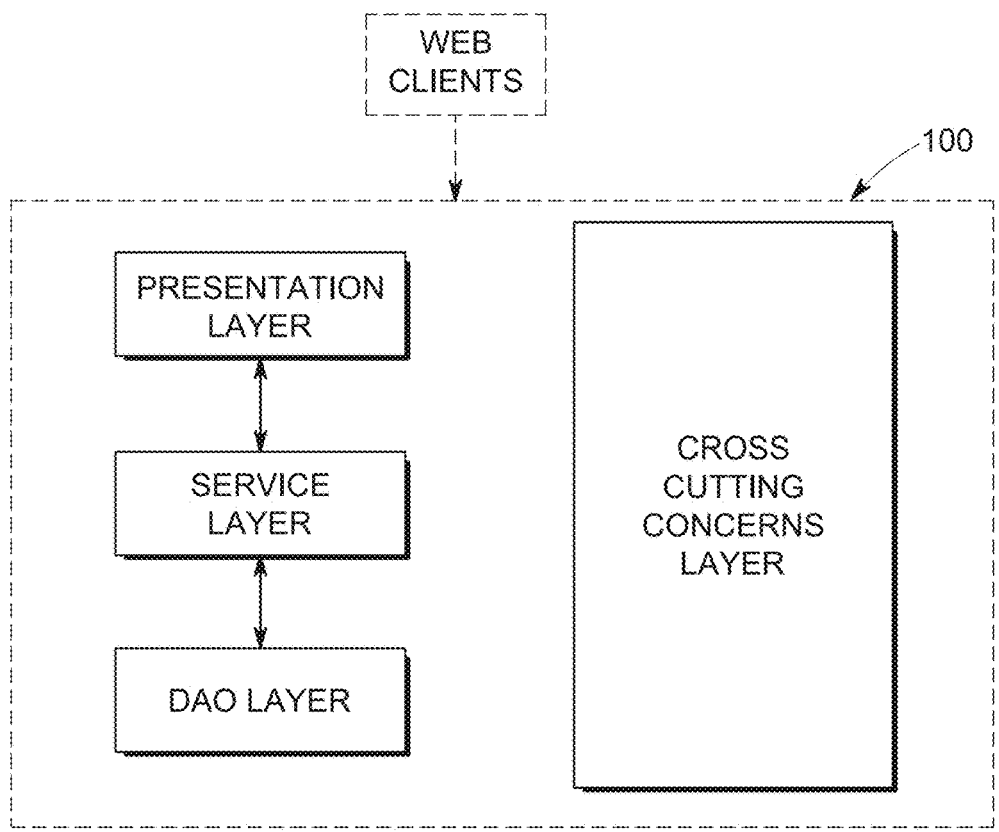
FIG. 1A illustrates an example of a monolithic multi-layer architecture, in implementations according to the present disclosure.

The following is an outline of the disclosure that follows:
1.0 Terms
2.0 General Overview
3.0 Data Collection
3.1 Logs, Traces and Metrics
4.0 Multiple Modalities for Storing and Analyzing Data
4.1 Metric Time Series
   4.1.1 Generating Metric Data Streams Using Span Identities
   4.1.2 Real-Time Monitoring Using Metric Time Series Data
4.2 Metric Events
   4.2.1 Metric Events Data Generation and Persistence
4.3 High-Fidelity Data
5.0 Flexible Hierarchies for Collecting, Aggregating, and Presenting Metric Data
   5.1 Collecting, Aggregating, and Presenting Metric Data at a Team Level 5.2 Collecting, Aggregating, and Presenting Metric Data at a Component Level 1.0 Terms The term "trace" as used herein generally refers to a record of a manner in which a single user request, also referred to as a transaction, propagates from one microservice (hereinafter interchangeably referred to as "service") to the next in a distributed application. A transaction is generally described as an end-to-end request-response flow, from the making of the user's initial request to receiving the final response. A transaction often involves the interaction of multiple services. A trace is a record of a transaction and each trace may be identified using a unique trace identifier (Trace ID). The trace follows the course of a request or transaction from its source to its ultimate destination in a distributed system. A trace may be conceptualized as a highly dimensional structured log that captures the full graph of user-generated and background request execution within an application, and includes valuable information about interactions as well as causality.

The term "span" as used herein generally refers to the primary building block of a trace, representing an individual unit of work done in a distributed system. A trace is composed of one or more spans, where a span represents a call within the request. A call may be to a separate microservice or a function within a microservice. The trace represents the work done by each microservice, which is captured as a collection of linked spans sharing the same unique Trace ID. Each component of the distributed system may contribute a span: a named, timed operation representing a piece of the workflow. A span may also include a unique span ID, a service name (e.g., "analytics"), an operation name (e.g., "start"), duration (latency), start and end timestamps and additional annotations and attributes (e.g., tags such as key:value pairs). The annotations and attributes can describe and contextualize the work being done under a span. For example, each span may be annotated with one or more tags that provide context about the execution, such as the user instrumenting the software, a document involved in the request, an infrastructure element used in servicing a request, etc.

The term "tags" as used herein generally refers to key:value pairs that provide further context regarding the execution environment and enable user-defined annotation of spans in order to query, filter and comprehend trace data. Tag information is typically included with each span and there may be different levels of tag information included in a span. Tag information (including the "key" and corresponding "value") is typically included with each span and there may be different levels of tag information included in a span.

"Global tags" generally represent properties of a user request (e.g., tenant name, tenant level, client location, environment type, etc.) and may be extracted from any span of the trace based on configured rules. A global tag for a particular span in a trace may be attributed to the other spans in a trace, because each span within a single trace may comprise the same global attributes. For example, if one span within a trace comprises a tag relating it to a request from a "gold" level "tenant," it may be inferred that other spans in the same trace are associated with the same request and, accordingly, from the same "gold" level "tenant." Consequently, the "tenant:gold" key-value pair or tag may be attributed to the other spans in the same trace.

"Service-level tags" generally represent a non-global property of the service or the infrastructure that the associated span (which served a portion of the request) executed on, e.g., service version, host name, region, etc. Spans that executed on different services may have different values for the same tag; e.g., tag "region" may take different values in two services: a span in Service A may be attributed to "region:east" and a span in Service B attributed to "region:west." Also, multiple instances of the same service can serve different parts of the request and so the same service may be associated with different service-level tags in relation to those different parts.

"Span-level tags" comprise attributes that are specific to a particular span.

The term "root span" as used herein generally refers to the first span in a trace. A span without a parent is called a root span.

The term "child span" as used herein generally refers to a span that follows a root span, including a child of a child.

The term "parent span" as used herein generally refers to a span that executes a call (to a different service or a function within the same service) that generates another span, wherein the span executing the call is the "parent span" and the span generated in response to the call is the "child span." Each span may typically comprise information identifying its parent span, which along with the Trace ID, may be used to consolidate spans associated with the same user request into a trace.

A "leaf span" is a childless span. As noted above, each span typically comprises information identifying its parent span. If a span in a trace that is not identified or referenced by another span as a parent span, the span is considered a leaf span.

A "metric" as used herein generally refers to a single quantifiable measurement at a specific point in time. Combining the measurement with a timestamp and one or more dimensions results in a metric data point. A single metric data point may include multiple measurements and multiple dimensions. Metrics are used to track and assess the status of one or more processes. A metric typically comprises a numeric value that is stored as a time series. A time series is a series of numeric data points of some particular metric over time. Each time series comprises a metric plus one or more tags associated with the metric. A metric is any particular piece of data that a client wishes to track over time.

2.0 General Overview

One of the fundamental shifts in modern day computing has been the shift from monolithic applications to microservices-based architectures. As previously mentioned, this is the shift from an application being hosted together (e.g., on a single system) to each piece of an application being hosted separately (e.g., distributed). FIG. 1A illustrates an example monolithic multi-layer architecture in implementations according to the present disclosure. A monolithic application is traditionally built as a single unit. The monolithic application consists of a single self-contained unit in which code exists in a single codebase 100 and in which modules are interconnected. At deployment time, the entire codebase is deployed and scaling is achieved by adding additional nodes.

Figure 1B:
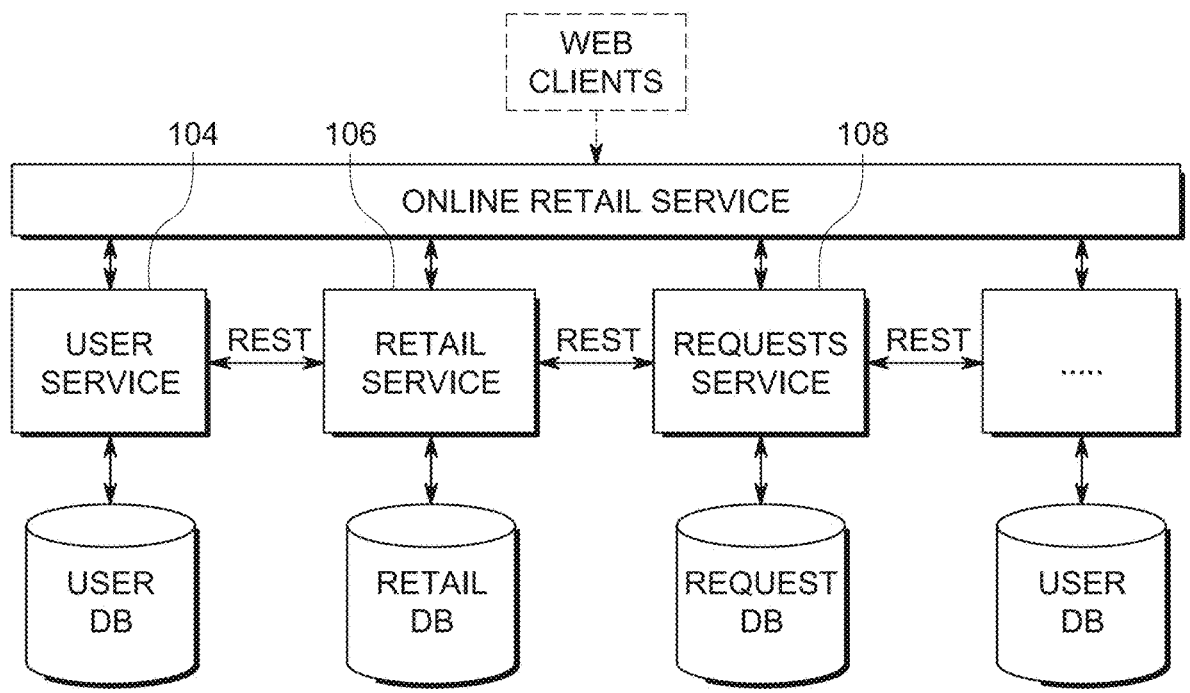
FIG. 1B illustrates an example of a microservices architecture, in implementations according to the present disclosure.

FIG. 1B illustrates an example microservices-based architecture in implementations according to the present disclosure. A microservices-based architecture involves the building of modules (e.g., modules 104, 106 and 108) that address a specific task or business objective. As a result, these modules tend to exhibit low coupling and high cohesion. A microservices-based architecture is often achieved by decoupling a monolithic application into independent modules that each include the components necessary to execute a single business function. These services typically communicate with each other using language-agnostic Application Programming Interfaces (APIs) such as Representational State Transfer (REST).

Microservices were created in order to overcome the issues and constraints of monolithic applications. Monolithic applications have a tendency to grow in size over time. As applications become larger and larger, the tight coupling between components results in slower and more challenging deployments. Because of the tight coupling, the potential for a failure of the entire application due to a recently deployed feature is high. In some cases, deployments may take several months to a year, greatly reducing the number of features that may be rolled out to users. This tight coupling also makes it difficult to reuse and replace components because of the effect they may have on other components throughout the application.

Microservices address these issues by being smaller in scope and modular in design. The modular design results in components being loosely coupled, which offers enormous benefits from the standpoint of being both fault-tolerant and independently deployable. This results in functionality that may be frequently deployed and continuously delivered. The attribute of loosely coupled modules without a central orchestrator in a microservices-based architecture, however, leads to considerable challenges in terms of monitoring, troubleshooting, and tracking errors.

These challenges have led to the rise of observability, a new generation of monitoring, the foundation for which is built, in part, on distributed tracing. Distributed tracing, also called distributed request tracing, is an application performance monitoring (APM) method used to profile and monitor applications, especially those built using a microservices architecture. Distributed tracing helps pinpoint where failures occur and what causes poor performance. Distributed tracing, as the name implies, involves tracing user requests through applications that are distributed. A trace represents a single user request, also referred to as a transaction, and represents the entire lifecycle of a request as it traverses across the various services or components of a distributed system.

APM-based methods such as distributed tracing monitor the speed at which transactions are performed both by end-users and by the systems and network infrastructure that support a software application, providing an end-to-end overview of potential bottlenecks and service interruptions. This typically involves the use of a suite of software tools, or a single integrated Software-as-a-Service (SaaS) or on-premises tool, to view and diagnose an application's speed, reliability, and other performance metrics in order to maintain an optimal level of service.

Figure 2A:
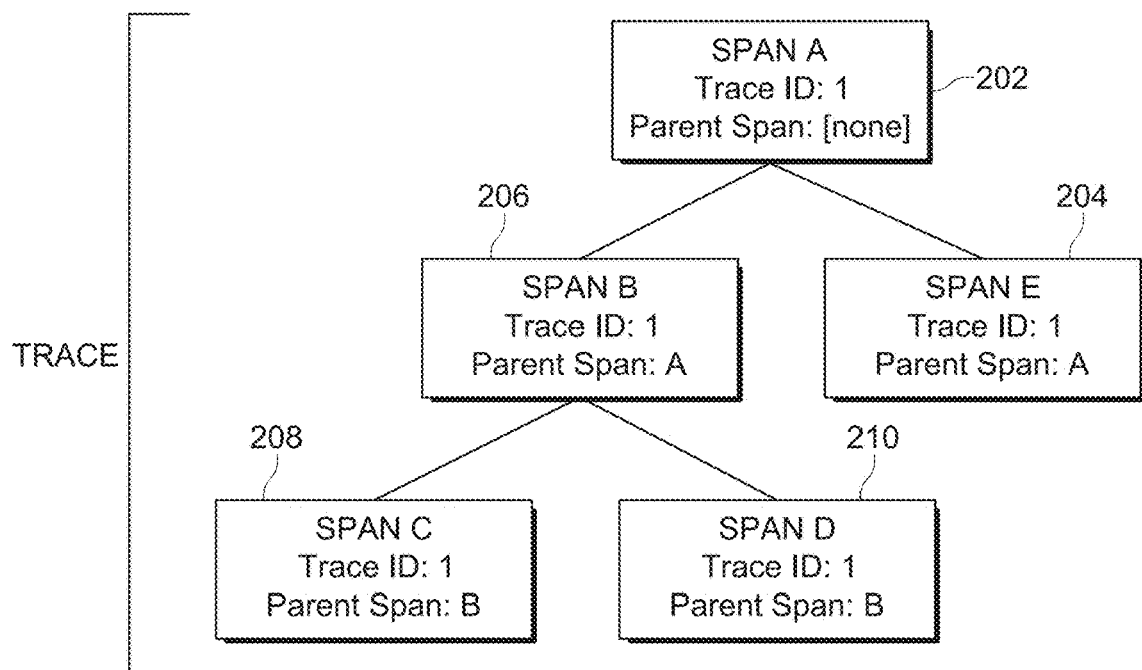
FIG. 2A illustrates an example of a trace tree, in implementations according to the present disclosure.

FIG. 2A illustrates an example trace tree in implementations according to the present disclosure. The first span in the trace tree, Span A 202, is known as the root span. A trace tree typically comprises a root span, which is a span that does not have a parent. It may be followed by one or more child spans. Child spans may also be nested as deep as the call stack goes. Span B 206 and Span E 204 are child spans of the parent span, Span A. Further, Span C 208 and Span D 210 are child spans of the parent Span B 208.

Figure 2B:
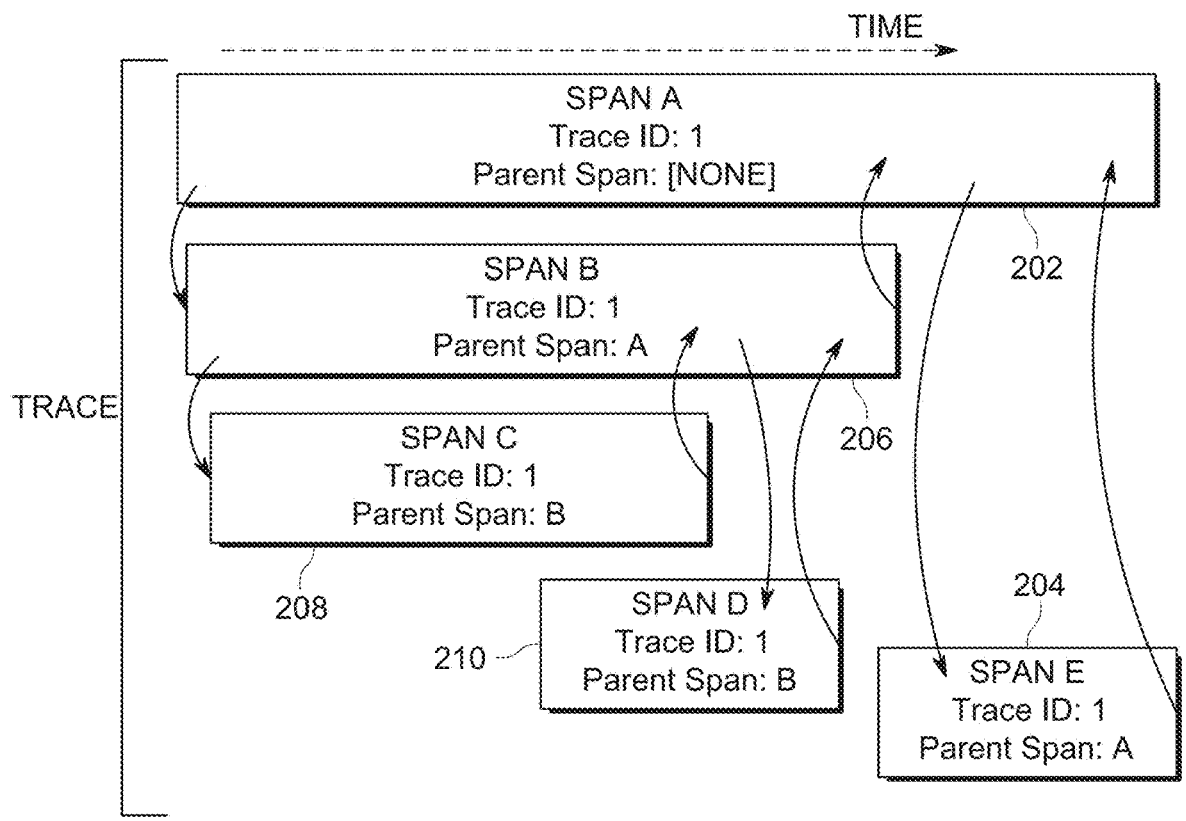
FIG. 2B illustrates an alternate view of the trace from FIG. 2A adjusted for timeline, in implementations according to the present disclosure.

FIG. 2B illustrates an alternative view of the trace from FIG. 2A adjusted for timeline in implementations according to the present disclosure. The trace starts with the Span A 202, the root span, where the request starts. When the trace starts, a Trace ID is generated (e.g., Trace ID: 1 as shown in FIG. 2B), which follows the request as it propagates through the distributed system. A new span is generated for each logical chunk of work in the request, where the new span includes the same Trace ID, a new Span ID, and a Parent Span ID, which points to the span ID of the new span's logical parent. The Parent Span ID creates a parent-child relationship between spans.

A given request typically comprises one span (e.g., the root Span A 202) for the overall request and a child span for each outbound call made to another service, database, or a function within the same microservice etc. as part of that request. For example, in the example of FIG. 2B, the Span A 202 is the root span for the overall request and generates several child spans to service the request. The Span A 202 makes a call to the Span B 206, which in turn makes a call to the Span C 208, which is a child span of the Span B 206. The Span B 206 also makes a call to the Span D 210, which is also a child span of the Span B 206. The Span A 202 subsequently calls the Span E 204, which is a child span of the Span A 202. Note that the spans in a given trace comprise the same Trace ID. The Trace ID along with the Parent Span ID may be used to consolidate the spans together into a trace.

3.0 Data Collection

Distributed tracing data is generated through the instrumentation of microservices-based applications, libraries and frameworks. Software may be instrumented to emit spans and traces. The spans and traces may be generated according to an industry standard, such as the OpenTracing standard. Other common open source instrumentation specifications include OPENTELEMETRY and OpenCensus. Each span may be annotated with one or more tags that provide context about the execution, such as the user instrumenting the software, a document involved in the request, an infrastructure element used in servicing a request, etc.

The instrumentation handles the creating of unique trace and span IDs, tracking duration, adding metadata and handling context data. Handling context data, also known as context propagation, is critical and is responsible for passing context such as the trace ID between function/microservice calls, thereby enabling an observer to view the entire transaction at each step along the way. Context propagation may, for example, be based on REST. REST is header-based and requires a transaction to pass headers between service-to-service calls. In order to work properly, services within a request use the same context propagation format. Once the code has been instrumented and context propagation has been implemented using a standard format, the trace data generated by the services may be collected and analyzed to monitor and troubleshoot the microservices-based applications generating the trace data.

Figure 3:
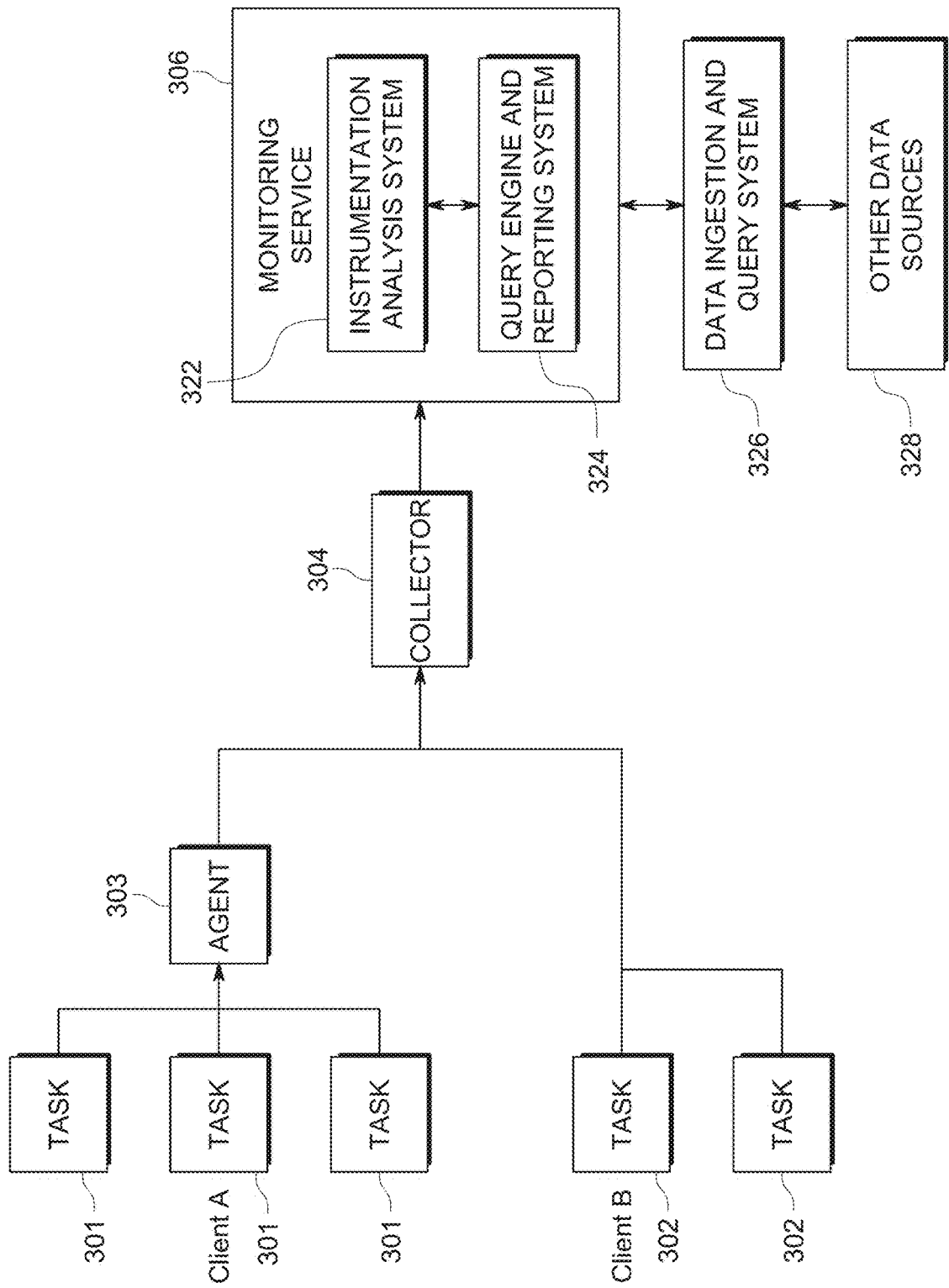
FIG. 3 is a flow diagram that illustrates an example of a manner in which trace data may be collected and ingested for further analysis within a computer system, in implementations according to the present disclosure.

FIG. 3 is a flow diagram that illustrates an example of a manner in which trace data may be collected and ingested for further analysis within a computer system in implementations according to the present disclosure. Tasks 301 represent client applications that execute within a client data center for Client A. Similarly, tasks 302 represents client applications that execute within a client data center for Client B. The tasks 301 or 302 may comprise services or applications within a client's on-premises ("on-prem") software. Alternatively, they may comprise services or applications running in the cloud computing environment, e.g., in an AMAZON WEB SERVICES (AWS) Virtual Private Cloud (VPC).

The tasks 301 and 302 may be instrumented using open source or common commercial tracing libraries, from tracing applications (e.g., Jaeger or Zipkin), in-house formats, or auto-instrumentation. Each task may be configured to generate spans that describe the processing of a portion of a request as the request traverses through the various tasks (or services) on the client-side.

While the tasks 301 and 302 may comprise instrumented application software, the techniques disclosed herein are not limited to application software but are applicable to other kinds of software, for example, server software, software executing on customer devices, websites and so on. Furthermore, a client device (e.g., a device at a data center for Client A or Client B) may include any computing system that is configured to execute instrumented software, whether or not it is used for development of improved software. For example, the client device may be a computing system used for testing purposes, staging purposes, or any production system executing in an enterprise.

An agent 303 is typically configured at the client-side host or service for receiving spans collected from the various tasks on the client-side and transmitting the spans to a collector 304. An agent may receive generated spans locally using, for example, User Datagram Protocol (UDP). The tasks 302 may comprise instrumented tasks that are not using an agent and may be configured to span directly to the collector 304. While spans may be collected from the client-side tasks without configuring an agent (e.g., in the case of Client B), using an agent may provide benefits including batching, buffering and updating trace libraries.

Batches of span data collected by the agent 303 are periodically received at the collector 304. The collector may be implemented within a client's on-prem software or in the cloud computing environment (e.g., in an AWS VPC). Traces often generate duplicative data that is not relevant for monitoring or troubleshooting. The collector 304 may avoid redundancies by sampling the data before processing and storing it. The collector 304 runs the span data through a processing pipeline and may store it in a specified storage or analytics backend such as a monitoring service 306. The collector 304 may interact with the monitoring service 306 through a network (not shown).

In the example of FIG. 3, the collector 304 can consolidate data from several client devices and combine the data to send to the monitoring service 306. For example, the collector 304 may comprise a server that receives data streams internally from different client devices and, periodically, sends the combined data in batch form to the monitoring service 306. This allows efficient external communication from the enterprise.

In the example of FIG. 3, the monitoring service 306 receives and analyzes the span data for monitoring and troubleshooting purposes. In addition to the monitoring service 306, tracing data might also be simultaneously transmitted to other types of storage and monitoring back-end services, e.g., a data ingestion and query system 326.

The monitoring service 306 may be, but is not limited to, an SaaS-based service offering. It may also be implemented as an on-prem application. The monitoring service 306 receives the observability data collected by the collector 304 and provides critical insights into the collected trace data to a client, which may be an application owner or developer. The monitoring service 306 may be hosted on a computing system that includes one or more processors, memory, secondary storage and input/output controller. The computing system used for hosting the monitoring service 306 is typically a server class system that uses powerful processors, large memory resources, and fast input/output systems.

The monitoring service 306 may comprise an instrumentation analysis system 322 (also referred to herein as an "analytics engine") and a query engine and reporting system 324. The instrumentation analysis system 322 receives data comprising, for example, trace information, span information and/or values of metrics sent by different clients. As noted previously herein, a task or software program may be instrumented to generate spans with a common field in their data structures to designate spans that are part of a common trace. For example, the spans may include a trace identifier such that spans with the same trace identifier are a part of the same trace.

The tasks (or software) executing on the client device are configured to send information generated as a result of instrumenting the software to the instrumentation analysis system 322 of the monitoring service 306. For example, the tasks may send span information collected from the various services at the client end to the instrumentation analysis system 322. Alternatively, traces may be sampled to generate metric values, and the tasks may send values corresponding to various metrics as they are generated to the instrumentation analysis system 322. The tasks may send group values of metrics periodically to the instrumentation analysis system 322. Different tasks may send the same metric or different metrics at different rates. The same task may send different metrics at different rates.

In the example of FIG. 3, the tasks (e.g., tasks 301 and 302) and the collector 304 may send data to the monitoring service 306 by invoking an API supported by the monitoring service 306 and the instrumentation analysis system 322. In an implementation, a customer name may be specified for the instrumented software. The instrumented software includes the customer name when it identifies a data stream associated with that particular customer. The ability to associate a data stream with a customer allows the instrumentation analysis system 322 to perform a customer-specific analysis: for example, report on usages of systems for each customer, identify customers reporting more than a threshold number of errors, and so on.

In an implementation, an application owner or developer may submit queries to the query engine and reporting system 324 to gain further insight into the spans and traces (or metrics) received and analyzed by the instrumentation analysis system 322. For example, the query engine and reporting system 324 within the monitoring service 306 may be configured to generate reports and render graphical user interfaces (GUIs) and/or other graphical visualizations to represent the trace and span information received from the various clients. The query engine and reporting system 324 may, for example, interact with the instrumentation analysis system 322 to generate a visualization, e.g., a histogram or an application topology graph (referred to interchangeably as a "service graph" herein) to represent information regarding the traces and spans received from a client. Alternatively, the query engine and reporting system 324 may be configured to respond to specific statistical queries submitted by a developer regarding one or more services within a client's application.

3.1 Logs, Traces and Metrics

As mentioned above, the shift from monolithic applications to microservices-based architectures has increased the usefulness of analyzing traces in a distributed system. The tracing data may be coupled with log data and/or metrics data, in order to provide users with a more complete picture of the system. For example, the trace data may be coupled with log or other data from the data ingestion and query system 326. In one implementation, the data ingestion and query system 326 may be comprised within the monitoring service 306.

One example of a data ingestion and query system 326 is the event-based data intake and query SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various data sources 328 such as websites, applications, servers, networks and mobile devices that power their businesses. The other data sources 328 may be associated with the same clients (e.g., Client A and Client B) that generate the trace data received by the monitoring service 306.

The SPLUNK® ENTERPRISE system is particularly useful for analyzing data that is commonly found in system log files, network data, and other data input sources. In an implementation, the data ingestion and query system 326 may be an on-premises application or based on a distributed or cloud-based service.

In the example of FIG. 3, the trace data may be ingested into the data ingestion and query system 326, or may be coupled with outputs from the data ingestion and query system 326 (e.g., from searches that may be based on trace data and run on the data ingestion and query system 326). Alternatively, the data ingestion and query system 326 described above may be integrated with or into the monitoring service 306 that analyzes trace data. The monitoring service 306 may, accordingly, comprise a full suite of services including, for example, analyzing trace data, generating metrics data from the trace data, ingesting and analyzing log data, ingesting metrics data and providing insights generated from the metrics data, including aggregating and/or correlating trace data, log data and metrics data, in order to gain insights into a computing platform.

As described above, the trace data received from the collector 304 may be sent to systems configured to ingest and search data, such as the data ingestion and query systems 326 described above. In some implementations, the data ingestion and query system 326 may be configured to generate metrics data from the trace data received from the collector 304. Additionally, other implementations may use a stream processor that may perform transformations and other operations on incoming data prior to, concurrently with, and/or as an alternative to, ingestion of the data. In some implementations, the system may also be configured to ingest metrics data and may be optimized to ingest, query and generate insights from metrics data.

In other implementations, metrics may be generated by instrumentation (e.g., from instrumenting client software and tasks, e.g., tasks 301, 302, etc., as described above) and sent to an SaaS-based processing system (e.g., the monitoring service 306). For example, software may be instrumented to send metrics to a gateway or to a instrumentation analysis engine, where metrics may be aggregated, queried and alerted.

As above, the trace data may be paired with data from the data ingestion and query system 326, metrics generated by instrumentation, and other data sources, and correlated in various ways to provide insights. For example, as a broad-based correlation example, the metrics data may be used in a thresholding comparison to determine that there is an issue that needs attention, the trace data may be used to determine which component or microservice requires attention, and log data from the data ingestion and query system 326 may be used to determine exactly why the component or microservice needs attention. Other correlations and uses for the combination of metrics data, log data and event data are also contemplated herein. As noted above, the various features and services may be provided within an integrated monitoring platform (e.g., the monitoring service 306), where the platform comprises, among other things, an instrumentation analysis system (e.g., the instrumentation analysis system 322), a query engine and reporting system (e.g., the query engine and reporting system 324) and a data ingestion and query system (e.g., the data ingestion and query system 326).

4.0 Multiple Modalities for Storing and Analyzing Data

Historically, there have been several challenges associated with implementing an analytics tool such as the monitoring service 306 within a heterogeneous distributed system. One of the challenges associated with microservices architectures, for example, is efficiently ingesting and aggregating significant amounts of span and trace data generated by various services in an architecture. Conventional tracing and monitoring systems are typically unable to ingest the vast amounts of span and tracing data generated by a client's application and have to resort to sampling the data intelligently to reduce the volume of stored trace data. Using sampling exclusively, however, results in loss of data and, as a result, conventional monitoring tools do not allow clients access to all the traces generated by their application. Furthermore, conventional monitoring tools may calculate metrics (e.g., requests, errors, latency, etc.) based on the sampled set of data and, accordingly, the calculations may be approximate at best and inaccurate at worst.

Advantageously, as disclosed herein, a monitoring platform has the ability to ingest up to 100 percent of the spans and create streams of metric data using the ingested spans prior to consolidating the spans into traces (through a sessionization process). The metric time series provide valuable real-time information pertaining to services or endpoints within an application and also allow alerts to be configured to manage anomalous behavior on the endpoints.

As disclosed herein, up to 100 percent of the spans received from the client in real time can be sessionized and stored. An ingestion streaming pipeline as disclosed herein is able to ingest and consolidate the incoming spans into traces, and is further able to use advanced compression methods to store the traces. Additionally, because incoming trace and span information may be efficiently ingested and aggregated in real time, a monitoring platform configured as disclosed herein is able to advantageously convey meaningful and accurate information regarding throughput, latency and error rate (without the need for sampling) for the services in the microservices-based application. High-cardinality metrics pertaining to throughput, latency and error rate may be calculated with a high degree of accuracy because all incoming data is accounted for and there is no data loss as a result of sampling.

Also, as disclosed herein, a client can store and analyze the trace data using multiple modalities of analysis. In an implementation, a first modality comprises converting incoming spans from one or more clients into a plurality of metric data streams (also referred to as metric time series) prior to sessionizing the spans. Each metric time series is associated with a single span identity, where a base span identity comprises a tuple of information corresponding to an associated type of span. Each metric time series in this modality (referred to herein as "metric time series modality") represents a plurality of tuples, each tuple representing a data point. Key performance metrics (KPIs) can be extracted directly from the metric time series in real-time and reported to a user. Because the metric time series are created without paying a time penalty associated with sessionization, they can be used to perform real-time monitoring with sub-second resolution and generate alerts within two to three seconds if a condition is violated.

In some implementations, a second modality of analysis sessionizes the incoming spans and supports deriving higher-cardinality metrics (as compared with metric time series data) for a selected set of indexed tags (e.g., user-selected tags, global tags of the trace, etc.) over selected time durations (referred to herein as the "metric events modality"). This modality is particularly useful for clients that need accurate Service Level Indicator (SLI) information for a larger set of high-value indexed tags. The metric events modality enables developers to aggregate metrics that have been pre-generated using the sessionized trace data to efficiently respond to queries submitted by a client. The aggregated metrics provide a user visibility into the performance of services within a microservices-based application. The metric events modality may deprioritize speed as compared to the metric time series to provide a user resolution into a larger set of indexed tags. As such, responses provided by the metric events modality are typically slightly slower (e.g., 45 seconds to one minute) as compared with the sub-second response rates of the metric time series.

In some implementations, the metric events modality may also keep track of example traces associated with a pre-configured set of indexed tags. The tags to be indexed may be pre-selected by the user or the monitoring platform. The Trace IDs may be used to retrieve the associated traces and analysis on the actual traces may be performed to generate more particularized information (e.g., span duration, span count, span workload percentage, etc.) for each span in a given trace. In an implementation, once the traces are retrieved, an analysis may be run on an arbitrary set of tags (in addition to the pre-configured indexed tags).

Additionally, in some implementations, a third modality of analysis may comprise a "full-fidelity" modality where a full-fidelity analysis may be conducted on any dimension or attribute of data to gauge the performance of services in the microservices-based application. The full-fidelity modality allows clients to search most or all of the incoming trace data that was ingested by the monitoring platform without relying on sampling. The full-fidelity mode may sacrifice speed for accuracy, and may be used by clients that need a more thorough analysis of the services across every dimension or attribute.

In an implementation, the three modalities may be supported by the monitoring platform simultaneously by storing ingested trace data using three different formats, where each format corresponds to one of the three available modalities of analysis. However, the present disclosure is not restricted to three discrete data sets. The data sets for the different modalities may overlap or may be saved as part of a single data set. When a user submits a query, the monitoring platform may determine which of the data sets is most suitable for addressing the query. Thereafter, the monitoring platform executes the query against the selected data set to deliver results to the user. By comparison, conventional monitoring systems typically focus on a single modality and do not provide clients the ability to seamlessly navigate between different modalities. Conventional monitoring systems also do not provide the ability to automatically select the most appropriate modality based on the content, structure, syntax or other specifics pertaining to an incoming query.

Figure 4:
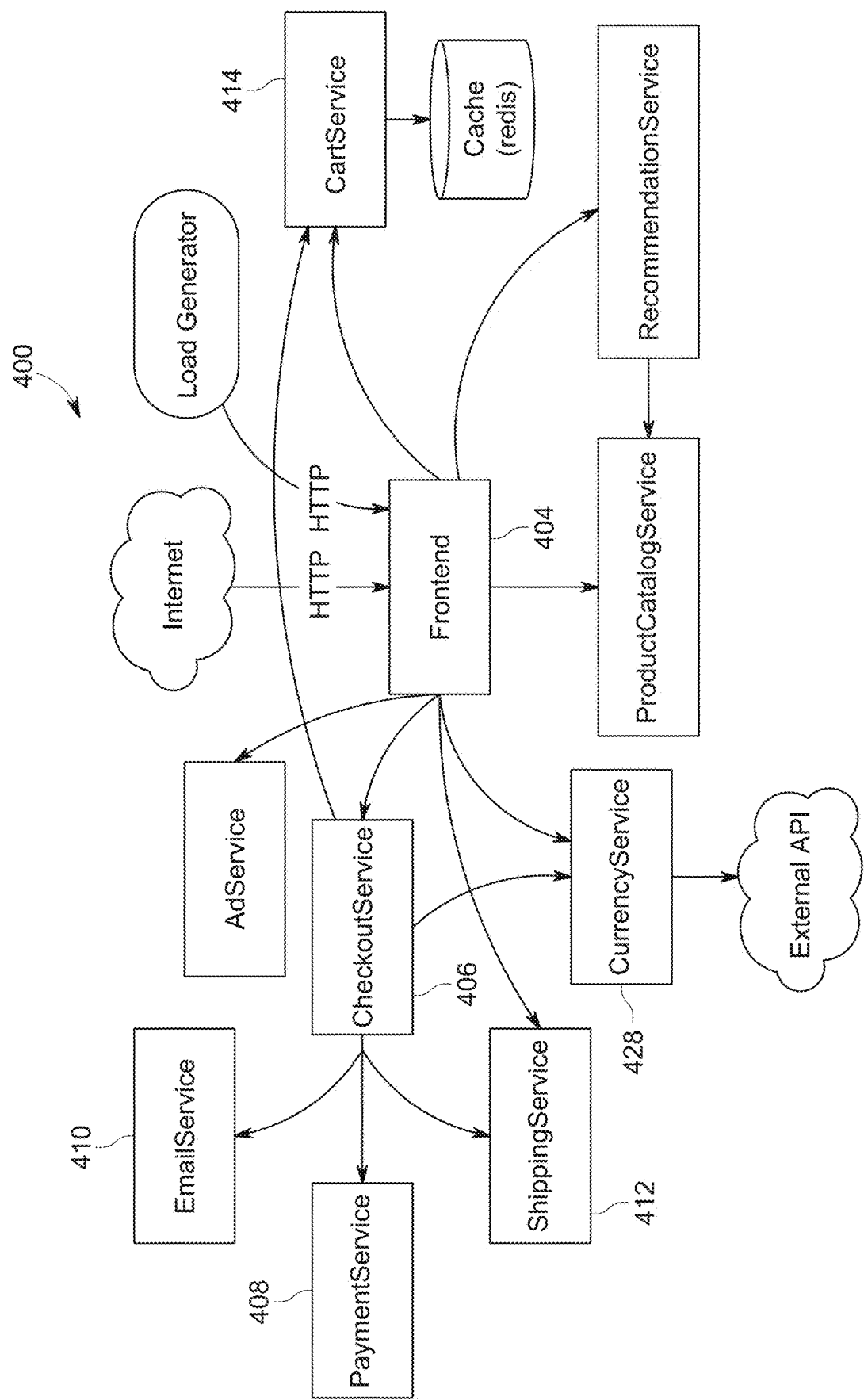
FIG. 4 illustrates components of an example of a microservice application for an online retailer, in implementations according to the present disclosure.

FIG. 4 illustrates components of an example microservice application for an online retailer in implementations according to the present disclosure. A user needing to conduct a transaction may visit the website of the online retailer, which would initiate a call to the retailer's Front-end service 404 on a server. The call to the Front-end service 404 may subsequently trigger a chain of calls on the retailer's back-end that would not be transparent to the user. For example, if the user proceeds to complete the transaction by checking out, several calls may be made to the back-end to services such as a CheckOutService 406, a PaymentService 408, an EmailService 410, a ShippingService 412, a CurrencyService 428 and a CartService 414 that may be involved in processing and completing the user's transactions. Note, a given request submitted by a user to the website would involve a subset of the services available and, in general, a single request would not result in a call to each of the services illustrated in FIG. 4.

As mentioned above, a request that the user initiates would generate an associated trace. Each user request will be assigned its own Trace ID, which will then propagate to the various spans that are generated during the servicing of that request. Each service may process a portion of the request and generate one or more spans depending on the manner in which instrumentation is configured for a respective service. The Trace ID may then be used by the server to group the spans together into a trace with that Trace ID. So, for example, the user's checkout transaction may generate a call at the Front-end service 404, which may in turn generate calls to various microservices including the CheckoutService 406. The CheckoutService 406 may, in turn, generate calls to other services such as the PaymentService 408, the EmailService 410 and the ShippingService 412. Each of these calls passes the Trace ID to the respective service being called, wherein each service in the call path could potentially generate several child spans.

A service does not necessarily need to make calls to other services—for instance, a service may also generate calls to itself (or, more specifically, to different operations and sub-functions within the same service), which would also generate spans with the same Trace ID. Through context propagation then, each of the spans generated (either by a service making a call to another service or a service making a call to various operations and sub-functions within itself) is passed the Trace ID associated with the request. Eventually, the spans generated from a single user request would be consolidated (e.g., by the collector 304 or the monitoring service 306 of FIG. 3) together using the Trace ID (and the Parent Span IDs) to form a single trace associated with the request.

As noted above, conventional distributed tracing tools are not equipped to ingest the significant amounts of span and tracing data generated by clients' applications and have to resort to sampling the data intelligently to reduce the volume of stored trace data. Further, conventional distributed tracing tools do not provide to application owners multiple modalities of storing and querying trace data with the flexibility of switching between the different modalities depending on the level of detail required to respond to a user's query.

Referencing FIG. 4 again, an owner of the application 400 may, for example, need varying degrees of detail regarding the services in the application. For example, the application owner may need to monitor certain metrics (e.g., "RED" metrics associated with Request, Errors, Durations) in real-time associated with a particular service, e.g., CheckoutService 406. Assuming there are errors generated by a call made from the Frontend service 404 to the CheckoutService 406, the owner may require further information pertaining to additional tags (indexed or non-indexed) associated with CheckoutService 406. The application owner may also need to access the full trace(s) associated with the request from the Frontend service 404 to the CheckoutService 406 to perform a more detailed analysis. Each of the requests may require a different degree of detail extracted from the span and trace information.

In an implementation, the metric time series modality allows the user to monitor RED metrics associated with a given service (e.g., CheckoutService 406) in the online retailer's application in real-time. In an implementation, the metric time series modality can also be configured to deliver real-time alerts to a user based on each of the RED metrics, e.g., anomalies related to the request rate, error rate, or latency (duration).

If the user needs SLIs pertaining to certain indexed tags related to the call between Frontend service 404 and CheckoutService 406 for a given time duration, the metric event modality may enable the user to perform aggregations of metrics data computed from the indexed tags associated with the spans generated by the call between the Frontend service 404 and the CheckoutService 406. The metrics aggregation may be a numeric summation, for example, and may be performed relatively quickly.

The metric event modality, in accordance with the present disclosure, associates the selected tags indexed from the incoming span data (e.g., the same indexed tags used for performing metrics extraction) with Trace IDs for example traces. The Trace IDs may be used to retrieve the example traces associated with indexed tags. Thereafter, the monitoring platform may analyze the example traces to generate more particularized information, e.g., span duration, span count, span workload percentage, etc., for each span in a given trace. For the example of FIG. 4, if the user requires a performance summary for the spans generated by the call made from the Frontend service 404 to the CheckoutService 406, the associated query submitted by the user may access the data set associated with the metric event modality. Using the Trace IDs corresponding to the indexed tags, the monitoring platform may then perform the computations necessary on the corresponding example traces to provide the user further information regarding the span performances. In an implementation, the user may also be able to extract meaningful information from the unindexed tags associated with the spans generated by the call using the example traces.

If the user wants to search all the incoming trace data associated with the call between Frontend service 404 to the CheckoutService 406, a third modality of analysis is provided. In the full-fidelity modality, a full-fidelity analysis may be conducted on any dimension or attribute of the trace data. For example, the user may be able to search previously indexed or unindexed tags across each of the traces associated with the call the between the Frontend service 404 and the CheckoutService 406. The full-fidelity modality allows an analysis to be performed across any relevant trace. Conventional tracing systems are unable to provide that level of flexibility and detail for developers or application owners needing to investigate performance issues with their applications. Note that this modality of analysis may be more time-consuming because trace data may be detailed and require significant storage space.

The span information from the online retailer's application can be ingested and aggregated. Furthermore, information from the incoming span data can be extracted, and the information can be stored using multiple formats to support multiple modalities of data analysis for a user. Each modality is configured to allow the users access to a different format in which incoming trace information may be represented and stored, where each format conveys a different degree of resolution regarding the ingested traces to a user and, accordingly, may occupy a different amount of storage space.

Figure 5:
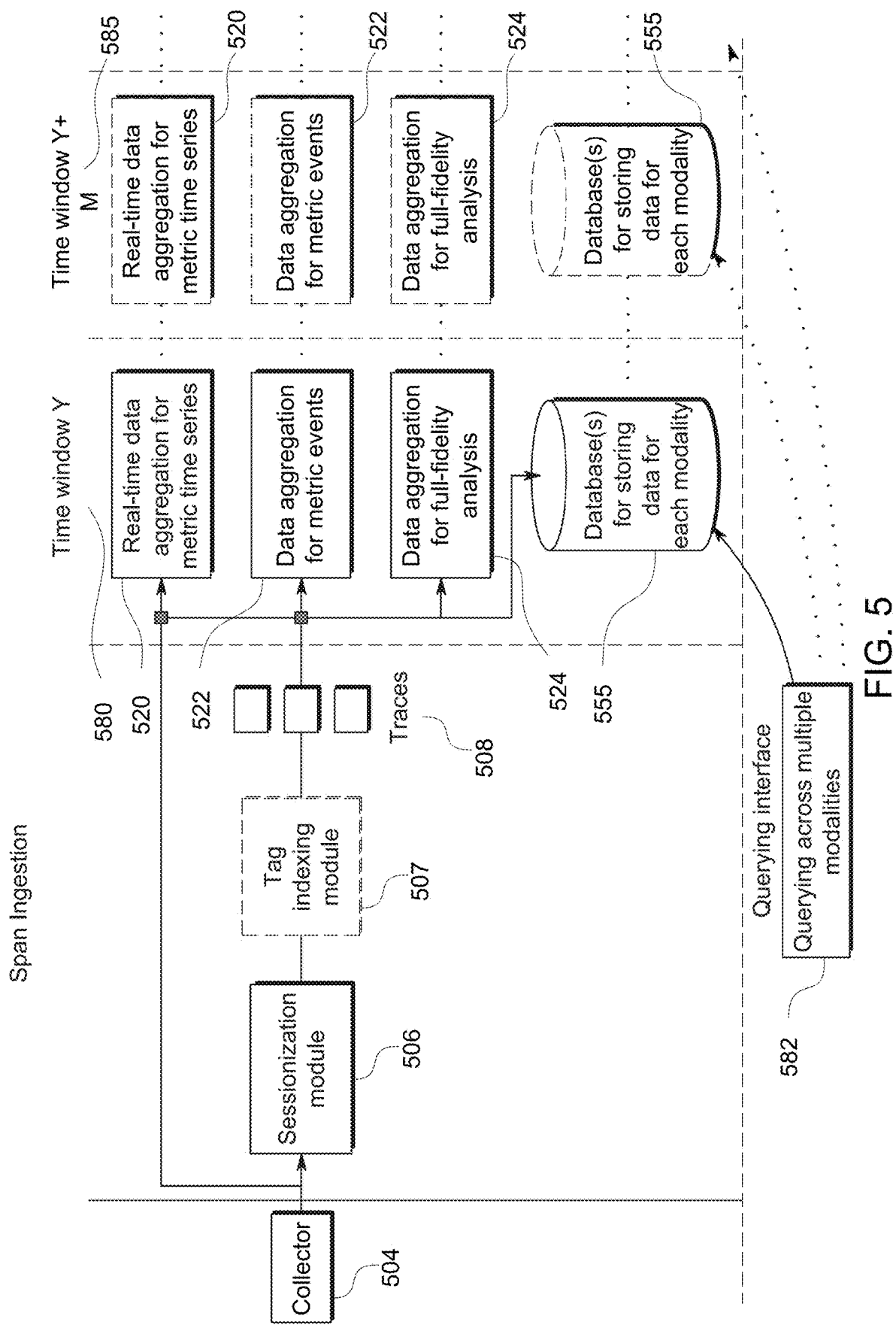
FIG. 5 is a flow diagram that illustrates an example of a method of ingesting and aggregating span information to support multiple modalities of analysis, in implementations according to the present disclosure.

FIG. 5 is a flow diagram that illustrates an example method of ingesting and aggregating span information to support multiple modalities of analysis, in implementations according to the present disclosure. As mentioned in connection with FIG. 3, span information is received at the monitoring service 306 from the collector (e.g., the collector 504 in FIG. 5).

As noted previously, in an implementation, incoming spans from one or more clients are converted into a plurality of metric data streams prior to consolidating the spans into traces through a sessionization process. The incoming spans are received and the metric data streams are generated by module 520 prior to the spans being sessionized. Because the metric time series are created without paying a time penalty associated with sessionization, they can be used to perform real-time monitoring and alerting.

The incoming spans are also sessionized where the span information is combined into traces in a process called sessionization. The sessionization module 506 is responsible for stitching together or combining the traces 508 using, among other things, the Trace IDs associated with each user request (and typically also the Parent Span IDs of each span). In an implementation, the sessionized traces may also be input to the module 520 to create metric time series to track traces (separately from the time series created to track spans).

In addition to a Trace ID, each trace also comprises a time-stamp; using the time-stamps and the Trace IDs, the sessionization module 506 creates traces 508 from the incoming spans in real time and sessionizes them into discrete time windows. For example, the sessionization process may consolidate traces (from spans) within a first time window (associated with time window Y 580) before transmitting the traces to modules 520, 522, or 524. Thereafter, the sessionization process may consolidate traces within the subsequent time window (associated with time window "Y+M" 585) before transmitting those traces to the modules 520, 522, or 524. The time windows associated with each of the modules 520, 522, and 524 may be different. In other words, the metric time series data may be collected over short time windows of, for example, ten seconds each. By comparison, traces for the metric events modality (associated with the module 522) may be collected over ten-minute time windows, for example.

In some implementations, the sessionization module is able to ingest, process and store all or most of the spans received from the collector 504 in real time. By comparison, conventional monitoring systems do not accept all of the incoming spans or traces; instead, they sample incoming spans (or traces) to calculate SLIs at the root level of a trace before discarding the spans. By comparison, an ingestion streaming pipeline as disclosed herein is able to ingest and consolidate all the incoming spans into traces in real time, and is further able to use advanced compression methods to store the traces. Furthermore, as disclosed herein, metric time series can be generated from the span data (prior to sessionizing the spans) to provide real-time monitoring and alerting of certain KPIs.

As noted above, the sessionization module 506 has the ability to collect all the traces within a first time window Y 580 using the time-stamps for the traces. Subsequently, the sessionized traces are fed to the modules 522 and 524, for the respective modes (metric events and full-fidelity) for extraction and persistence.

In the example of FIG. 5, subsequent to consolidation, the trace data is indexed by an optional tag indexing module 507, which indexes one or more tags in the trace data. The tags may be user-selected tags or tags that the monitoring platform is configured to index by default. Alternatively, tag indexing may be performed as part of data aggregation, e.g., by module 522 associated with metric events.

In the example of FIG. 5, data sets associated with each of the modalities may be persisted in one or more databases 555. As noted previously, the data sets for the respective modalities may be separate data sets, overlapping data sets or a single data set that supports all the modalities. Note that the databases 555 may be a single database that stores data sets corresponding to all three modalities. Alternatively, the databases 555 may represent different respective databases for each of the three modalities. Furthermore, the databases 555 may also represent distributed databases across which relevant information for each of the three modalities is stored.

In an implementation, data associated with each of the three modalities is generated at the time of ingestion and stored separately from each other. The structure, content, type or syntax of query submitted by a user will typically dictate which of the three modalities and corresponding data set will be selected. In an implementation, an interface through which the query is submitted may also determine which of the three modalities and corresponding data set is selected. In an implementation, there may be some commonality in the data for the three modalities in which case the storage for the data may overlap. Alternatively, there may be one or two of the three modalities (instead of all three) described above.

A client may send in a request to retrieve information pertaining to an application through query interface 582. The underlying querying engine (e.g., the query engine and reporting system 324 from FIG. 3) will analyze the structure, content, type and/or syntax of the query, and also the interface through which the query is submitted, to determine which of the three modalities and respective data set to access to service the query. In an implementation, the three data sets corresponding to the three modalities are structured in a way that allows the querying engine to navigate between them fluidly. For example, a client may submit a query through the query interface 582, which may potentially result in the query engine accessing and returning data associated with the metric events modality. Thereafter, if the client requires more in-depth information, the querying engine may seamlessly navigate to data associated with a different mode (e.g., full-fidelity) to provide the user with further details. Conventional monitoring systems, by comparison, do not provide more than a single modality or the ability to navigate between multiple modalities of data analysis.

4.1 Metric Time Series

As disclosed herein, trace data can be stored and analyzed using multiple modalities of analysis. In an implementation, incoming spans from one or more clients are converted into a plurality of metric data streams (also referred to as metric time series) and transmitted to the analytics engine (e.g., the instrumentation analysis system 322) for further analysis. Most of the metric data streams are created directly from the incoming spans prior to the sessionization process to generate metric time series related to spans. Each metric time series is associated with a single "span identity," where a base span identity comprises a tuple of information corresponding to an associated type of span. Each metric time series in the metric time series modality represents a plurality of tuples with each tuple representing a data point. KPIs can be extracted in real-time directly from the metric time series and reported to a user. Because the metric time series are created without paying a time penalty associated with sessionization, they can be used to perform real-time monitoring with sub-second resolution and generate alerts within two to three seconds if some condition is violated.

4.1.1 Generating Metric Data Streams Using Span Identities

A client application associated with, for example, an online retailer's website may potentially generate millions of spans from which a monitoring platform may need to extract meaningful and structured information. To organize the significant amounts of incoming span data, in an implementation, incoming spans may be automatically grouped by mapping each span to a base "span identity," where a base span identity comprises some key attributes that summarize a type of span. An example span identity may be represented as the following example tuple: {operation, service, kind, isError, httpMethod, isServiceMesh}, where the operation field represents the name of the specific operation within a service that made the call, the service field represents the logical name of the service on which the operation took place, the kind field details relationships between spans and may either be a "server" or "client," the isError field is a "TRUE/FALSE" flag that indicates whether a span is an error span, the httpMethod field relates to the HTTP method of the request for the associated span and the isServiceMesh field is a flag that indicates whether the span is part of a service mesh. A service mesh is a dedicated infrastructure layer that controls service-to-service communication over a network. Typically, if software has been instrumented to send data from a service mesh, the trace data transmitted therefrom may generate duplicative spans that may need to be filtered out during monitoring. Accordingly, the 'isServiceMesh' flag allows the analytics engine to filter out any duplicative spans to ensure the accuracy of the metrics computations.

In some implementations, the tuple used to represent the span identity may include other identifying dimensions as well. For example, if a user needs visibility into metadata tags from the spans in addition to the dimensions extracted for a base span identity by default (e.g., service, operation, kind, etc.), an extended identity may be created. An extended identity supports custom dimensionalization by a user, where dimensionalization refers to the ability to extract information pertaining to additional tags or metadata in a span. An extended identity provides a customer the ability to dimensionalize the span using pre-selected dimensions. Conventional methods of monitoring by comparison did not offer customers the flexibility to add custom dimensions to streams of metric data. An extended identity comprises the span's base identity and additionally a map of the span's tag key:value pairs that matched a user's configuration settings. An example extended identity may be represented as the following example tuple: {operation, service, kind, isError, httpMethod, isServiceMesh, keyValueMap, . . . }, where the keyValueMap field represents one or more additional tags or dimensions configured by the user to be extracted as part of the span's identity (e.g., customer name, member ID, etc.).

By extracting information related to additional tags, higher cardinality metrics may be computed using the metric time series modality. Furthermore, a user is able to configure alerts on the custom dimensions as well, wherein the alerts inform a user if a particular dimension has crossed some critical threshold. In alternative implementations, the tuple used to represent a span's base or extended identity may contain fewer elements.

If the tuple of information of an incoming span happens to be the same as another span, both spans relate to the same identity. In an implementation, spans with the same base identity may be grouped together. A fixed-size bin histogram is generated for each span identity to track metrics associated with the span identity. In this way, the same type of spans are organized together and the user can track one or more metrics associated with each group of spans sharing a common identity. In an implementation, a fixed-size bin histogram is generated for each unique span identity. The fixed-size bin histogram may be a data structure, for example, that is preserved in memory.

As noted above, each span identity may be tracked with a respective histogram. The histograms associated with the corresponding span identities, in an implementation, are generated and updated in fixed time duration windows. For example, histogram data may be generated for the incoming spans in memory every ten seconds. At the end of each fixed duration, metrics associated with the histograms are emitted and the histogram is reset for the next time window. By emitting metrics for each time duration, data streams of metrics may be generated from the histogram data. The streams of metric data associated with each span identity, in an implementation, may be aggregated by a monitoring platform to provide a user meaningful information regarding the application being monitored.

Figure 6:
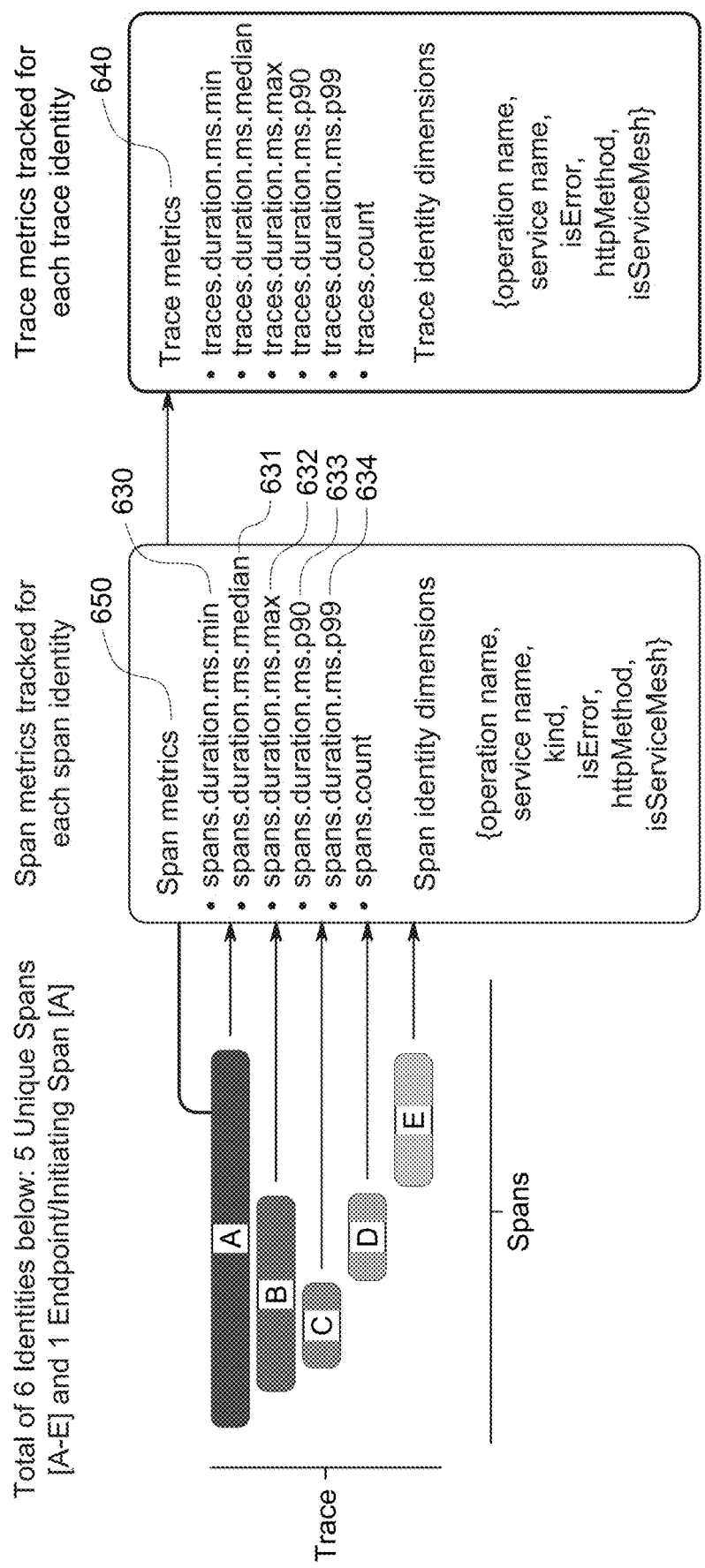
FIG. 6 illustrates an example of a manner in which span metrics and trace metrics are generated, in implementations according to the present disclosure.

FIG. 6 illustrates an example of a manner in which span metrics and trace metrics are automatically generated in implementations according to the present disclosure. The example of FIG. 6 illustrates five unique spans (A-E) including a root span (an initiating span) A. In an implementation, each group of spans identified by the same span identity is associated with one or more span metrics 650. For example, a minimum span duration 630, a median span duration 631, a maximum span duration 632, a p90 latency value 633, a p99 latency value 634, and a span count (how many times a particular identity was counted) may be tracked for each span identity. A histogram corresponding to the span identity may track these metrics over fixed-size durations (e.g., ten seconds). For example, over a ten-second window, the histogram may comprise fixed size bins that track a minimum span duration, a median span duration, a maximum span duration, a p90 value, a p99 value and a count of all spans received corresponding to a given identity. At the end of each duration, the metrics are emitted and the histogram is reset. The emitted metrics are used to generate streams of metrics data corresponding to each span identity. Each data point on a metric data stream comprises the span identity dimensions or the extended identity dimensions if the user has configured additional metadata to be extracted from the spans.

As shown in FIG. 6, in an implementation, the initiating span A comprises a trace identity that is used to emit trace metrics 640. The initiating span A helps define an identity for a trace which allows the monitoring platform to logically group together all traces that represent the same flow through an endpoint of the application. The duration of the identity for a trace is calculated as the end time of the latest span in the trace minus the start time of its initiating span. An example trace identity may be represented as the following example tuple: {operation, service, isError, httpMethod, isServiceMesh}, where the operation field represents the name of the specific operation within a service that made the call, the service field represents the logical name of the service on which the operation took place, the isError field is a "TRUE/FALSE" flag that indicates whether the trace is associated with an error, the httpMethod field relates to the HTTP method of the request for the associated trace and the isServiceMesh field is a flag that indicates whether the trace is part of a service mesh. The trace metrics 640 are computed after the spans have been consolidated into a trace following a sessionization process. The trace metrics are also turned into streams of metric data similar to the metric time series associated with the spans.

Figure 7:
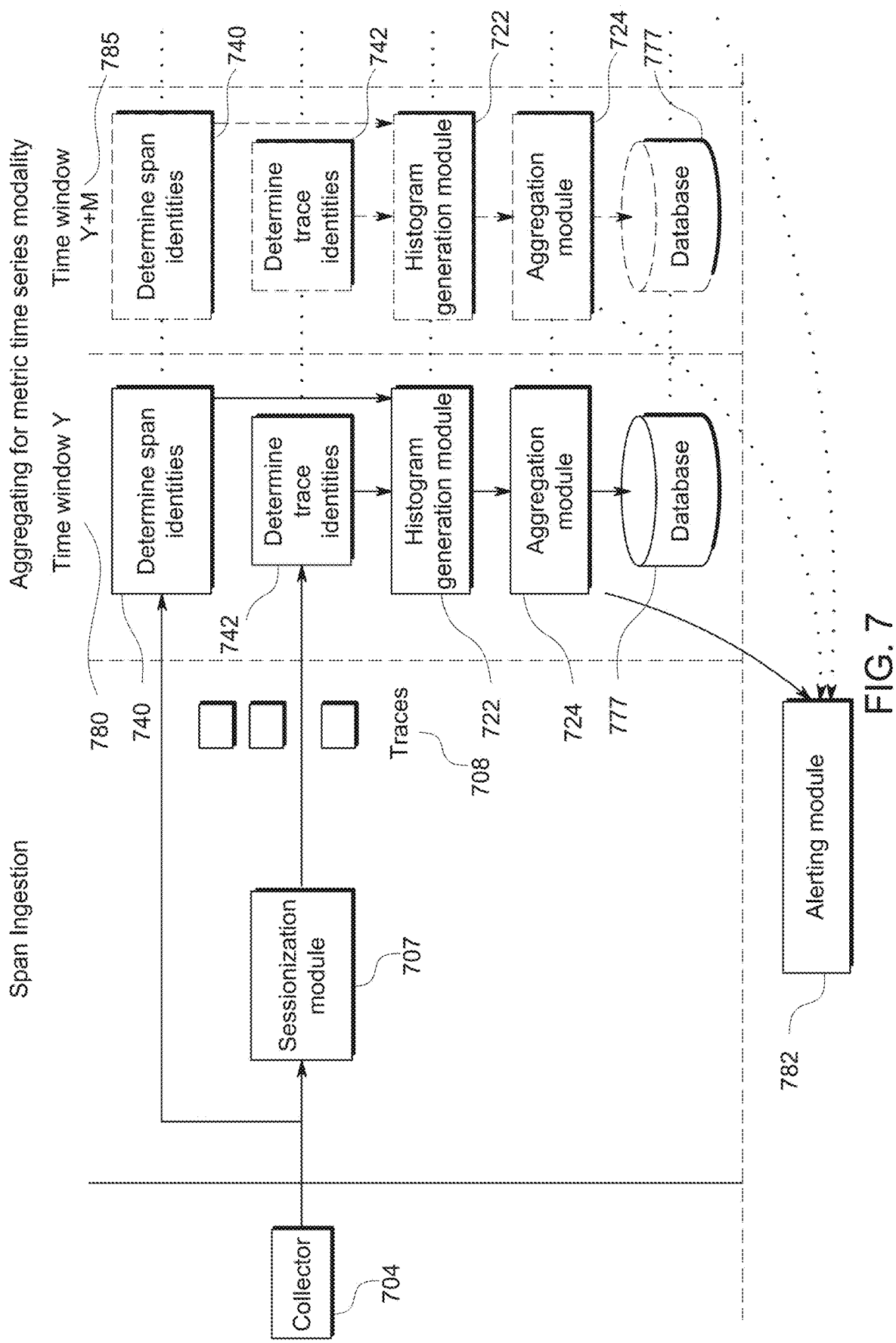
FIG. 7 is a flow diagram that illustrates an example of a method of generating metric time series from ingested spans, in implementations according to the present disclosure.

FIG. 7 is a flow diagram that illustrates an example of a computer-implemented method of generating metric time series from ingested spans in implementations according to the present disclosure. In the example of FIG. 7, incoming spans are received at a monitoring service from a collector 704. Prior to being sessionized, span identities are generated for the spans and the spans with identical base identities are grouped together by module 740.

In the example of FIG. 7, a histogram generation module 722 generates a histogram respective to each span identity. The histogram may represent a distribution of durations for a set of spans. Information from each incoming span (e.g., span duration information) corresponding to a given span identity is added to the fixed-size bins of the respective histogram for the identity. The histogram is maintained for a fixed-size time window Y 780 (e.g., ten seconds) after which the histogram generation module 722 emits the aggregated metrics and resets all the counters in the histogram for the next segment. Subsequently, the histogram generation module 722 generates metrics for the next duration of time Y+M 785, and emits metrics corresponding to that time window. In this way, histogram generation module periodically emits one or more metrics (e.g., six span metrics as seen in FIG. 6), including user-configured custom metrics, corresponding to each type of span to the analytics engine.

In the example of FIG. 7, the span information is also combined into traces 708 using a sessionization module 707 as discussed in connection with FIG. 5. The sessionization process may consolidate traces (from spans) within a first (e.g., minute) window (associated with time window Y 1480). Thereafter, the sessionization process may consolidate traces within the subsequent window (associated with time window "Y+M" 1485). Trace identities are determined for the sessionized traces 708 using module 742 after which the trace metrics (as discussed in connection with FIG. 6) are determined using the histogram generation module 722 in a process similar to the manner in which span metrics are generated.

In the example of FIG. 7, an aggregation module 724 may aggregate the periodic metric data from the histogram generation module 722 and create metric time series from the data for each span identity. In some implementations, the aggregation module 724 may generate quantized data streams from the metric data received from the histogram generation module 722. The quantized data stream has data values occurring periodically at fixed time intervals.

In an implementation, the aggregation module 724 may identify a function for aggregating the metric for which values are provided by one or more input data streams. The aggregation module 724 generates the quantized data streams by determining an aggregate value for each input data stream for each fixed time interval by applying the identified function over data values of the input data stream received within the fixed time interval. The aggregation module 724 may further receive a request to evaluate an expression based on the data values from the input data streams. The system periodically evaluates the expression using the data values of the quantized data streams.

In an implementation, the aggregation module 724 may, for example, perform aggregations on the various metric time series to provide real-time monitoring of certain higher priority endpoints in the application. For example, aggregations may be performed to determine request, error and latency metrics for certain designated services. To do that, the aggregation module 724 may, for example, aggregate values across all span identities that are associated with the designated service.

Furthermore, in some implementations, alerting module 782 may monitor one or more metric time series from the aggregation module 724 and may be configured to generate alerts if certain metrics being monitored exhibit anomalous behavior. For example, if a maximum span duration associated with a given span identity crosses over a certain threshold, an alert configured using the alerting module 782 may be triggered. The alert may, for example, be responsive to a metric time series associated with span metric 632 from FIG. 6, wherein the alert is triggered if the maximum span duration exceeds a given threshold.

In the example of FIG. 7, the histograms generated by the histogram generation module 722 may be stored in database 777. In an implementation, the histogram data may be stored as parquet-formatted files.

In an implementation, the instrumentation analysis system 322 (FIG. 3) compares durations of a set of similar spans (e.g., spans for the same span identity) with the tags associated with these spans and determines whether there are any patterns for a given tag. As discussed above, the analysis system 322 generates a histogram that may represent a distribution of durations for a set of spans. For a given tag, the analysis system calculates a p-value indicating the likelihood that the ranks of the spans for that tag in the distribution arose by chance. In particular, the analysis system may calculate a p-value of the Mann-Whitney U-statistic comparing the ranks of the durations of the traces having the tag to the other traces in the distribution. A larger U-statistic indicates that the spans for that tag skew rightward (that is, they tend to have long durations relative to other spans in the distribution). The analysis system can provide alerts regarding the tags whose spans have relatively long duration. Long-duration spans may be indicative of configuration problems at the instrumented systems. The analysis system may correct the p-value for the number of hypotheses tested, for example by multiplying the p-value by the total number of tags. This procedure defines a map from tags to non-negative real numbers. The analysis system sorts the tags by the associated p-value (e.g., in ascending order) and returns those with p-value less than or equal to some threshold, e.g., 0.01.

4.1.2 Real-Time Monitoring Using Metric Time Series Data

Figure 8:
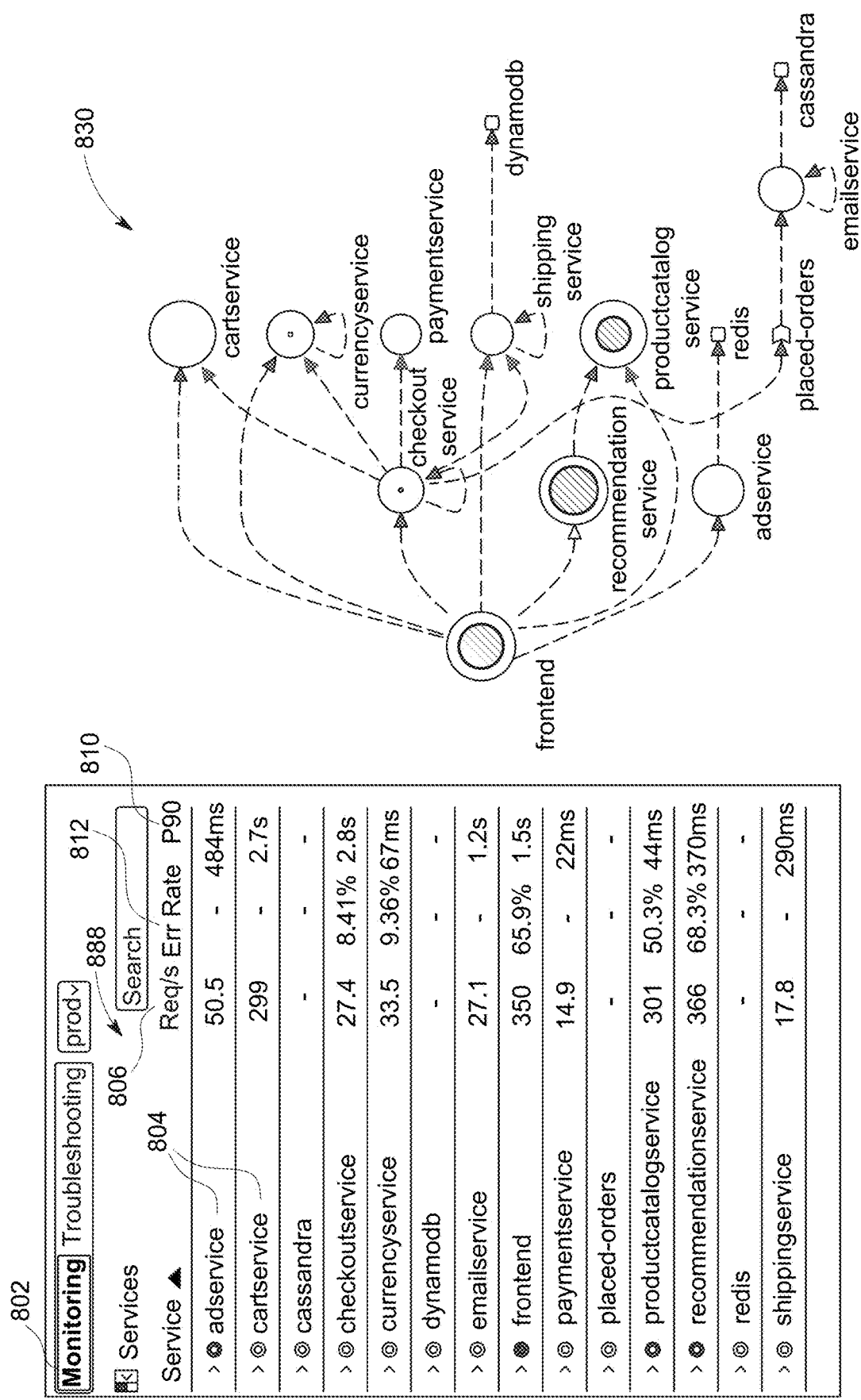
FIG. 8 illustrates an example of an on-screen graphical user interface (GUI) illustrating a monitoring mode for an application displaying metric values aggregated from metric time series data, in implementations according to the present disclosure.

FIG. 8 illustrates an example of an on-screen GUI illustrating a monitoring mode for an application displaying metric values aggregated from metric time series data in implementations according to the present disclosure. In an implementation, the GUI of FIG. 8 displays a monitoring mode indication when a corresponding monitoring mode option 802 is selected. The monitoring mode displays a panel 888 listing services 804 comprised within the application being monitored. Each service is displayed alongside metrics pertaining to requests/second 806, error rate 812 and P90 latency values 810. The metrics data displayed in the panel 888 is computed in real-time and is aggregated using the metric time series data. In an implementation, an aggregation module similar to the aggregation module 724 discussed in connection with FIG. 7 performs the necessary aggregations from the various metric time series to display metrics associated with each of the services. The service level KPIs may be computed through the real-time aggregation pipeline discussed in connection with FIG. 7 before the histogram metadata is stored in the backend of the analytics engine.

In the example of FIG. 8, the monitoring mode also comprises an application topology (service) graph 830. The service graph 830 facilitates visualizing cross-service relationships between services comprised within the application and external to the application (as will be discussed further in connection with the metric events modality). In an implementation, the service graph 830 may be created using information gleaned from the metric time series data aggregated by the aggregation module 724 discussed in connection with FIG. 7.

By ingesting up to 100 percent of the incoming spans from the client software and implementing monitoring service 306 (FIG. 3) as an SaaS-based service offering, valuable information pertaining to the spans is advantageously retained and further analyzed in the SaaS backend. Span identities and histogram information (e.g., various counts and metrics data) associated with the incoming spans that are stored may be used to conduct further analysis. For example, metadata may be analyzed to identify certain offending services or operations, and data regarding those services or operations may be surfaced for further analysis.

Conventional monitoring systems typically expunged the span data after extracting the relevant metrics from them. By comparison, as disclosed herein, high-fidelity information related to all the incoming spans for deeper analysis is retained. The metadata retained provides a user the ability to filter based on certain dimensions and services that would not have been possible using conventional monitoring systems. Further, the metadata retained may be used in conjunction with data sets for other modalities such as metric events and full-fidelity to allow a user to provide a thorough investigation of an alert.

In an implementation, using, for example, the "service," "operation," and "kind" fields in the tuple, the aggregation module 724 (from FIG. 7) may be able to determine span identities associated with cross-service calls. Spans associated with inter-service calls are of interest to a user because they provide user information regarding the manner in which two services within an application are interacting. As disclosed herein, the metadata saved for the metric time series can be advantageously used to perform post-processing and determine services associated with inter-services calls. For example, the value of the "kind" field related to a span identity may be either "client" or "server" where the analytics engine may be able to use that information in post-processing to determine if the span is related to a cross-service call.

If it is determined that a particular span is related to a cross-service call, those spans could be processed through the analytics engine to discover further information regarding the dependencies. For example, in an implementation, if a user identifies a span identity associated with a cross-service call or a span identity associated with a high value operation, the user may create an extended identity for the corresponding span identities and supplement those identities with additional custom dimensions to be monitored. For example, the user may want to monitor a customer name association with such spans. The user may simply reconfigure the analytics engine to extract the additional customer name dimension as part of the spans' extended identity.

Retaining span information associated with incoming spans provides a user additional metadata to perform intelligent processing. In an implementation, the user may only collect data pertaining to select operations. In other words, the user may filter out data pertaining to select operations that are of less interest to a user.

The number of unique span identities may typically roughly correlate with the number of unique operation names present on the span. In an implementation, the user is able to turn off or filter out span identities associated with certain operations if they are not particularly useful. In other words, the monitoring platform can be configured to turn off metric generation related to selected span identities. This advantageously reduces loads on the metrics analytics engine because it does not need to track and store metric time series for spans that are of little interest to a user. For example, spans associated with calls that a service makes to operations internal to the service do not convey information and can be filtered. Accordingly, additional resources can be directed towards processing spans associated with services and operations that are of greater interest to a user. Conventional monitoring systems by comparison would not have the flexibility to selectively focus on spans associated with high value services or operations by filtering out the less valuable spans.

Figure 9:
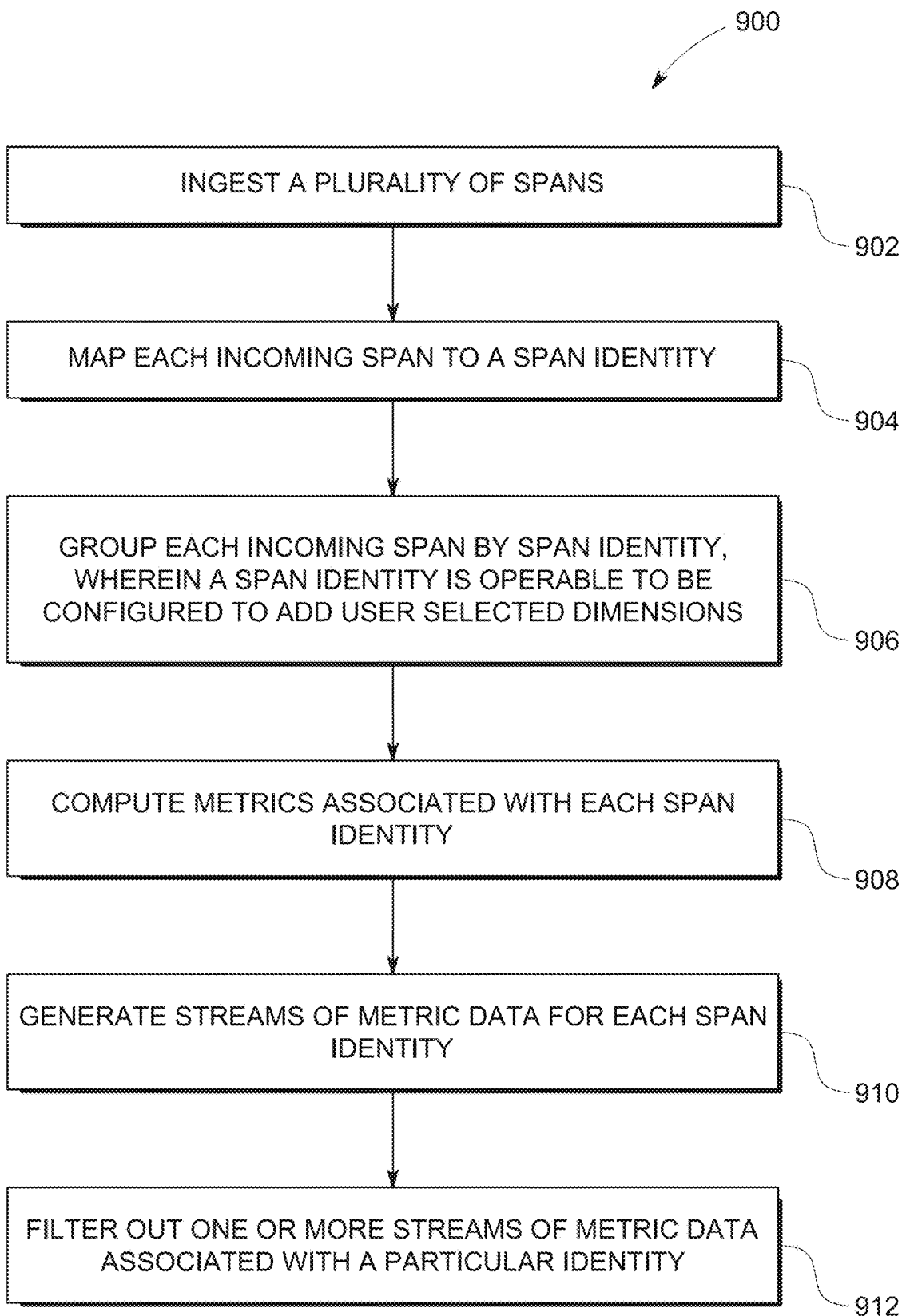
FIG. 9 presents a flowchart illustrating an example of a computerized process to generate streams of metric data associated with selected operations, in implementations according to the present disclosure.

FIG. 9 presents a flowchart illustrating an example of a computerized process to generate streams of metric data associated with selected operations in implementations according to the present disclosure. Blocks 902-912 describe example steps comprising the process 900 depicted in FIG. 9. In an implementation, the process 900 is implemented at least in part as computer-executable instructions stored in a computer-readable medium and executed in one or more processing devices.

At block 902, a plurality of spans is ingested into a cloud-based monitoring platform. At block 904, each incoming span is associated with a unique span identity. At block 906, spans are grouped by span identity, where a span identity can be extended to include additional custom configured dimensions.

At block 908, a histogram associated with each span identity is generated to compute metrics (e.g., six metrics discussed in connection with FIG. 6) for each span identity. At block 910, streams of metric data (metric time series) can be generated for each span identity.

At block 912, metric data pertaining to certain operations of no interest to a user may be filtered out. This way, metrics data pertaining to only high value operations may be aggregated.

4.2 Metric Event Modality

The metric event modality generates and stores aggregated rows of metrics values for selected indexed tags from the incoming trace data for given time durations. The selected tags may, for example, be indexed from the incoming spans when the spans are ingested. Metrics data may, for example, comprise, but is not limited to, number of requests (e.g., between two services), number of errors and latency. The aggregated rows of metrics data are stored efficiently for fast aggregation. The metric events data may be rapidly vectorized and aggregated in response to queries from a user.

Figure 10:
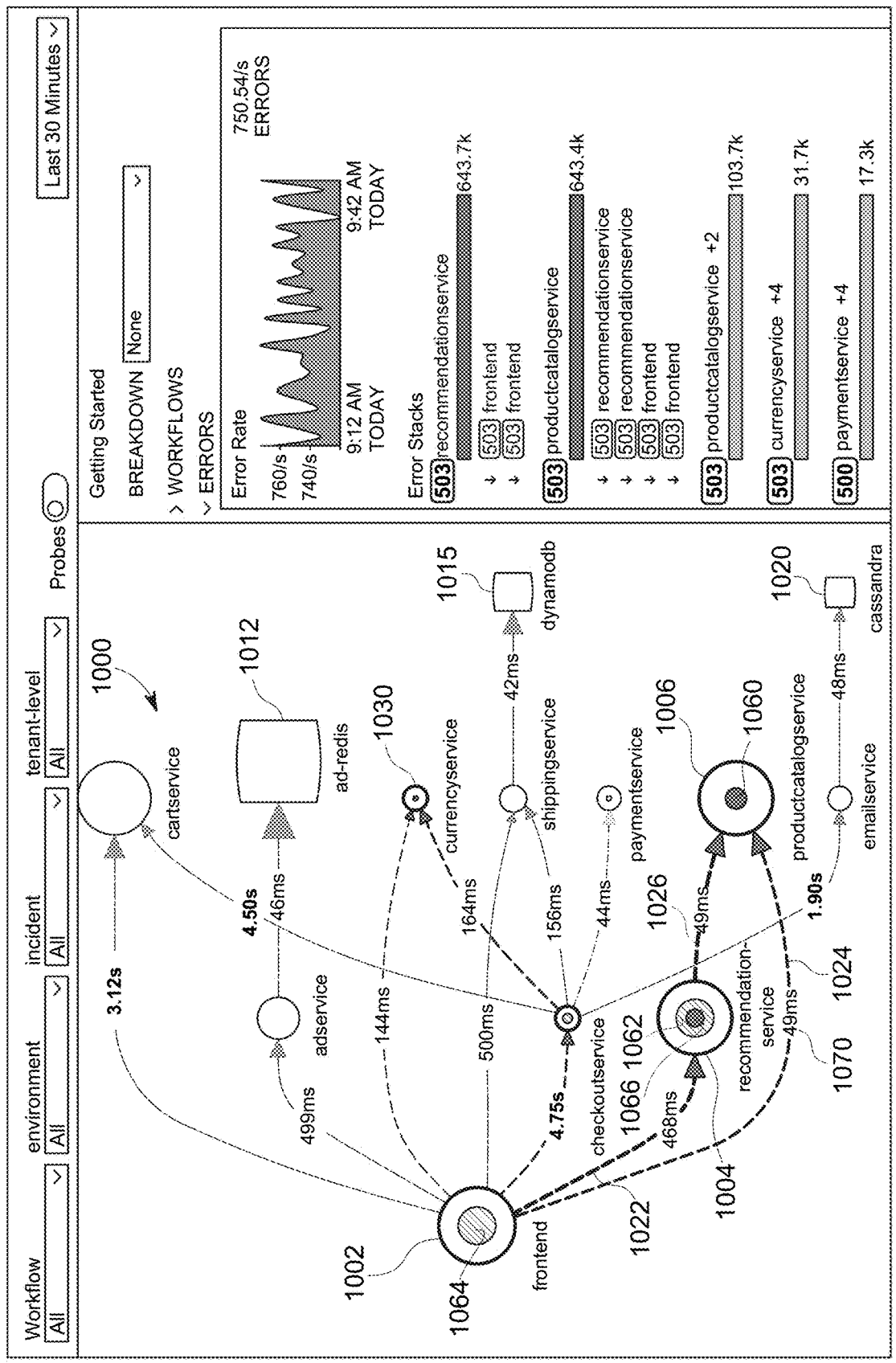
FIG. 10 illustrates an example of an on-screen GUI comprising an interactive topology graph for an application created from the aggregated metric events data, in implementations according to the present disclosure.

As disclosed herein, the aggregated rows of metrics data created in association with the metric events modality can be used to generate a full-context application topology graph using the metric events data (e.g., by module 522 in FIG. 5). FIG. 10 illustrates an example of an on-screen GUI comprising an interactive topology graph for an application created from the aggregated metric events data, in implementations according to the present disclosure. The service graph facilitates visualizing cross-service relationships between services comprised within the application and external to the application. The example GUI of FIG. 10 also enables customers to track the causal chain of operations resulting in an error.

The service graph may also be generated using the metric time series data as noted earlier, however, storage for the metric events data set may be significantly less because it does not need to store as much metadata as metric time series data. Accordingly, generating the service graph using metric events data is more efficient from a storage standpoint.

FIG. 10 illustrates an on-screen GUI comprising an interactive full-context service graph 1000, which is constructed for an example microservices-based application using the metrics data generated in connection with the metric events modality. Each circular node (e.g., nodes associated with services 1002, 1004 and 1006 of FIG. 10) represents a single microservice. Alternatively, in an implementation, a circular node may also represent a group of multiple microservices, where the GUI for the monitoring platform (associated with, for example, the monitoring service 306) provides a client the ability to expand the node into its sub-components.

In an implementation, services that are part of the client's application may be represented differently from services that are external to the client's application. For example, circular nodes (e.g., nodes associated with services 1002, 1004 and 1006) of the example application represented by service graph 1000 are associated with services comprised within the client's application. By contrast, squarish nodes (e.g., nodes associated with databases dynamodb 1015, Cassandra 1020, ad-redis 1012) are associated with services or databases that are external to the client's application.

A user may submit a request at the front-end service 1002; the user's request at the front-end service 1002 may set off a chain of subsequent calls. For example, a request entered by the user at the front end of the platform may generate a call from the front-end service 1002 to the recommendation service 1004, which in turn may generate a further call to the product catalog service 1006. As noted previously, a chain of calls to service a request may also comprise calls that a service makes to internal sub-functions or operations within the same service.

Each edge in the service graph 1000 (e.g., the edges 1022, 1024 and 1026) represents a cross-service dependency (or a cross-service call). The front-end service 1002 depends on the recommendation service 1004 because it calls the recommendation service 1004. Similarly, the recommendation service 1004 depends on the product catalog service 1006 because it makes a call to the product catalog service 1006. The directionality of the edge represents a dependency of a calling node on the node that is being called. Each of the calls passes the Trace ID for the request to the respective service being called. Further, each service called in the course of serving the request could potentially generate several spans (associated with calls to itself or other services). Each of the spans generated will then carry the Trace ID associated with the request, thereby, propagating the context for the trace. Spans with the same Trace ID are, thereafter, grouped together to compose a trace.

In some implementations, the GUI comprising service graph 1000 may be configured so that the nodes themselves provide a visual indication regarding the number of errors that originated at a particular node versus errors that propagated through the particular node but originated elsewhere. In an implementation, the high-cardinality metrics data aggregated in association with the metric events modality may be used to compute the number of errors that are used to render the nodes of the service graph.

For example, as shown in the service graph of FIG. 10, the front-end service 1002 makes calls to the recommendation service 1004. Errors may be generated at the recommendation service 1004 not only in response to calls from the front-end service 1002, but also in response to calls that the recommendation service 1004 makes to itself (e.g., in response to sub-functions or operations that are part of recommendation service). For such errors, the recommendation service 1004 would be considered the "originator" for the error. The recommendation service 1004 also makes calls to the product catalog service 1006 and these calls may result in their own set of errors for which the product catalog service 1006 would be considered the error originator. The errors originating at the product catalog service 1006 may propagate upstream to the front-end service 1002 through the recommendation service 1004; these errors would be observed at the recommendation service 1004 even though the recommendation service 1004 is not the originator of those errors.

Conventional monitoring technologies would not provide adequate means for a client to distinguish between errors that originated at the recommendation service 1004 versus errors that propagated through the recommendation service 1004 but originated elsewhere. In contrast, as disclosed herein, by performing computations using the metrics data associated with the metric events modality, a service graph that visually indicates critical information regarding the services in an architecture (e.g., the number of requests between services, the number of errors generated by a service, number of errors for which the service was the root cause, etc.) can be rendered. The service graph 1000 allows clients the ability to visually distinguish between errors that originated at the recommendation service 1004 as compared with errors that simply propagated through the recommendation service 1004. As shown in FIG. 10, the node associated with the recommendation service 1004 comprises a solidly filled circular region 1066 and a partially filled region 1062, where the region 1066 represents errors that originated at the recommendation service 1004 while the region 1062 represents errors that propagated through the recommendation service 1004 but originated elsewhere (e.g., at the product catalog service 1006).

Similarly, solidly filled region 1060 within the node associated with the product catalog service 1006 represents the errors that originated at the product catalog service. Note that the errors returned by the product catalog service 1006 originated at the product catalog service. In other words, the product catalog service 1006 does not have errors from another downstream service propagating through it because it does not make calls to another service that is further downstream in the execution pipeline. Conversely, the front-end service 1002 comprises a partially filled region 1064 because the errors observed at the front-end service 1002 propagated to it from other downstream services (e.g., the recommendation service 1004, the currency service 1030, the product catalog service 1006, etc.). The front-end service 1002 was not the originator of errors in the example shown in FIG. 10. In some implementations, solidly filled regions (e.g., region 1066) and partially filled regions (e.g., region 1064) may be represented differently. For example, different shades, patterns, or colors may be used to distinguish these regions from each other.

The aggregated rows of metrics data created for the metric events modality can be used to determine full-fidelity SLIs associated with the services in an application (e.g., by the module 522 in FIG. 5). An SLI is a service level indicator: a defined quantitative measure of some aspect of the level of service that is provided. The SLIs are aggregated and extracted for the various services in a microservices architecture so that the behavior of applications may be understood. Most clients consider request latency (e.g., how long it takes to return a response to a request) as a key SLI. Other common SLIs include the error rate (often expressed as a fraction of all requests received) and system throughput, typically measured in requests per second. The measurements are often aggregated over a measurement window using the metrics data associated with the metric events modality and then turned into a rate, average, or percentile.

In an implementation, the GUI comprising service graph 1000 is interactive, thereby allowing a developer to access the SLIs associated with the various nodes and edges within the application by interacting with respective portions of the service graph. Referring to FIG. 10, in an implementation, a client may be able to hover their cursor over various regions of the on-screen displayed service graph 1000, including but not limited to the nodes (e.g., the nodes associated with services 1004, 1006 etc.) and edges (e.g., the edges 1022, 1026, etc.), to receive SLI-related information for the associated microservices through a pop-up window or other interface.

Figure 11:
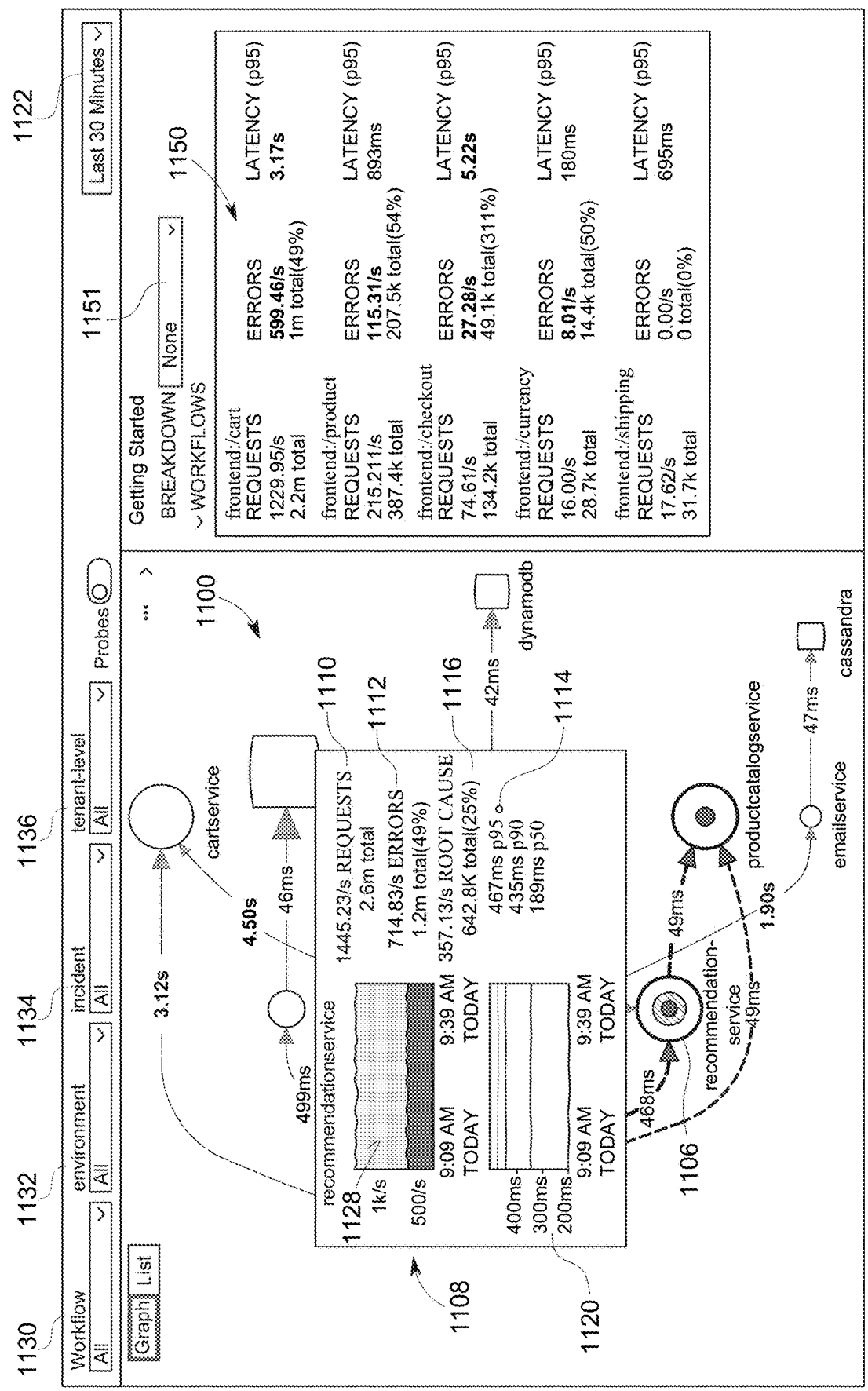
FIG. 11 illustrates an example of an on-screen displayed GUI showing a manner in which a client may access Service Level Indicators (SLIs) pertaining to a service within an interactive topology graph, in implementations according to the present disclosure.

FIG. 11 illustrates an example of an on-screen displayed GUI showing a manner in which a client may access SLIs pertaining to a service within an interactive topology graph, in implementations according to the present disclosure. As shown in FIG. 11, when a client hovers the cursor over the node associated with, for example, the recommendation service 1106, a pop-up window 1108 is overlaid on the service graph 1100 comprising SLIs pertaining to the recommendation service 1106. Specifically, SLIs pertaining to Requests 1110, Errors 1112 and Latency percentiles 1114 are provided. Furthermore, in an implementation, information pertaining to Root Cause 1116 is also provided to the client.

For example, the SLIs related to Requests 1110 comprise information regarding the rate of requests and number of requests serviced by the recommendation service 1106 during a specific time duration. The time duration over which the SLIs are calculated may be adjusted using drop-down menu 1122. The time duration over which SLIs are calculated may vary, for example, from one minute to three days. As indicated by the time axis on hover chart 1128, for this example, a time window of 30 minutes (from 9:09 to 9:39 a.m.) is selected.

In an implementation, the pop-up window 1108 also provides the client information pertaining to SLIs related to Errors 1112. In the example of FIG. 11, the pop-up window 1108 provides information regarding the error rate and the total number of errors that occurred during the specified time duration. The client is also provided information regarding what percentage of the total number of requests resulted in errors.

In an implementation, the pop-up window 1108 also provides the client information pertaining to Latency Percentiles 1114 and a graphical representation 1120 of the same. For example, SLI p95 indicates that for 95 percent of the users, the latency for servicing the requests was less than 467 milliseconds (ms). Latency-related SLIs also include information regarding p90 and p50 percentiles. The graphical representation 1120, in the example of FIG. 11, shows the latency information regarding the p95 percentile graphically.

In an implementation, the pop-up window 1108 also displays information pertaining to errors for which the selected service was the root-cause. The Root Cause information 1116 includes the number of errors for which the selected service (e.g., the recommendation service 1106 in the example of FIG. 11) was the originator, the associated error rate and the percentage of the total number of requests that represents. In this way, in addition to providing clients visual cues for identifying root cause error originators, meaningful and accurate quantitative information are also provided to help clients distinguish between root cause-related errors and errors associated with downstream causes.

Note that the SLIs displayed in the pop-up window 1108 are computed accurately using the metrics data gathered for the metric events modality. Because, as disclosed herein, up to 100 percent of the incoming span data (without sampling) can be ingested, the SLIs are computed factoring in all the incoming data, which results in accurate measurements. For the example of FIG. 11, there were a total of 2.6 million requests served by the recommendation service 1106 at a rate of 1445.23 requests per second ("/sec"). Of these, 1.2 million of the requests resulted in errors at a rate of 714.83/sec, which represents approximately 49 percent of the total number of requests. In this way, as disclosed herein, a modality of analysis that enables a client to gather critical SLIs pertaining to the recommendation service 1106, including an indication of how many of the errors originated at the recommendation service 1106, is provided.

Figure 12:
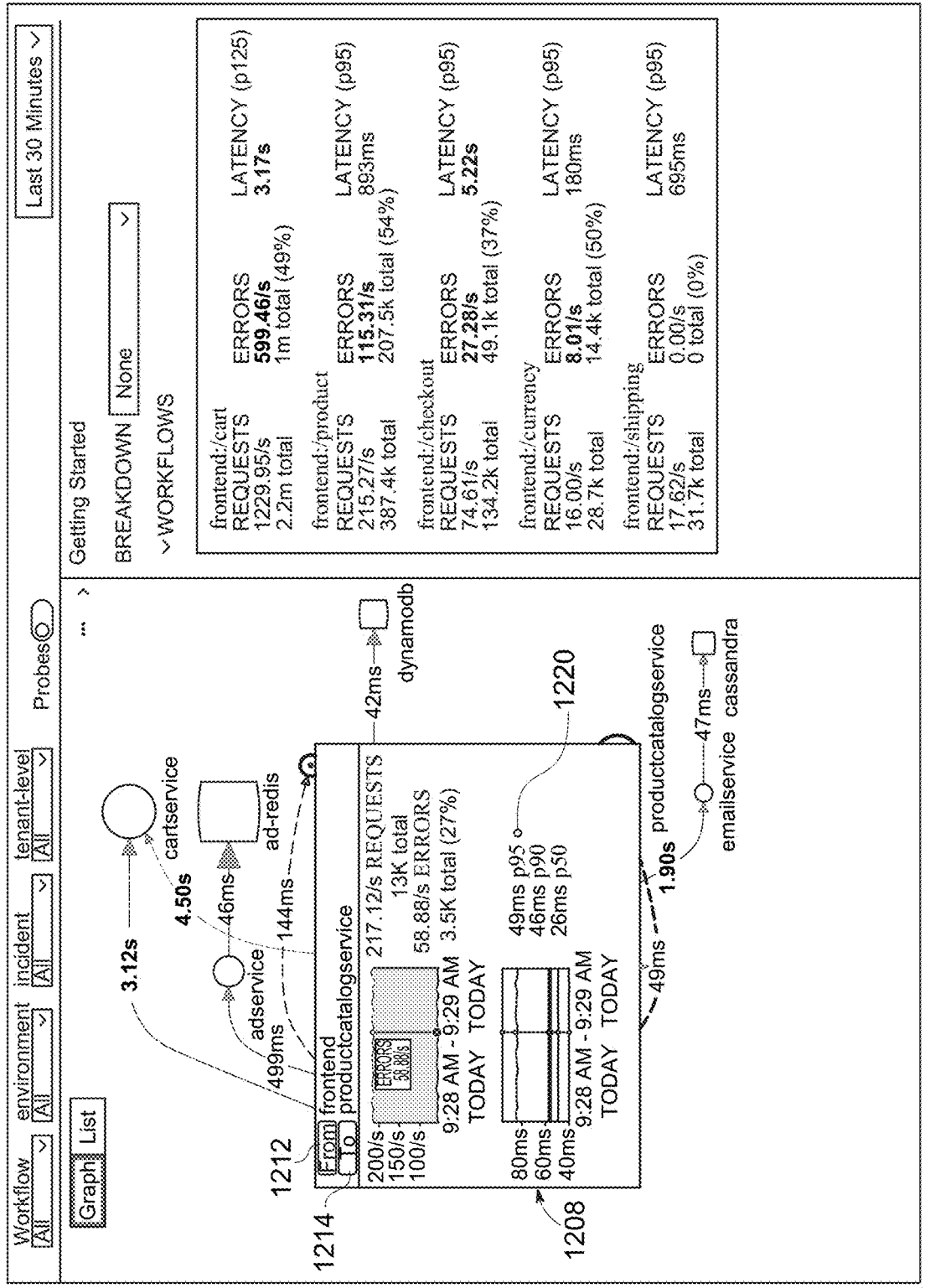
FIG. 12 illustrates an example of an on-screen GUI showing a manner in which a client may access SLIs pertaining to an edge within an interactive topology graph, in implementations according to the present disclosure.

FIG. 12 illustrates an example of an on-screen GUI showing a manner in which a client may access SLIs pertaining to an edge within an interactive topology graph, in implementations according to the present disclosure. The SLIs pertaining to edges are also computed using the metrics data associated with the metric events modality. As shown in FIG. 12, if a user hovers over or selects a particular edge (e.g., the edge 1024 as shown in FIG. 10, which represents the cross-service dependency of the front-end service 1002 on the product catalog service 1006) a pop-up dialog box 1208 opens up on-screen that reports SLIs specific to the dependency. The "From" field 1212 represents the service that executes the call and the "To" field 1214 represents the service that is called (the service that the calling service depends on). As shown in the dialog box 1208, SLIs pertaining to the number of requests (or calls) that were made, the number of those that returned in errors, and the latency associated with servicing the requests are provided. The latency value 1220 of 49 ms shown in FIG. 12 for this particular dependency may be annotated directly on the edge of the service graph. For example, as shown in service graph 1000 of FIG. 10, edge 1024 of the service graph 1000 indicates the latency value 1070 (e.g., 49 ms) directly on the edge in the service graph allowing a client to efficiently gather information regarding latency associated with the dependency.

In an implementation, as shown in FIG. 10, the edges within the application topology graph are annotated with their corresponding latency values. In this way, SLI data from the metrics information aggregated for this modality are efficiently computed, developers are advantageously enabled to gather meaningful and accurate information regarding cross-service dependencies directly from the service graph 1000.

In an implementation, the metrics data associated with the metric events modality are used to compute accurate SLIs across multiple dimensions. Furthermore, high dimensionality and high cardinality tags for the metric events modality are supported. In an implementation, the GUI of FIG. 11 may display one or more attribute (or tag) categories that comprise dimensions that may be varied across the service graph 1100. For example, attribute categories (e.g., Workflow 1130, environment 1132, incident 1134 and tenant-level 1136) may be depicted within the GUI, each of which may correspond to attributes that may be varied to compute SLIs and error-related information for different combinations of the attributes. The categories of dimensions across which the SLIs may be computed, include, but are not limited to, workflow 1130, environment 1132, incident 1134, and tenant-level 1136. Each of the categories comprises a drop-down menu with options for the different dimensions. The metrics events data allows users to easily and rapidly compute measurements across various cross-combinations of tags or attributes.

In an implementation, the GUI may include a panel 1150 that may display SLIs across the various workflows. Furthermore, the GUI allows users the ability to break down the workflows across multiple different attributes using drop down menu 1151. The computations for each of the breakdowns may be efficiently determined using the metrics data aggregated for the metric events mode.

Figure 13:
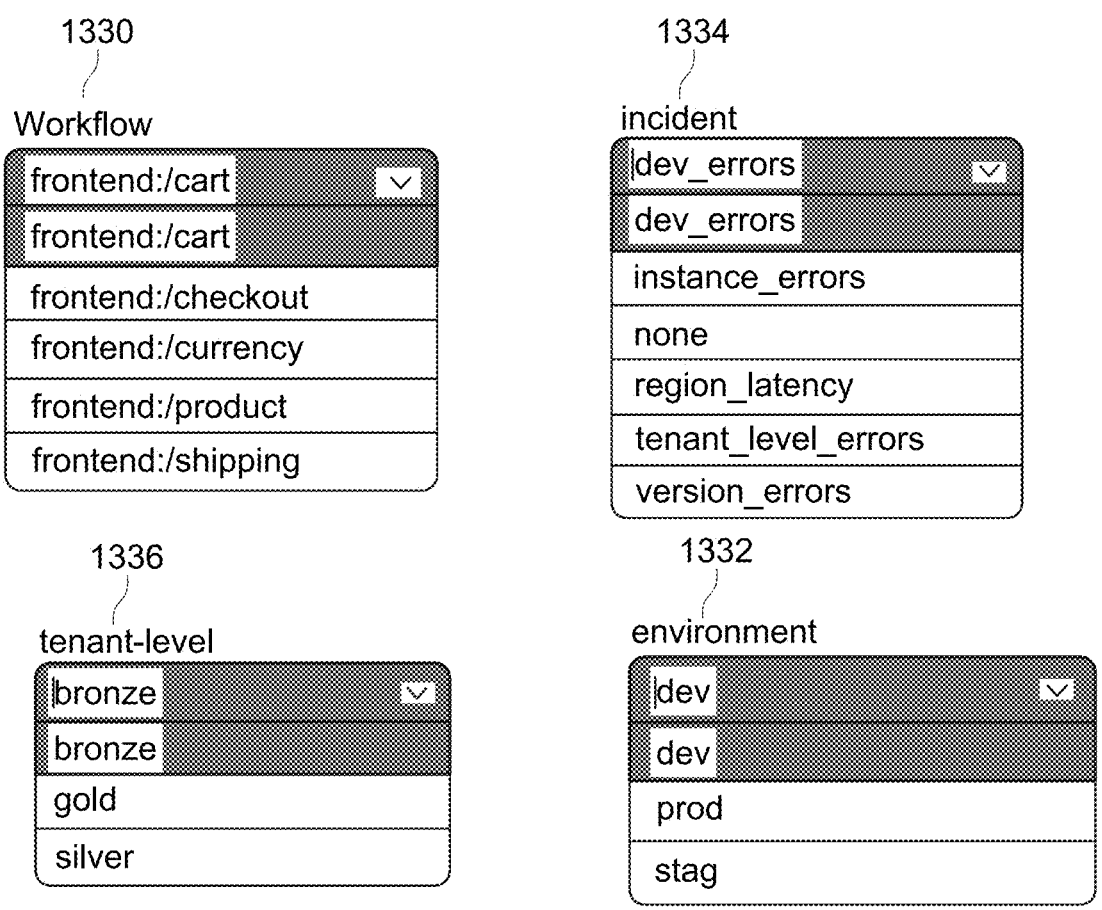
FIG. 13 illustrates on-screen displays that represent examples of categories of dimensions across which SLIs may be computed, in implementations according to the present disclosure.

FIG. 13 illustrates examples of on-screen displays that represent example categories of dimensions across which SLIs may be computed, in implementations according to the present disclosure. The example category of dimensions corresponds to the categories associated with drop-down menus (e.g., 1130, 1132, 1134 and 1136) discussed in connection with FIG. 11. The metrics data aggregated using the metric event modality allows users to easily and rapidly compute measurements across various cross-combinations of attributes. Drop-down on-screen menu 1330, corresponding to a workflow, illustrates different workflows specific to the application discussed in connection with FIG. 10. A "workflow" is a type of category of dimension of the request that was processed; a workflow may be conceptualized as a type of "global tag" that is attributed to each span in a given trace. A workflow may, for example, be associated with a type of business action (e.g., "checkout") that is generated on the back-end in response to a request.

Similarly, drop down on-screen menus 1334, 1336 and 1332, relating to incident, tenant-level and environment respectively, provide further categories of dimensions across which SLIs may be computed. Each of the drop down on-screen menus 1330, 1332, 1334 and 1336 comprises various dimensions (associated with the respective categories) across which aggregations may be made. For example, the user may submit a query asking for the number of requests in a trace where "Workflow=frontend:/cart" and "incident=instance_errors" and "tenant-level=gold." By aggregating metrics data associated with the indexed tags, the metric events modality is able to respond to the user's query rapidly and efficiently.

SLIs may be computed for each attribute of the categories in FIG. 13 and also for each combination of attributes associated with the categories. In an implementation, for each combination of attributes selected using one or more of the drop-down menus, the client may be able determine the computed SLIs (e.g., by hovering a cursor over the various nodes and edges of the graph after the dimensions have been selected using, for example, the drop-down menus shown in FIG. 11). In this way, a client is able to use the metric events modality to slice the application topology graph across several different attributes.

Clients might have different attributes or dimensions that may be of interest for their respective application. In an implementation, the monitoring platform may be configured to provide insight into client-specific dimensions. Consequently, the specific attributes or dimensions available in each of the drop-down menus may vary by client.

4.2.1 Metric Events Data Generation and Persistence

Figure 14:
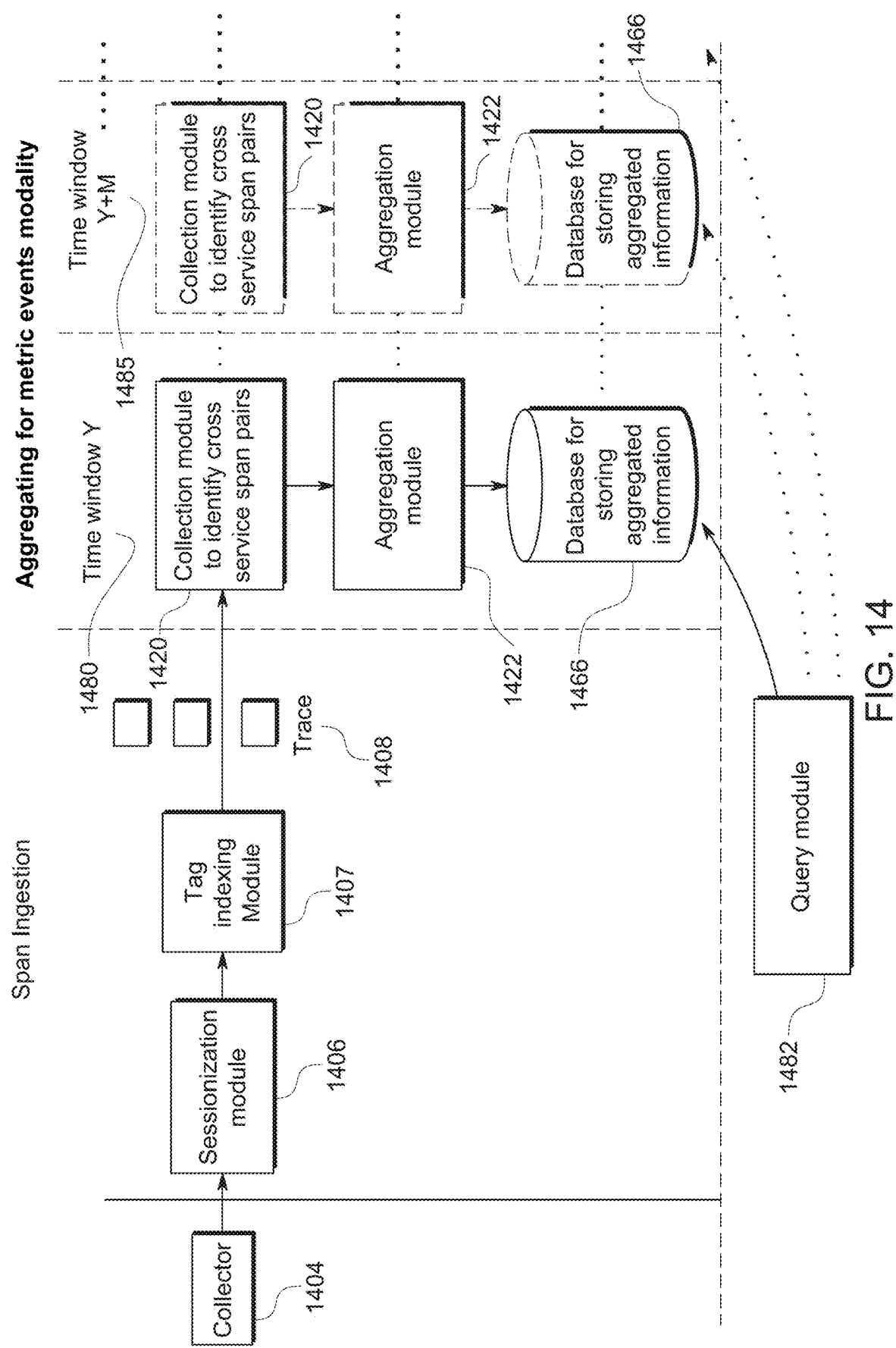
FIG. 14 is a flow diagram that illustrates an example of a method of aggregating metrics data from ingested traces for the metric events modality, in implementations according to the present disclosure.

FIG. 14 is a flow diagram that illustrates an example method of aggregating metrics data from ingested traces for the metric events modality, in implementations according to the present disclosure. As mentioned previously, span information is received at a monitoring service from a collector 1404. The span information is then combined into traces 1408 in real time using module 1406 in a process called sessionization as discussed in connection with FIG. 5. The sessionization process may consolidate traces (from spans) within a first time window (associated with time window Y 1480) before transmitting the traces to the collection module 1420. Thereafter, the sessionization process may consolidate traces within the subsequent window (associated with time window "Y+M" 1485).

Subsequent to consolidation, the trace data is indexed by tag indexing module 1407, which indexes one or more tags in the trace data. The tags may be client-selected tags or tags that the monitoring platform is configured to index by default. In an implementation, the metric events modality indexes a subset of tags associated with the spans of a trace, but indexes that set of tags with perfect accuracy because the metrics calculated take into account all the ingested spans.

In some implementations, the collection module 1420 receives one or more traces 1408 generated within a predetermined time window Y 1480, and traverses the traces to identify and collect cross-service span pairs that represent cross-service calls. To collect the cross-service span pairs, the collection module 1420 identifies parent-child span pairs in a given trace where the service name for the parent and the child are different. Stated differently, the collection module 1420 will collect each pair of spans that has a parent-child relationship and where each of the two spans in the pair are associated with a different service. The service name of a span may be identified in a span-level tag included with each span. Alternatively, there may be other conventions for identifying a service name associated with a span, e.g., a special field within the span for the service name.

Identifying and collecting the cross-service span pairs from the incoming spans are advantageous because they enable the monitoring platform to track information that will be most relevant to a user (e.g., to render the service graph and display the SLIs associated with the various dependencies between services). Spans associated with calls to internal operations that a service might make may not be of interest to an application owner and may, therefore, be ignored by the collection module 1420 when determining the cross-service span pairs.

In an implementation, once the cross-service span pair is identified, indexed tags may be extracted for the cross-service span pair by determining a service tier for the respective parent and child spans of the span pair. A service tier is a subset of spans in a trace that logically identifies a single request to a service. Accordingly, both a parent span and a child span in the cross-service span pair are associated with a respective subset of related spans known as a service tier. Indexed tags are extracted by the collection module 1420 from service tiers associated with a cross-service span pair. In another implementation, however, the tags may be extracted directly from the parent span and child span in a cross-service span pair rather than the respective service tier associated with the parent span or child span.

In some implementations, once the cross-service span pairs are collected and the indexed tags extracted from the respective service tiers, the collection module 1420 maps one or more selected tags for each service in the cross-service span pair to tag attributes, e.g., selected tags in a parent span (associated with the originating service) are mapped to a "FROM" tag attribute and selected tags in a child span (associated with the target service) are mapped to a "TO" tag attribute. This enables directionality information for the cross-service calls to be preserved. While the discussion herein focuses on "FROM" and "TO" tag attributes to indicate the direction of the dependency between services in a cross-service call, there may be several different ways to record dependency information between the two services.

In an implementation, the aggregation module 1466 of the monitoring platform aggregates across the cross-service span pairs by maintaining a count for each unique set of "FROM" tag attributes (and their corresponding values) to "TO" tag attributes (and their corresponding values) for a cross-service pair. In this implementation, counts are maintained at the tag level for the cross-service span pair (rather than at the service level). Accordingly, a separate count is maintained for each set of parent span tags (mapped to a "FROM" tag attribute) and child span tags (mapped to a "TO" tag attribute) for a cross-service pair. The count is increased each time the aggregation module encounters the same unique set of "FROM" tag attributes (associated with tags of a parent span) and "TO" tag attributes (associated with tags of a child span) for the same cross-service span pair in one or more traces. In another implementation, the count may be maintained at the service level. Accordingly, the count may be increased each time the same cross-service span pair is encountered within the trace information ingested from the client.

The aggregation module 1422 advantageously prevents duplication by storing a single instance of each unique set of "FROM" tag attributes and "TO" tag attributes for a given cross-service span pair with an associated count in the storage module 1466. The information in the storage module 1466 may be accessed by querying module 1482 where the querying module 1482 determines that the query is associated with the metric events modality. The querying module 1482 may, for example, be associated with the query engine and reporting system 324 discussed in FIG. 3.

The aggregated cross-service "FROM" and "TO" tag attribute sets and associated count values stored in the storage module 1466 may be used by the querying module 1482 to respond to queries in accordance with the metric events modality. The collection and aggregation process is repeated for subsequent time windows (including window Y+M 1485) after time window Y 1480. In this way, the aggregation process is performed over time. This allows the metric events modality to deliver query results over varying time durations (as discussed, for example, in connection with the drop-down menu 1122 in FIG. 7).

FIG. 15 is a table illustrating an example in which selected tags for each service in a cross-service span pair may be mapped to tag attributes and stored as part of a memory-resident data object associated with an edge in the service graph, in implementations according to the present disclosure. As noted above, in some implementations, once the cross-service span pairs are collected, the monitoring platform maps selected tags associated with each service in the cross-service span pair to tag attributes, e.g., selected tags in a parent span are mapped to a "FROM" tag attribute and selected tags in a child span are mapped to a "TO" tag attribute. The mapping is performed to allow directionality information for the cross-service calls to be preserved. For example, a data object for an "edge" (corresponding to an edge or dependency in the topology graph) may be created that comprises both the FROM-type of tag attributes and the TO-type of tag attributes. In an implementation, one or more edge data objects similar to the one shown in FIG. 15 are used to persist the data for the metric events modality (in addition to node data objects which will be discussed in connection with FIG. 16B).

The table of FIG. 15 illustrates an example manner of storing a data object associated with an edge in the service graph. The table comprises two services, Service A and Service B, in an application. Both Service A and Service B comprise indexed tags "span.kind" and "region." Tag "span.kind" may have two possible values, "client" and "server." Similarly, tag "region" may have two possible values, "us-west" and "us-east."

If all possible combinations exist in Service A, there may be four unique tag combinations associated with the "FROM" tag attribute, e.g., {(span.kind=client, region=us-west) (span.kind=client, region=us-east) (span.kind=server, region=us-west) (span.kind=client, region=us-east)}. Similarly, if all possible combinations exist in Service B, there may also be four unique tag combinations associated with the "TO" tag attribute. Assuming there is a complete interaction between Service A and Service B, there may be 16 (4×4) different edges between the two services based on the unique set of "FROM" and "TO" type tag attributes.

Note that the example in FIG. 15 illustrates information for two unique sets of "FROM" and "TO" tag attributes. Edge 1590 is associated with a TO-type attribute of "region=us-east" while edge 1592 is associated with a TO-type attribute of "region=us-west." Because the two sets of "FROM" and "TO" attributes are not identical, a separate count is maintained for each. The edge 1590 has an associated count of two, while the edge 1592 has an associated count of one. To determine the total number of requests or total count associated with the cross-service call from Service A to Service B, the number of counts for each set of "FROM" and TO" tag attributes for an associated cross-service call may be summed up. In the example of FIG. 15, a total of three requests is computed to occur between Service A and Service B.

In an implementation, data sets for the metric events mode are stored as row of metrics extracted from the indexed tags in the service tiers, where each row is associated with either an edge or a node in the service graph. In an implementation, the edges on the service graph (e.g., the edges 1022 and 1026 of FIG. 10) are rendered using both the "FROM" and "TO" tag attribute sets because rendering the edges requires information regarding directionality. The counts for the "FROM" and "TO" tag attribute sets for a given cross-service span pair are summed up to yield the number of requests made between the two services associated with the span pair. In other words, edges are rendered in the service graph by grouping "FROM" and "TO" tag attribute sets associated with a cross-service call and summing up the request counts associated with the cross-service call. In an implementation, this grouping may be performed using "group by" statements in a query language, e.g., SQL. In an implementation, the value of the number of requests between two services may be used to determine the thickness of the edge between the two services in the service graph.

In an implementation, the nodes (e.g., nodes associated with services 1002, 1004, 1006) on the service graph are also rendered using the aggregated cross-service "FROM" and "TO" tag attribute sets. However, rendering the nodes does not require directionality information and, therefore, the nodes may be rendered by collecting and extracting information from the "TO" type tag attributes. Stated differently, the nodes are rendered by grouping the "TO" tag attributes associated with a given service and summing up the request counts associated with the service. In an implementation, this grouping may be performed using "group by" statements in a query language, e.g., SQL. The "TO" tag attributes represent new services being called within the microservices architecture. Accordingly, the counts associated with "TO" tag attributes for a given service may be summed up to determine the total number of requests made to the service. In an implementation, the value of the number of requests may also be used to determine the size of the node when rendering the service graph.

In an implementation, the "TO" type tag attributes for rendering the nodes may be aggregated separately from the "FROM" and "TO" tag attribute sets aggregated for rendering the edges (as will be discussed in connection with FIG. 16B). In the example table of FIG. 15, information for Service B may be determined, for example, by analyzing the "TO" type tag attributes in the table.

Figure 16A:
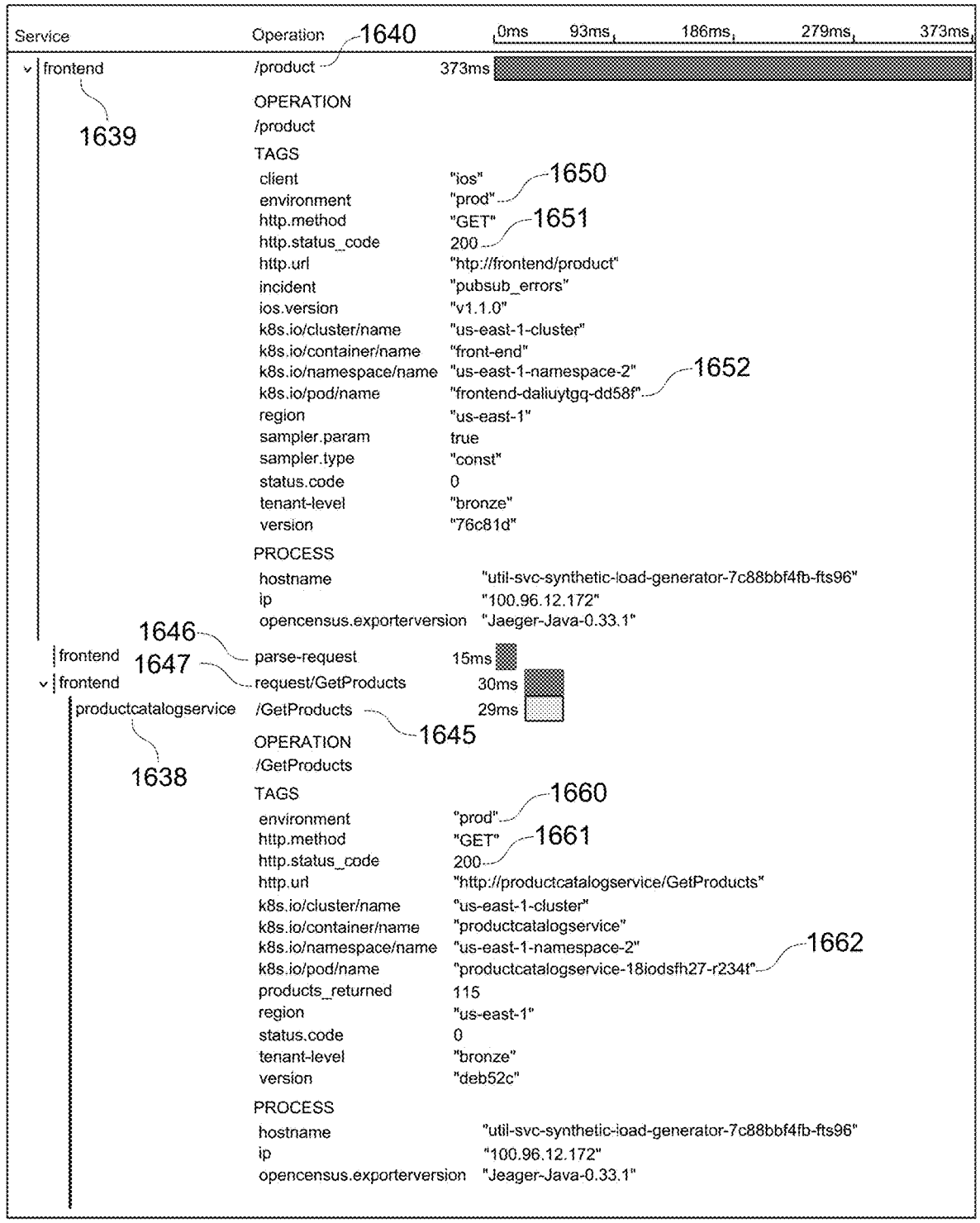
FIG. 16A illustrates an example of an on-screen GUI showing a visual representation of a portion of an example of a trace illustrating a cross-service call, in implementations according to the present disclosure.

FIG. 16A illustrates an example of an on-screen GUI showing a visual representation of a portion of an example trace illustrating a cross-service call, in implementations according to the present disclosure. As shown in FIG. 16A, front-end service 1639 makes a call to product catalog service 1638. Accordingly, the front-end service 1639 and the product catalog service 1638 comprise a cross-service span pair. Note that spans 1640, 1646 and 1647 may be part of the service tier for front-end service 1639. Accordingly, even though the call is made by the span 1647 ('frontend: request/GetProduct') to span 1645 ('productcatalogservice: /GetProducts'), indexed tags associated with the front-end service 1639 may also be extracted from the spans that are part of the service tier for the front-end service 1639. In an implementation, the first matching tag within a service tier is extracted. For example, indexed tag "environment=prod" 1650 may be extracted from the span 1640, even though it is repeated in the spans 1646 and 1647, because the span 1640 comprises the first matching instance of the tag 1650. Assuming tags "environment" (referred to herein as "env"), "http.status_code" (referred to herein as "code") and "k8s.io/pod/name" (referred to herein as "pod") are indexed, then tags 1650, 1651 and 1652 are extracted from the front-end service 1639 while tags 1660, 1661 and 1662 are extracted from the product catalog service 1638.

In an implementation, the extracted indexed tags are mapped to tag attributes. The extracted tags 1650, 1651 and 1652 in the parent span (associated with the front-end service 1639) may be mapped to a "FROM" tag attribute while the extracted tags 1660, 1661 and 1662 in the child span may be mapped to a "TO" tag attribute. In an implementation, the mapped tags may be used to create node and edge data objects that are used to persist data for the metric events modality as shown in FIG. 16B.

FIG. 16B illustrates an example in which data in the metric events modality is persisted using an edge data object comprising a memory-resident table of tag attributes with associated counts and using a node data object comprising a memory-resident table of tags with associated counts, in implementations according to the present disclosure. In the example of FIG. 16B, a memory-resident table 1601 titled "Edge Health" may be maintained to keep track of the various dependencies in the application. The table 1601 may be stored in, for example, the storage module 1466 (in FIG. 14). A memory-resident table 1600 titled "Node Health" may be maintained to keep track of the various service nodes in the application. Both tables comprise aggregated rows comprising metrics values. In an implementation, these rows are stored efficiently for fast aggregation.

For example, the table 1601 may comprise one or more example rows related to the cross-service span pair discussed in connection with FIG. 16A. Row 1606 is one example row that may be generated for the cross-service span pair of FIG. 16A. Note that for simplicity, only tag attributes "from pod" and "to pod" are illustrated in row 1606 in FIG. 16B, but row 1606 would typically also comprise information for tag attributes associated with indexed tags "code" and "env" that are also indexed. As discussed above, each row for the cross-service span pair of FIG. 16A will comprise a unique set of "FROM" and "TO" tag attributes. For example, if the front-end service (e.g., front-end service 1639 in FIG. 16A) makes multiple calls to the product catalog service (e.g., product catalog service 1638 of FIG. 16A), but any of the calls are associated with different values for the "pod" tag from the values shown in row 1606, the information would be recorded in a new row. In other words, each row records a single unique combination of tag attributes and service names. If the value of either the "from pod" or "to pod" tag attribute changes, a new row is created to record the information. Accordingly, there may be multiple rows in the table 1601 for the cross-service call discussed in connection with FIG. 16A, where each row would comprise a unique combination of "FROM" and "TO" tag attributes for a given cross-service span pair.

Each row in the table 1601 comprises a count value for number of requests 1604, errors 1605 and latency 1611. The request metric 1604 is incremented each time the same cross-service call with the same unique set of attributes for a respective row is observed on a trace. The error metric 1605 is incremented each time a request associated with a respective row is observed on a trace that has an error. The latency 1611 metric relates to a histogram of the duration that a respective request took. Furthermore, each row comprises a timestamp 1603 to record the time of the cross-service call.

Using the metrics associated with the requests 1604, errors 1605 and latency 1611 and the timestamp 1603, aggregations on the rows may be performed quickly and efficiently to determine SLIs for varying ranges of time as discussed in connection with FIGS. 6 to 12. In response to a user query, the numeric rows in the tables 1600 and 1601 may be summed into either time series buckets or into a single number depending on the query.

In an implementation, the metric events modality may maintain a separate memory-resident table 1600 titled "Node Health" in system memory associated with the service nodes in the application. Each row in the memory-resident table 1601 comprises a unique combination of service names and associated tags. For example, row 1608 is associated with the front-end service (e.g., service 1639 in FIG. 16A) and comprises corresponding tag values for "env," "pod" and "code." Similarly, row 1607 is associated with the product catalog service (e.g., product catalog service 1638 of FIG. 16A) and comprises corresponding tag values for "env," "pod" and "code."

Each unique combination of service name and corresponding tag values is associated with metrics that are maintained in the memory-resident table 1600, e.g., request, error and latency (as discussed in connection with table 1601). These metrics may be used to perform fast and efficient aggregations. For example, if the user queried the number of times "env=prod" in the application, assuming the two example services illustrated in table 1600 are the only ones where "env=prod," the request counts in each row would be aggregated to provide a result of two.

Note that the memory-resident table 1600 may also comprise a "root cause" metric 1609, which tracks the number of times the corresponding service was the root cause of an error. For example, the "root cause" metric may be aggregated using the memory-resident table 1600 across multiple rows to determine the number of times each given service in an application was the root cause for an error.

In an implementation, a software tool may be employed to perform faster aggregations across the rows of tables 1600 and 1601. For example, Apache Druid, which is an open-source data store designed for sub-second queries on real-time and historical data, may be used to perform the aggregations rapidly and efficiently. In other implementations, other tools may also be used to perform aggregations. In an implementation, the information in the memory-resident tables 1600 and 1601 may be used in the metric events modality to perform the metrics aggregations for rendering the service graph (e.g., graph 1000 of FIG. 10) and computing the associated SLIs.

In an implementation, the metrics event modality may also store Trace IDs associated for each unique combination of cross-service span pairs and corresponding indexed tags.

In an implementation, the aggregation module 1422 (of FIG. 14) of the monitoring platform aggregates across the cross-service span pairs by maintaining one or more example Trace IDs for each unique set of "FROM" tag attributes (and their corresponding values) to "TO" tag attributes (and their corresponding values) for a cross-service pair. Accordingly, example Trace IDs may be maintained for each unique cross-service call.

The example Trace IDs stored with each unique set of "FROM" and "TO" tag attributes for a cross-service span pair may be used by the querying module 1482 to respond to queries requesting more particularized information pertaining to non-indexed tags associated with the spans. For example, if a user needs particularized information regarding span performance or span duration, the querying module 1482 may be able to use the aggregated rows of information stored in a database associated with the storage module 1466 to access one or more example Trace IDs associated with the call. Using the Trace IDs, the querying module may be able to access the sessionized traces 1408 and perform analytics on the retrieved example traces to deliver the requisite span performance and span duration information. In an implementation, the full trace information may be accessed from a storage set associated with the full-fidelity modality, which stores the entire traces as ingested following sessionization. In another implementation, however, the metric events modality may save full trace information for traces associated with the example Trace IDs in a separate storage from the data set associated with the full-fidelity modality. In an implementation, because the metric events modality allows users to retrieve raw trace data, it also allows users to run an analysis on the retrieved data for an arbitrary set of tags (instead of being limited to the tags pre-indexed by indexing module 1407).

The metric events modality is particularly advantageous in circumstances where the user has identified a problem from the information provided by the metric time series. Having identified a problem either by manual monitoring of RED metrics or through an automatically generated alert, the user may be able to traverse deeper using the metric events data set and access relevant traces to receive more specific information regarding the problem. Also, the metric events mode allows the user to run an arbitrary analysis on the traces, e.g., on a set of tags that has not previously been indexed, which provides the user with specific information that may be used to diagnose and resolve the problem.

FIG. 16C illustrates an example in which data in the metric events modality is persisted using an edge data object comprising a memory-resident table of extracted indexed tag attributes with associated Trace IDs and using a node data object comprising a memory-resident table of extracted tags with associated Trace IDs, in implementations according to the present disclosure. In the example of FIG. 16C, a memory-resident table 1631 created to persist data is associated with the various dependencies in the application. Also, a memory-resident table 1630 created to persist data for the metric events modality is associated with the various service nodes in the application. Note that table 1631 is created in a similar way as table 1601 in FIG. 16B and that table 1630 is created in a similar way as table 1600 of FIG. 16B. Instead of tracking RED metrics, however, the tables in FIG. 16C comprise a column for Trace IDs 1690 and Exemplar Type 1691. In an implementation, memory-resident table 1631 may be maintained in combination with memory-resident table 1601 and memory-resident table 1630 may be maintained in combination with memory-resident table 1600.

Row 1697 in table 1631 is one example row that may be generated for the cross-service span pair of FIG. 16C. Note that for simplicity, only tag attributes "from pod" and "to pod" are illustrated in row 1697 in FIG. 16C, but row 1697 would typically also comprise information for tag attributes associated with indexed tags "code" and "env." As discussed previously, each row for the cross-service span pair of FIG. 16A will comprise a unique set of "FROM" and "TO" tag attributes. Accordingly, there may be multiple rows in table 1631 for the cross-service call discussed in connection with FIG. 16A, where each row would comprise a unique combination of "FROM" and "TO" tag attributes for a given cross-service span pair. Each row in table 1631 comprises a Trace ID column 1690, which keeps track of one or more Trace IDs associated with the unique combination of service names (and operation names) and tag attributes for the given row. In other words, the combination of service names (and operation names) and tag attributes in each row may comprise an index to access the associated Trace IDs.

In an implementation, the Exemplar Type column 1691 tracks the type of example trace associated with the Trace ID. Types of exemplars may be request, error, root cause errors, or some latency bucket identifier. The Trace IDs in each row may be accessed to identify and retrieve the full trace associated with the ID for further analysis, e.g., an analysis on an arbitrary set of tags associated with the trace.

In an implementation, the monitoring system may maintain a separate table 1630 associated with the service nodes in the application. Rows 1695 and 1696 in table 1630 are two example rows that may be generated for the cross-service span pair of FIG. 16A. Each row in table 1630 comprises a unique combination of service and associated tags. For example, row 1695 is associated with the front-end service (e.g., service 1639 in FIG. 16A) and comprises corresponding tag values for "env," "pod" and "code." Similarly, row 1696 is associated with the product catalog service (e.g., product catalog service 1638 of FIG. 16A) and comprises corresponding tag values for "env," "pod" and "code."

Each unique combination of service name and corresponding tag values is associated with a Trace ID and Exemplar type that is maintained in table 1630.

As noted above, in an implementation, metrics event data may be persisted in tables that consolidate the data shown in FIG. 16B and FIG. 16C. For example, table 1601 may comprise an additional column to track Trace IDs, and similarly table 1600 may comprise an additional column to track Trace IDs.

The Trace IDs may be used in metrics events modality to retrieve full traces for more detailed analysis. In an implementation, full traces associated with the example Trace IDs may be maintained in a dedicated storage associated with the metric events. In a different implementation, the full traces may be accessed from a data set associated with the full-fidelity mode.

The metric events modality can comprise higher-cardinality metrics information because a higher number of tags may be indexed for the metric events data set as compared to the dimensions associated with the metric time series. However, the metric time series modality may provide higher-fidelity information because it retains metadata associated with incoming spans (e.g., service name, operation name, count values, etc.) that are not collected in the metric events modality. Further, the metric time series modality also allows users to configure alerts against one of more time series to monitor incoming data in real-time. Because metric events are generated from post-sessionized traces, the metrics data associated with metric events may not be computed as rapidly as compared with the metric time series modality.

4.3 Full-Fidelity Modality

In an implementation, the full-fidelity module 524 of FIG. 5 stores all the incoming trace data from the sessionization process in real time. Unlike the other two modes, the full-fidelity modality stores the trace data in its raw form. In an implementation, the data is stored in parquet-formatted batches of full traces in an unstructured format (e.g., blob storage) along with some metadata. The metadata may comprise the tags associated with the trace (both indexed and unindexed) and other properties such as service name and operation for more efficient querying. In an implementation, the format of the metadata may comprise a map of a service name to a map of tag names, wherein each tag name may be mapped to a list of tag values. The batches of full traces in unstructured format and the metadata are queried in the full-fidelity modality using a robust data engine to search for any tag across the traces. For example, PRESTO is an open source distributed SQL query engine that may execute queries against data sources of varying sizes.

Figure 17:
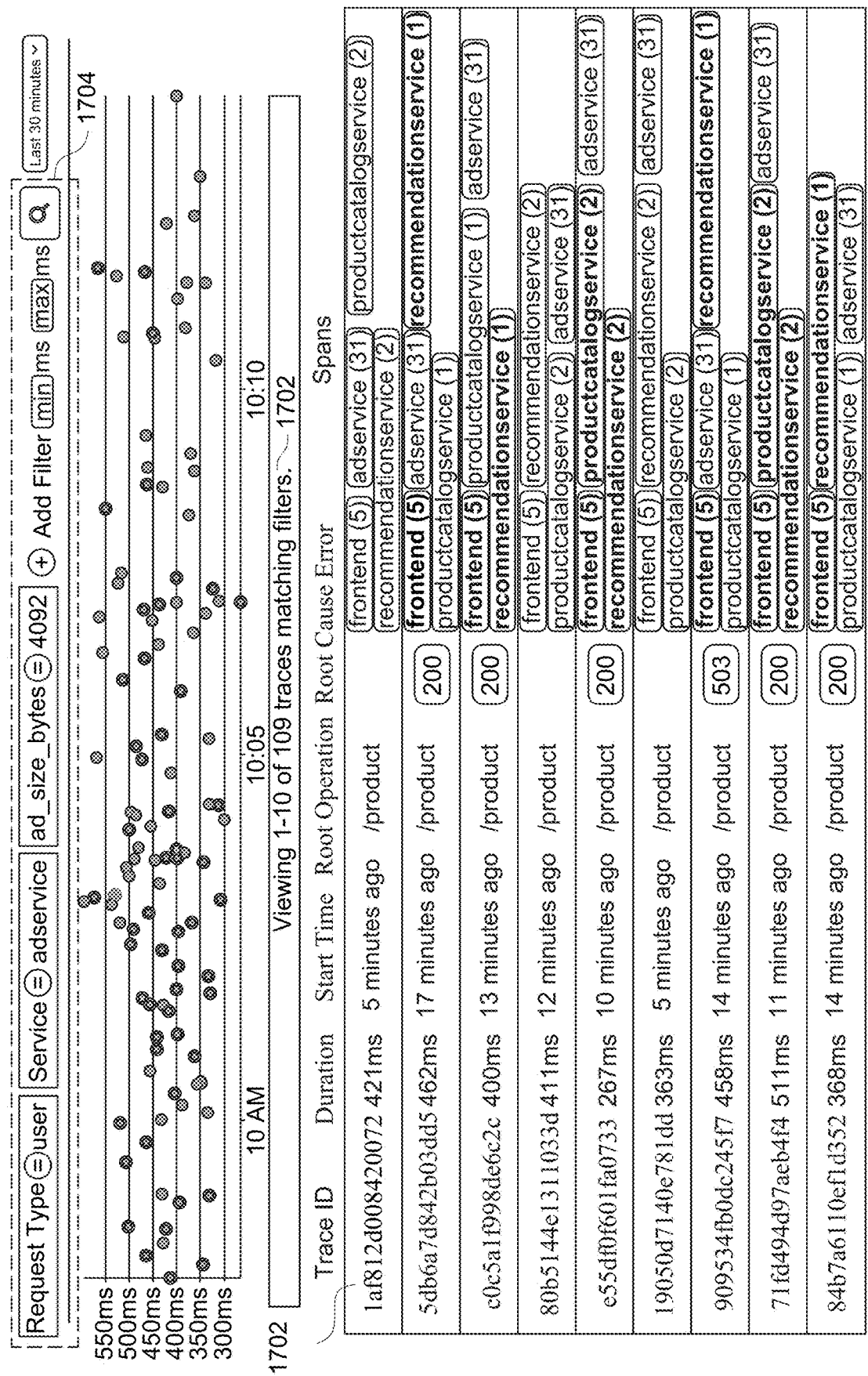
FIG. 17 is an example of an on-screen GUI showing a manner in which a client may submit a query to be executed against the full set of traces stored in connection with the full-fidelity modality, in implementations according to the present disclosure.

FIG. 17 is an example of an on-screen GUI showing a manner in which a client may submit a query to be executed against the full set of traces stored in connection with the full-fidelity modality, in implementations according to the present disclosure. The full-fidelity modality, in an implementation, allows a user to execute a query against arbitrary tags to receive a set of traces that matches the query. For example, in the GUI of FIG. 17, the user enters a query 1704 for traces where "Request Type=user," "Service=adservice" and the tag "ad_size_bytes=4092." In response, the platform returns a list 1702 of the traces matching the user-entered filters and, further, provides information about the traces, e.g., the Trace ID, duration, start time, root operation, root cause error status code and associated spans. As mentioned previously, the traces retrieved in response to a query may be analyzed to determine performance summaries for the spans comprised therein. Alternatively, the span performance analysis can be computed on all the traces stored as part of the full-fidelity data set.

In an implementation, the monitoring platform has the ability to run a full trace search (as shown in FIG. 17), and to feed the traces collected into other modalities of analysis to get more detailed information about an arbitrary set of traces and an arbitrary set of attributes associated with the set of traces.

5.0 Flexible Hierarchies for Collecting, Aggregating, and Presenting Metric Data A client's software or application may include microservices implemented in a microservices-based architecture (see FIG. 1B), and may also include a monolithic application (see FIG. 1A) that performs one or more functions. In a distributed system comprising a large number (e.g., hundreds or thousands) of microservices that may be coupled with a monolithic application, it is beneficial to be able to collect, aggregate, and present (e.g., visualize in a GUI) metrics data for a level higher than the microservice level as well as at a level lower than the microservice level. Levels higher than the microservice level are referred to herein as a "team level" and include a "team" comprising a logical grouping to two or more microservices. Levels lower than the microservice level are referred to herein as a "component level" and can include a "component" comprising a portion (e.g., a function) of a microservice or of the monolithic application, even down to the levels of line of code.

As described further below, teams and components of a client's application can be visualized in an application topology graph (service graph) of a GUI. Also, values of monitored or tracked metrics (e.g., KPIs and SLIs including RED metrics) can be collected for teams and for components of the client's application, and to visualize values of the metrics at those levels in a GUI. Thus, the capability to "zoom" in and out to collect, aggregate, and visualize metrics data at different levels of the client's application is provided.

5.1 Collecting, Aggregating, and Presenting Metric Data at A Team Level

Figure 18:
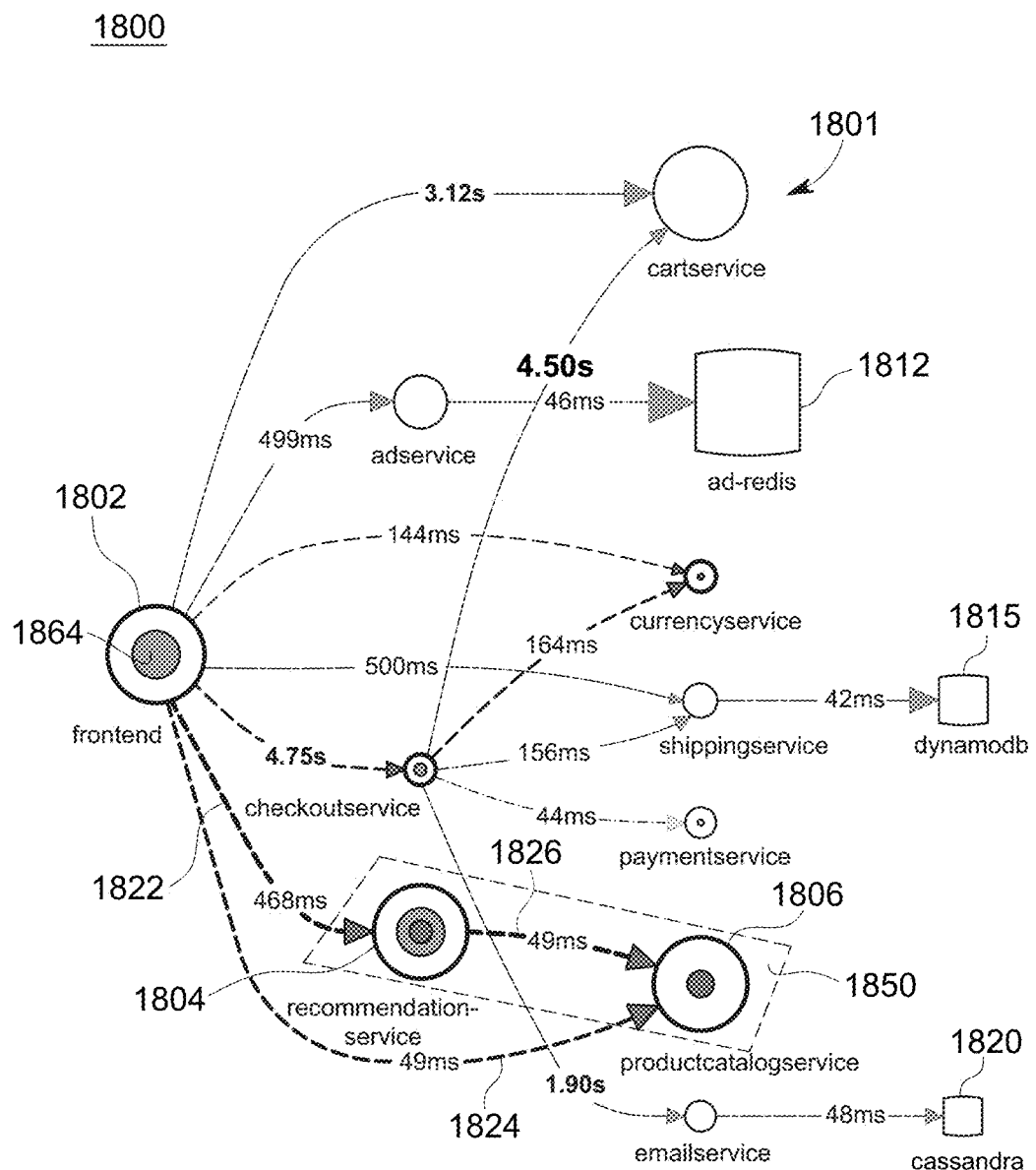
FIG. 18 illustrates an example on-screen GUI comprising a topology graph (service graph) for a microservices-based application, in implementations according to the present disclosure.

FIG. 18 illustrates an example of an on-screen GUI 1800 comprising a topology graph (service graph) 1801 for a microservices-based application, in implementations according to the present disclosure. In this example, the service graph 1801 is an interactive full-context service graph that facilitates visualizing relationships between microservices (e.g., the nodes 1802, 1804 and 1806) comprised within the microservices-based application. In the example of FIG. 18, nodes in the service graph 1801 such as the nodes 1802, 1804, and 1806 represent a single microservice.

In the FIG. 18 example, the service graph 1801 also includes nodes (e.g., the nodes 1812, 1815, and 1820) representing services that are external to the microservices-based application (e.g., that may be comprised within a monolithic application or may be external microservices interacting with the micro-serviced based application); however, external services may not be included in the service graph in other implementations. In an implementation, services (microservices) that are part of a client's application may be represented differently from services that are external to the client's application. For example, circular nodes are used to represent microservices (e.g., the nodes 1802, 1804 and 1806), and squarish nodes (e.g., the nodes 1815, 1820, and 1812) are used to represent services or databases that are external to the client's application.

The service graph 1801 may be generated for the example microservices-based application using the metric time series data as described above with reference to FIG. 7. The service graph 1801 may also be generated using metrics data generated in connection with the metric events modality as described previously herein (e.g., in connection with FIG. 14).

Also as described previously herein, each edge in the service graph 1801 (e.g., the edges 1822, 1824, and 1826) represents a cross-service dependency (or a cross-service call). The directionality of an edge represents a dependency of a calling node on the node that is being called. A span represents each call, and each span has a span ID. Each of the calls passes the Trace ID for the request to the respective microservice being called. Furthermore, each microservice called in the course of serving the request could potentially generate several spans (associated with calls to itself or to other microservices). Each of the spans generated will then carry the Trace ID associated with the request, and spans with the same Trace ID are grouped together to compose a trace.

For example, a request entered by a user may generate a call from the front-end service node 1802 to the recommendation service node 1804, which in turn may generate a call to the product catalog service node 1806. A first span, having a first span ID, represents the first call, and a second span, having a second span ID, represents the second call. As described previously herein, the span includes information (tags) such as (but not limited to) an operation field and a service field, where the operation field may represent the name of the specific operation within a microservice that made the call, and the service field may represent the logical name of the microservice on which the operation took place. As disclosed previously herein, the spans are converted into metrics data streams (using the metric time series data) and transmitted to an analytics engine (e.g., the instrumentation analysis system 322 of FIG. 3) for further processing. KPIs and SLIs can be extracted directly from the metrics data streams (in real-time or in post-processing) and reported to a user. Alternatively, the spans may be ingested by the platform and the SLIs may be computed using the ingested spans as discussed in connection with the metric events modality.

In implementations according to the present disclosure, two or more microservices can be logically grouped to form a team of microservices. For example, the recommendation service node 1804 and the product catalog service node 1806 can be logically grouped to form a team 1850. Consequently, calls to the recommendation service node 1804 and calls to the product catalog service node 1806 are considered to be calls to the team 1850. Any combination of microservices can be defined as a team. Any microservice can be a member of more than one team. Note that this does not mean that a span is associated with more than one team: a span is associated with a microservice and that microservice may be a member of more than one team, but the span itself is not associated with more than one team. See also the discussion of component-level spans further below.

A team can be defined prior to collecting and processing metrics data for the microservices that constitute the team, or a team can be defined subsequent to collecting and processing metrics data for the team's microservices. In other words, metrics data can be collected and processed at the microservices level and then aggregated into team-level data, or metrics data can be collected and processed at the team level. In either case, once a team is defined, the definition of the team (e.g., a team ID and IDs of the microservices in the team) can be stored in computer system memory.

To illustrate the latter case in which metrics data are collected and processed at the team level, a user can define a team 1850 that includes, for example, the recommendation service node 1804 and the product catalog service node 1806. Then, metrics data aggregated in association with the metric events modality (or even the metric time series modality) can be collected, aggregated, and used to compute values for metrics such as KPIs and SLIs for the team 1850. More specifically, in this type of implementation, a team of microservices is identified; spans are ingested; traces are generated based on the ingested spans; and the traces are traversed to generate values of metrics for the team. That is, the traces are traversed to identify spans associated with the microservices in the team 1850 (e.g., a first set of spans associated with the recommendation service node 1804 are identified, and a second set of spans associated with the product catalog service node 1806 are identified), and values of the metrics are determined based on the first and second sets of spans.

In the former case, metrics data aggregated in association with the metric events modality for spans associated with the recommendation service node 1804 for example, and metrics data aggregated in association with the metric events modality for spans associated with the product catalog service node 1806 for example, can be collected, aggregated, and used to compute values for metrics such as KPIs and SLIs separately for each of these microservices. The values of the metrics for the recommendation service node 1804 and the values of the metrics for the product catalog service node 1806 can then be aggregated to determine values of the metrics for the team 1850. More specifically, in this type of implementation, a team of microservices is identified; spans are ingested; traces are generated based on the ingested spans; and the traces are traversed to generate values of metrics for the team. That is, the traces are traversed to identify spans associated with each microservice in the team (e.g., the spans associated with the recommendation service node 1804 are identified, and the spans associated with the product catalog service node 1806 are identified); based on those spans, values of the metrics are determined for each of the microservices in the team (e.g., values for the recommendation service node 1804 are determined, and values for the product catalog service node 1806 are determined); and the values for the metrics for the team are determined by aggregating the values for each of the microservices in the team (e.g., the values for the recommendation service node 1804 and the values for the product catalog service node 1806 are aggregated).

In implementations, the GUI 1800 can be used to define a team. For example, a user can control an on-screen cursor to draw a box around the microservices to be included in the team, illustrated by example using the dashed line in FIG. 18. However, this disclosure is not so limited. User prompts, drop down menus, dialogue boxes, and/or other types of on-screen elements can be incorporated into the GUI 1800 to facilitate the process of defining a team. Also, as mentioned above and as will be discussed further below (starting with the discussion of FIG. 22), microservices and the monolithic application can each be abstracted or logically represented as a collection of two or more components. That discussion includes a description of how a team can be identified using such components.

Figure 19:
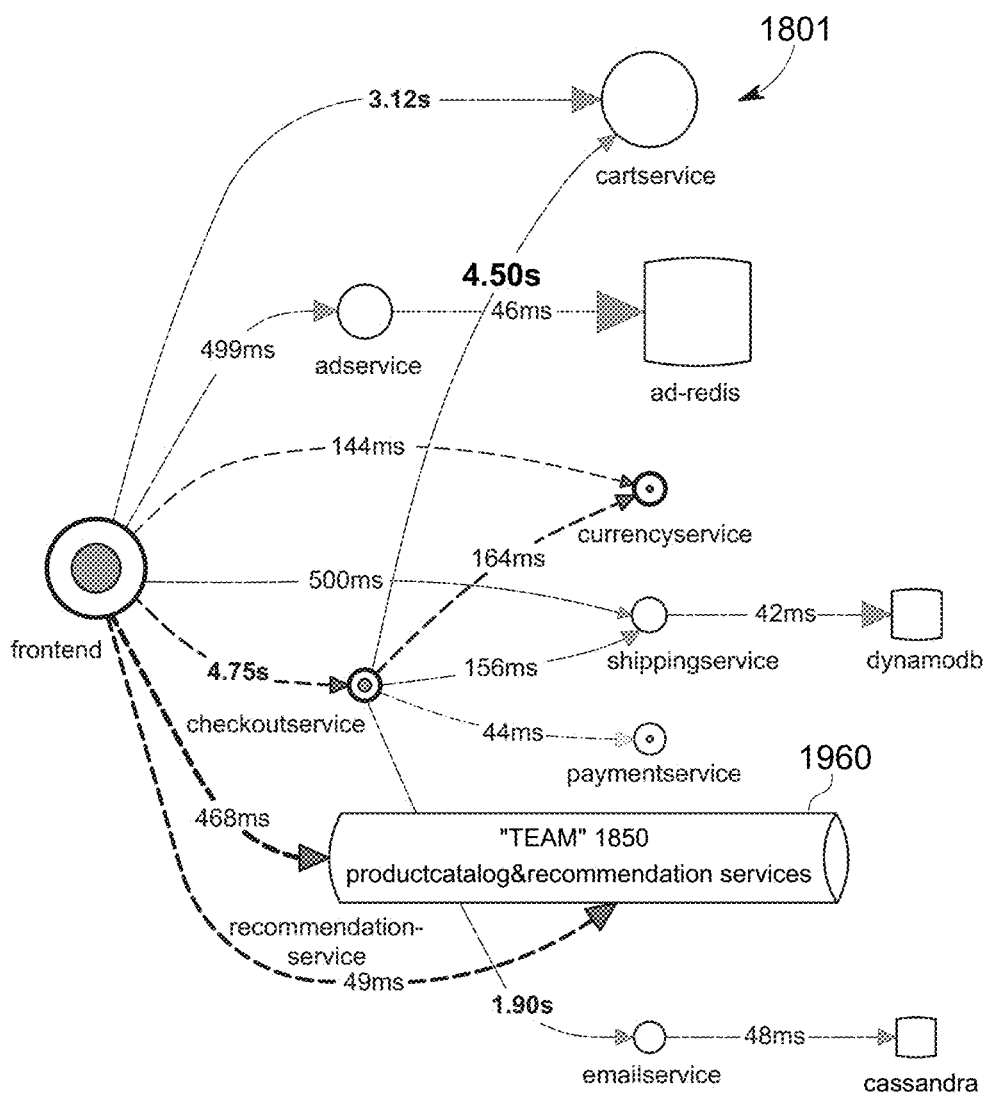
FIG. 19 illustrates another example on-screen GUI comprising a topology graph (service graph) for a microservices-based application, in implementations according to the present disclosure.

Once a team is defined, it can be represented in the GUI 1800 as a single node, as shown in the example of FIG. 19, in which the node 1960 represents the team 1850. In that example, the node 1960 has a shape that is different from the shape of the nodes representing microservices, although this disclosure is not so limited. A team may be identified by a visual representation of varying shapes or sizes. The node 1960 can also be labeled in a way that uniquely identifies the team 1850, similar to the labels used to identify the microservice nodes in the example of FIG. 18.

By performing computations using the metrics data associated with the metric events modality (or even the metric time series modality) at the team level, a service graph that visually indicates critical information regarding each team of microservices in a microservices-based architecture (e.g., the number of requests between services, the number of errors generated by a service, number of errors for which the service was the root cause, etc.) can be rendered. The service graph 1801 provides clients with the ability to visually distinguish between errors that originated at the team 1850 as compared with errors that simply propagated through the team 1850. For example, similar to the examples illustrated in FIGS. 10 and 18, the node 1960 associated with the team 1850 can include a solidly filled region and a partially filled region (not shown in node 1960) that represent, respectively, errors that originated at the team 1850 and errors that propagated through the team 1850 but originated elsewhere.

In implementations, the GUI 1800 comprising service graph 1801 is interactive, thereby allowing access to the metrics values (e.g., SLIs and KPIs) associated with the various nodes and edges within the application by interacting with respective portions of the service graph. Accordingly, in an implementation, a user can "select" the node 1960 (e.g., by hovering a cursor over, clicking on, or using some other well-known means to select a node) to receive and display metrics-related information for the team 1850 through a pop-up window or other interface, as described below with reference to FIG. 20.

Figure 20:
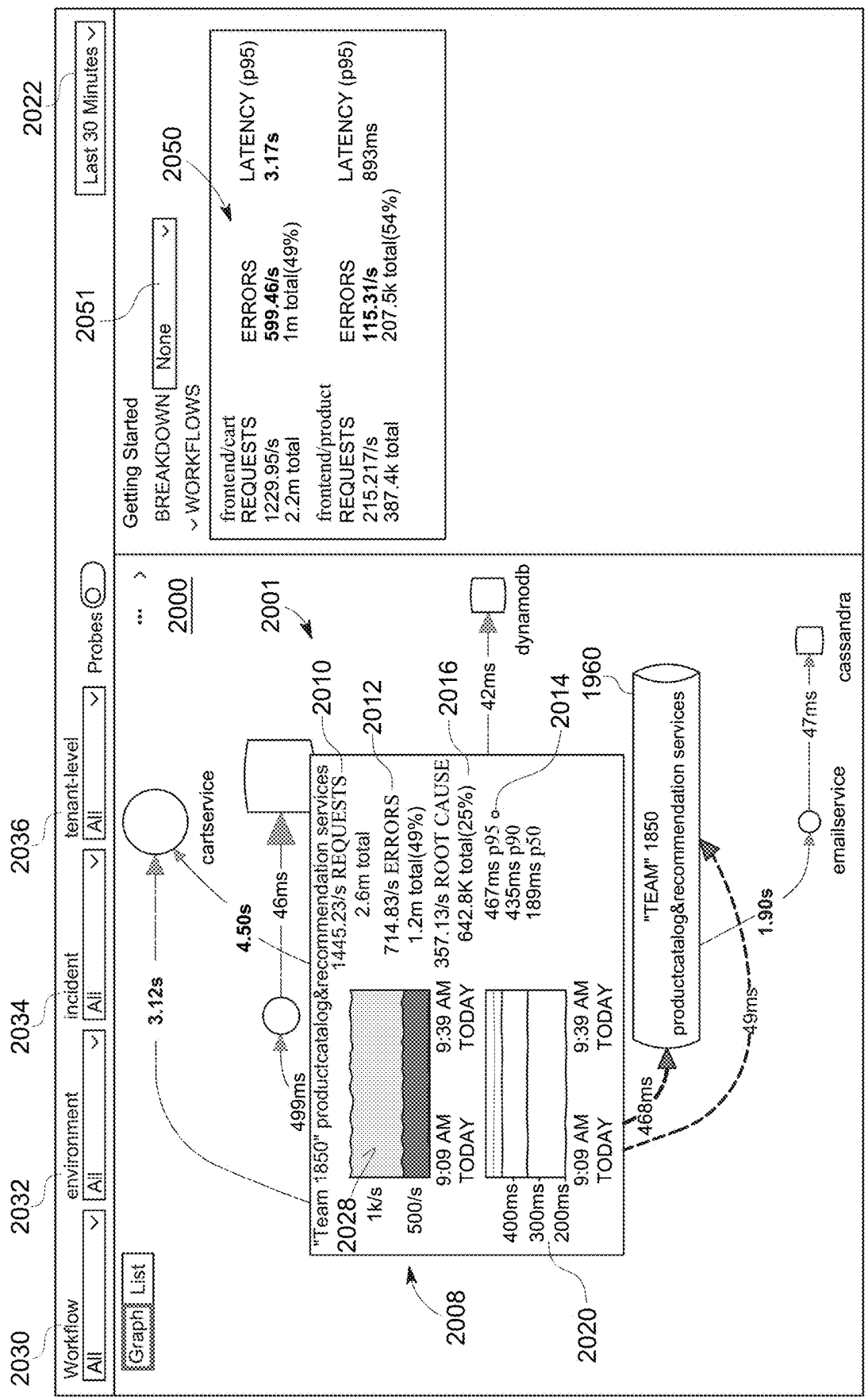
FIG. 20 illustrates an example on-screen GUI showing a manner in which a client may access metrics and their values pertaining to a team of microservices within an interactive topology graph, in implementations according to the present disclosure.

FIG. 20 illustrates an example of an on-screen GUI 2000 showing a manner in which a client may access metrics and their values pertaining to a team of microservices (e.g., the team 1850) within an interactive topology (service) graph 2001, in implementations according to the present disclosure. As shown in the example of FIG. 20, when a user selects the node 1960 associated with the team 1850, a pop-up window 2008 is overlaid on the service graph 2001, comprising team-level SLIs and/or KPIs pertaining to the team 1850. In an implementation, the SLIs/KPIs are aggregated values representing values of metrics at the team level (that is, per team). In this example of FIG. 20, the SLIs/KPIs pertaining to requests 2010, errors 2012, and latency percentiles 2014, and information pertaining to the root cause 2016, are provided for the team 1850.

In an implementation, when a user selects the node 1960, microservice-level SLIs/KPIs representing values of metrics for each microservice in the team (that is, per microservice per team) can also be displayed, as described previously herein (see the discussion of FIG. 10, for example). The microservices-level metrics data can be displayed with the team-level metrics data, or in a separate display. In an implementation, a user can select which level or levels of metrics data to display in the GUI 2000.

The time duration over which the metrics data is calculated may be adjusted using drop-down menu 2022. As indicated by the time axis on hover chart 2028, for this example, a time window of 30 minutes (from 9:09 to 9:39 a.m.) is selected.

In the example of FIG. 20, the pop-up window 2008 also provides information pertaining to values of metrics related to errors 2012 for the team 1850. In this example, the pop-up window 2008 also provides information pertaining to latency percentiles 2014 (e.g., the p95 percentile) for the team 1850 and a graphical representation 2020 of the same.

The root cause information 2016 includes, for example, the number of errors for which the selected team of microservices was the originator, the associated error rate, and the percentage of the total number of requests that represents. In this way, in addition to providing visual cues for identifying root cause error originators at the team level, meaningful and accurate team-level quantitative information is provided, to help clients distinguish between root cause-related errors and errors associated with downstream causes. Accordingly, a modality of analysis that enables a client to gather and measure critical metrics pertaining to the team 1850, including an indication of how many of the errors originated at the team 1850, is provided by implementations according to the present disclosure.

Furthermore, in an implementation, as shown in FIG. 18, the edges within the topology graph (service graph) 1801, including edges that are connected with the team 1850, are annotated with their corresponding latency values. In this way, metrics (e.g., SLI and/or KPI) data from the metrics information aggregated for this modality are efficiently computed, and users are advantageously enabled to gather meaningful and accurate information regarding cross-service dependencies at the team level directly from the service graph 1801.

In an implementation, the metrics data associated with the metric events modality are used to compute accurate metrics values for the team 1850 across multiple dimensions. Furthermore, high dimensionality and high cardinality tags for the metric events modality are supported. In an implementation, the GUI 2000 of FIG. 20 may display one or more attribute categories (or tag categories) that comprise dimensions that may be varied across the service graph 2001. The categories of dimensions across which the SLIs may be computed include, but are not limited to, workflow 2030, environment 2032, incident 2034, and tenant-level 2036. Each of the categories comprises a drop-down menu with options for the different dimensions. The metrics data allow users to easily and rapidly compute measurements for the team 1850 across various cross-combinations of tags or attributes.

In an implementation, the GUI 2000 includes a panel 2050 that may display metrics values across the various workflows that are associated with the team 1850. Furthermore, the GUI 2000 allows users the ability to break down the workflows across multiple different attributes (e.g., attributes related to environment 2032, incident 2034, and tenant-level 2036) using the drop-down menu 2051.

Figure 21:
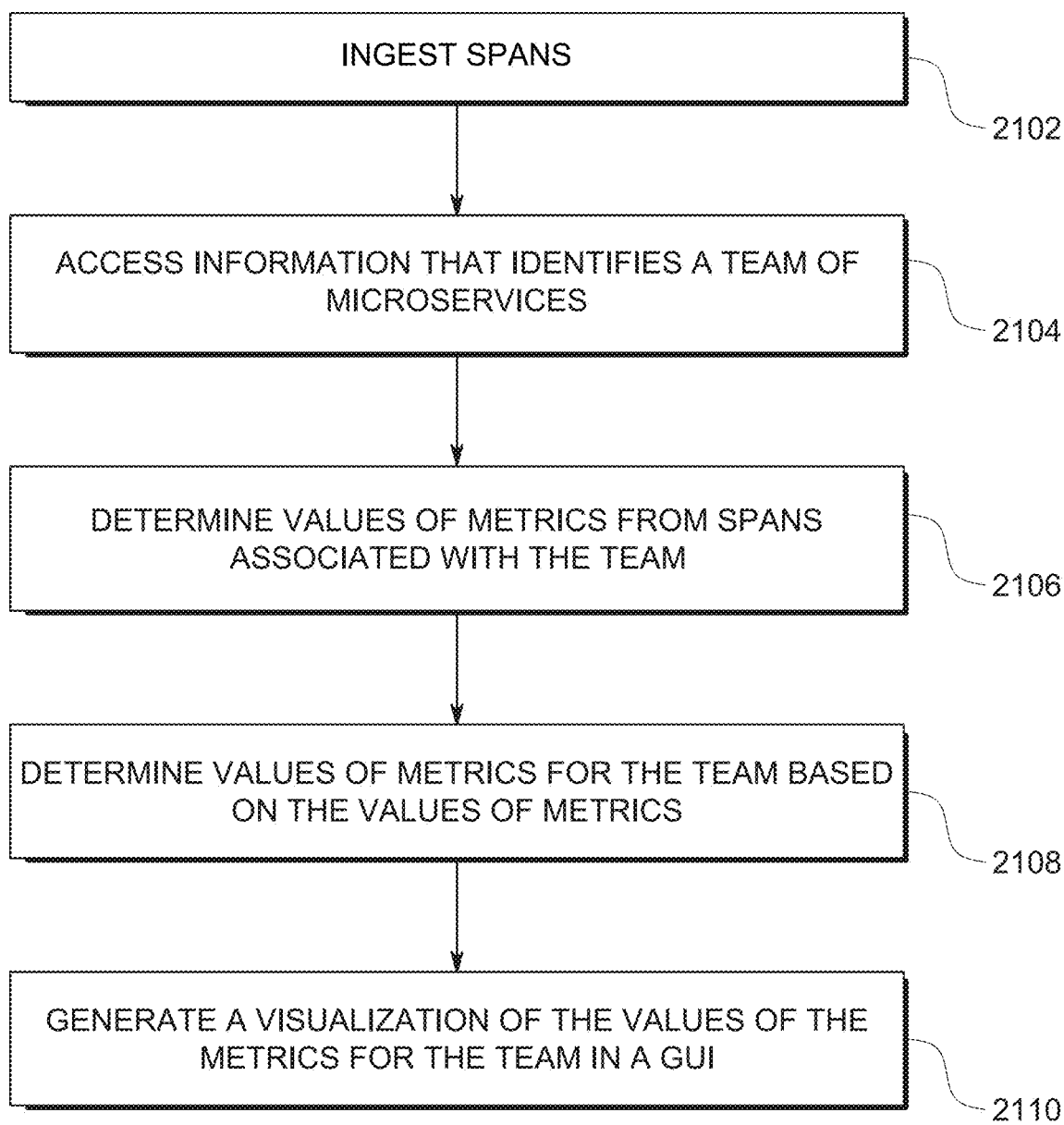
FIG. 21 is a flowchart illustrating a computer-implemented method of generating and presenting metrics data associated with a microservices-based application at a team level, in implementations according to the present disclosure.

FIG. 21 is a flowchart 2100 illustrating an example of a computer-implemented method of generating and presenting metrics data associated with a microservices-based application at a team level, in implementations according to the present disclosure. The flowchart 2100 can be implemented at least in part as computer-executable instructions (computer-readable program code) stored in a non-transitory computer-readable medium and executed in or using one or more processing devices. The operations presented in FIG. 21 are not necessarily performed in the order presented. Also, each operation is not necessarily performed a single time before a subsequent operation is performed; in other words, an operation or a combination of operations may be repeated any number of times before a subsequent operation is performed.

In block 2102, spans associated with microservices of a microservices-based application are ingested. Each of the spans is associated with a respective microservice.

In block 2104, information that identifies a team of microservices, comprising a logical grouping of at least two of the microservices, is accessed.

In block 2106, values of metrics are determined based on spans of the ingested spans that are associated with the team.

In block 2108, values of metrics for the team are determined based on the values of the metrics determined from the spans (block 2106).

In some implementations, span tags associated with each of the spans are analyzed and, from the analysis of the span tags, it can be determined whether or not a span is associated with a microservice that is included in the team.

In some implementations, to determine the values of the metrics for the team, traces are generated based on the ingested spans, and the traces are traversed to generate the values of metrics for the team. In some such implementations, the traces are traversed to identify spans associated with the microservices in the team, and values of the metrics are determined based on the spans associated with the microservices in the team.

In some implementations, as an alternative to or in addition to the implementations just described, the traces are traversed to identify spans associated with each microservice in the team; values of the metrics are determined for each of the microservices in the team; and the values for the metrics for the team are determined by aggregating the values for each of the microservices in the team.

In block 2110, a visualization (e.g., display) of the values of the metrics for the team in a GUI is generated as described above with reference to the examples of FIGS. 18-20.

In implementations, the GUI comprises a topology of the microservices-based application. Each microservice may be represented in the topology by a respective element of the GUI. The team of microservices can be formed in response to a selection (e.g., by a user) of the elements of the GUI that represent the microservices to be included in the team.

In implementations, the team of microservices is represented in the topology by a single element of the GUI. The values of the metrics for the team can be visualized in response to a selection (e.g., by a user) of the element. In some implementations, information that identifies the microservices comprising the team is also displayed in the GUI, and values of the metrics for the microservices comprising the team can also be visualized.

5.2 Collecting, Aggregating, and Presenting Metric Data at A Component Level

Figure 22:
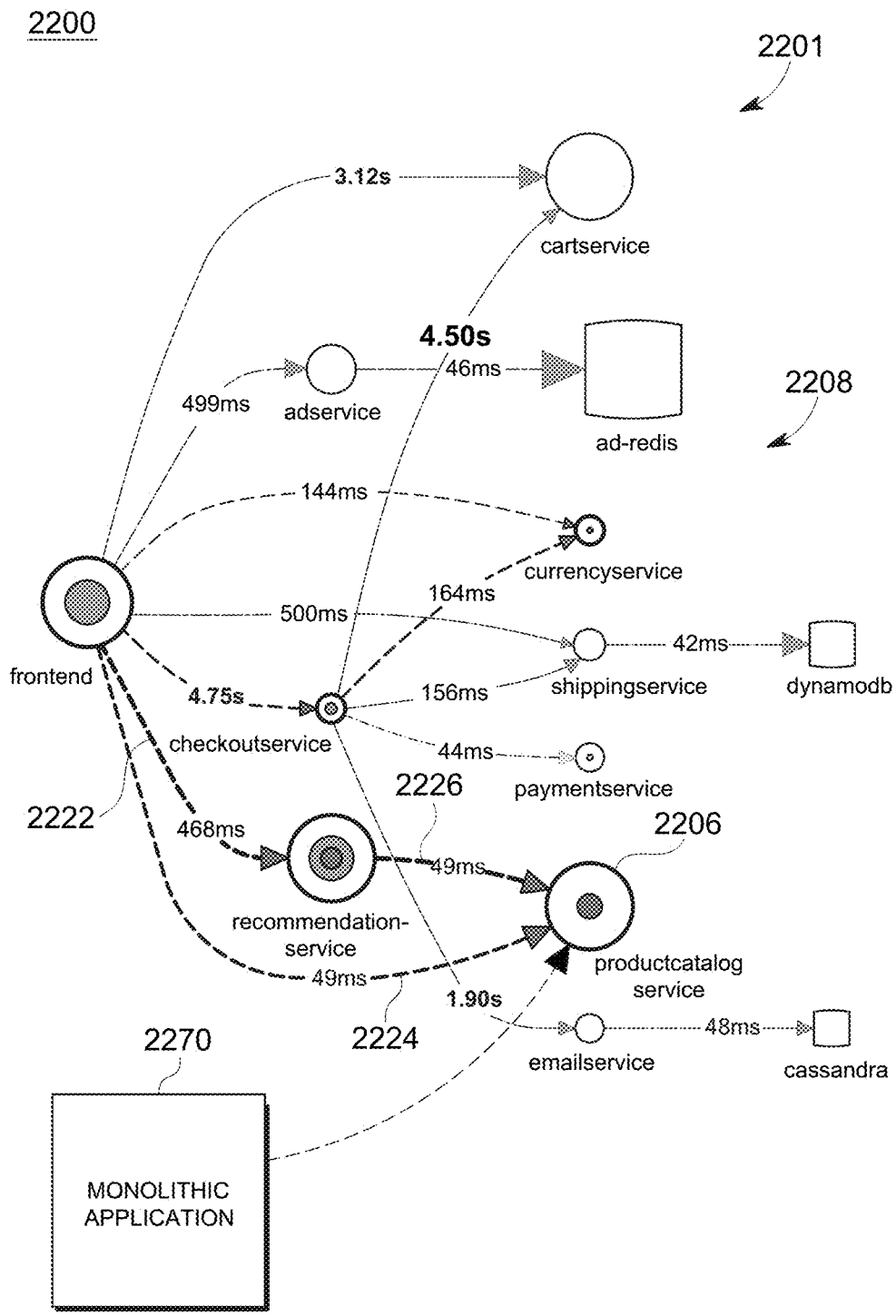
FIG. 22 illustrates an example of an on-screen GUI comprising a topology graph for a monolithic application that interacts with a microservices-based application, in implementations according to the present disclosure.

FIG. 22 illustrates an example of an on-screen GUI 2200 comprising a topology graph (service graph) 2201 that includes a monolithic application 2270 that interacts with (is communicatively coupled to) a microservices-based application 2208, in implementations according to the present disclosure. In the example of FIG. 22, the monolithic application 2270 is shown as interacting only with the product catalog service 2206; however, the monolithic application can interact with any one or more of the microservices of the microservices-based application 2208.

In this example, the service graph 2201 is an interactive full-context service graph that facilitates visualizing relationships between the monolithic application 2270 and one or more of the microservices comprised within the microservices-based application 2208. Microservices are represented as nodes in the service graph (e.g., the node 2206 represents the product service catalog microservice). Generally speaking, the monolithic application 2270 can be considered to be a node in the service graph 2201, and in the discussion below may be referred to or discussed as such.

The service graph 2201 may be generated using the metrics event data as described above with reference to FIG. 14 (in connection with the metric events modality), or using the metric time series data as described above with reference to FIG. 7.

As described previously herein, each edge in the service graph 2201 (e.g., the edges 2222, 2224, and 2226) represents a cross-service dependency (or a cross-service call). The directionality of an edge represents a dependency of a calling node on the node that is being called. A span represents each call, and each span has a span ID.

In implementations according to the present disclosure, microservices (e.g., the product catalog service 2206) and the monolithic application 2270 can each be abstracted or logically represented as a collection of two or more components. The components can be defined in advance based on, for example, the functions they perform (e.g., business logic, customer user interface, etc.) and/or the type of metrics that are to be monitored or tracked.

In implementations, a microservice (e.g., the product catalog service 2206) and the monolithic application 2270 can each be abstracted (logically separated) into discrete components that are defined by a user and instrumented. For example, the product catalog service 2206 could including a listing component and a details component (not shown). These components of a microservice may not be separate services per se but, in some implementations, interactions within the microservice between what is defined to be the listing component and what is defined to be the details component can be observed. As will be described below, a monolithic application can similarly be logically separated into components.

In some implementations, microservices and monolithic applications can be generically instrumented. In such cases, it is possible to define a component, or infer what constitutes a component, in the monolithic application or in a microservice based on, for example, the type of function or level of interaction performed by whatever part of that application and/or microservice is performing that function or interaction. In implementations as described previously herein, a span includes information (tags) such as (but not limited to) an operation field and a service field, where the operation field may represent the name of the specific operation within a node that made the call, and the service field may represent the logical name of the node on which the operation took place. Thus, in those implementations for example, span tags associated with spans generated by the monolithic application or by a microservice may be analyzed to define, either implicitly or explicitly, one or more components in the monolithic application or in the microservice.

In other implementations, more specific (non-generic) instrumentation code may be added to the monolithic application or to the microservice. The non-generic instrumentation contains more specific definitions of the components that can be analyzed by a span ingestion platform (e.g., the instrumentation analysis system 322 of FIG. 3) to identify the various components. In other words, it is possible for a user to define a component in advance and store those definitions in computer system memory. For example, lines of code (contiguous or otherwise), a subroutine or subroutines, or a module or modules in a monolithic application or microservice that perform a certain function can each be identified and defined as a component. Viewed from a different perspective, a function of interest can be identified, and then the lines of code, subroutine(s), or module(s) that are associated with accomplishing that function can be identified as being a component. Furthermore, for example, a component in the monolithic application 2270 can be inferred and defined based on whether the application is interacting at the component level of a microservice: if a microservice is logically separated into components A and B, and the monolithic application only needs to interact with component A as part of a transaction, then that can be treated as a component-level interaction, regardless of whether or not a component in the monolithic application has been explicitly defined.

In implementations disclosed herein, interactions between nodes in the service graph 2201 can therefore be monitored at the component level. There are at least five instrumented use cases that can be monitored at the component level. In one, the monolithic application is logically separated (abstracted) into components but the microservices are not. In a second one, the monolithic application and all or some of the microservices are logically separated into components. In a third one, all of the microservices are logically separated into components but the monolithic application is not. In a fourth, only some of the microservices are logically separated into components but the monolithic application is not. In a fifth, there is only a monolithic application that is logically separated into components (no microservices are included in the client software).

FIGS. 23-29 illustrate examples of each of the above five use cases plus some additional cases, in implementations according to the present disclosure. For simplicity of illustration and discussion, these cases are illustrated with only a relatively small number of components, microservices, and calls. The present disclosure is not limited to the number of components, microservices, and calls included in these examples. In the examples of FIGS. 23-29, a call may occur in either direction. A span represents each call, and each span has a span ID.

Figure 23:
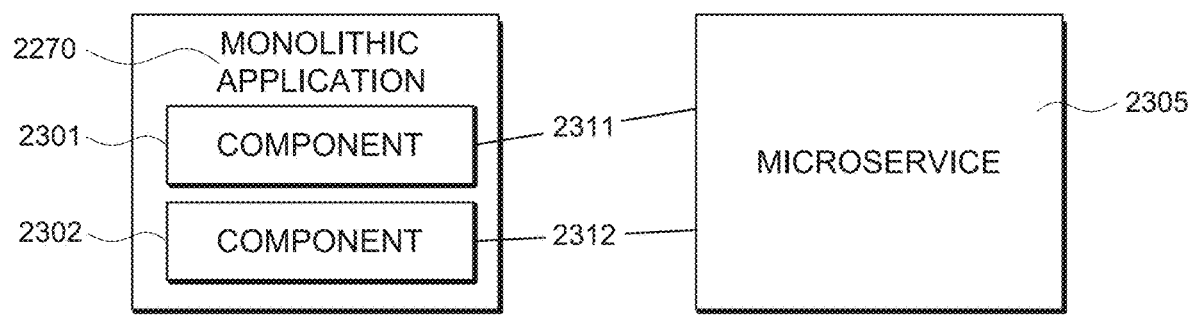
FIGS. 23, 24, 25, 26, 27, 28, and 29 illustrate examples of different types of interactions between components in a service graph, in implementations according to the present disclosure.

FIG. 23 is a block diagram illustrating an example of the first use case, in which the monolithic application 2270 is logically separated into components but the microservices are not. In this example, the monolithic application 2270 includes two components 2301 and 2302, and there is a single microservice 2305. A call between the component 2301 and the microservice 2305 can be represented by the edge 2311, and a call between the component 2302 and the microservice 2305 can be represented by the edge 2312.

Figure 24:
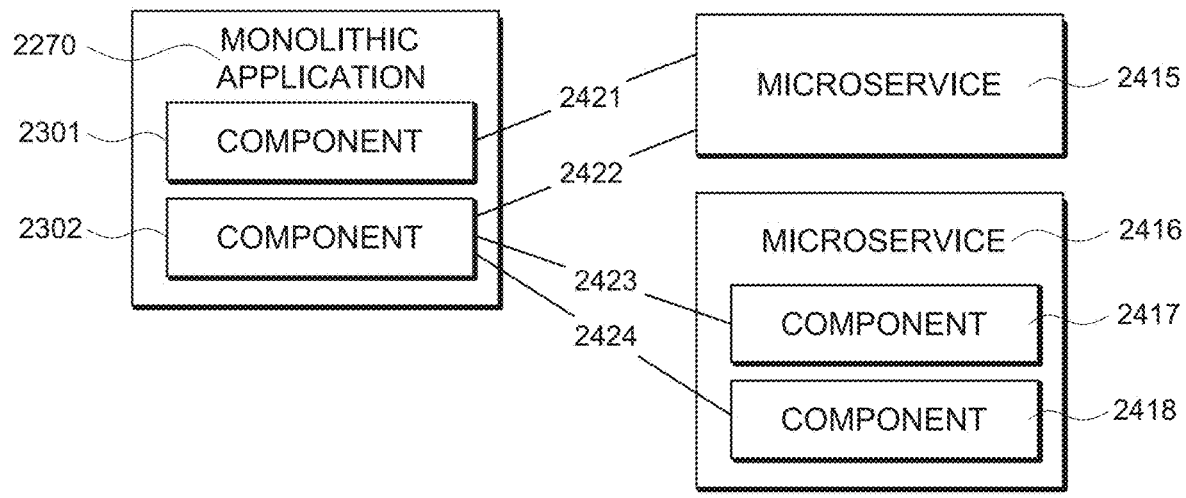

FIG. 24 is a block diagram illustrating an example of the second use case, in which the monolithic application 2270 and all or some of the microservices are logically separated into components. In this example, the monolithic application 2270 includes two components 2301 and 2302 as in the previous example, there is a microservice 2415 that is not logically separated into components, and there is a microservice 2416 that includes the components 2417 and 2418. A call between the component 2301 and the microservice 2415 can be represented by the edge 2421, a call between the component 2302 and the microservice 2415 can be represented by the edge 2422, a call between the component 2302 and the component 2417 can be represented by the edge 2423, and a call between the component 2302 and the component 2418 can be represented by the edge 2424.

Figure 25:
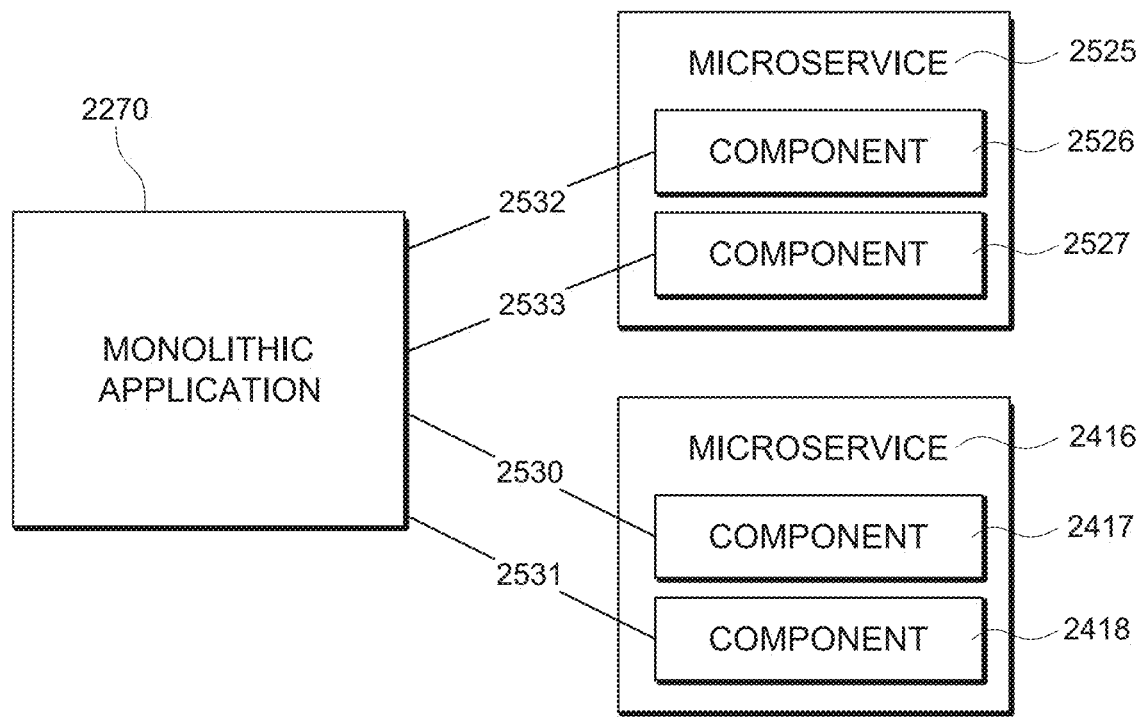

FIG. 25 is a block diagram illustrating an example of the third use case, in which all of the microservices are logically separated into components but the monolithic application 2270 is not. In this example, in addition to the microservice 2416 as in the previous example, there is a microservice 2525 that includes the components 2526 and 2527. A call between the monolithic application 2270 and the component 2417 can be represented by the edge 2530, a call between the monolithic application 2270 and the component 2418 can be represented by the edge 2531, a call between the monolithic application 2270 and the component 2526 can be represented by the edge 2532, and a call between the monolithic application 2270 and the component 2527 can be represented by the edge 2533.

Figure 26:
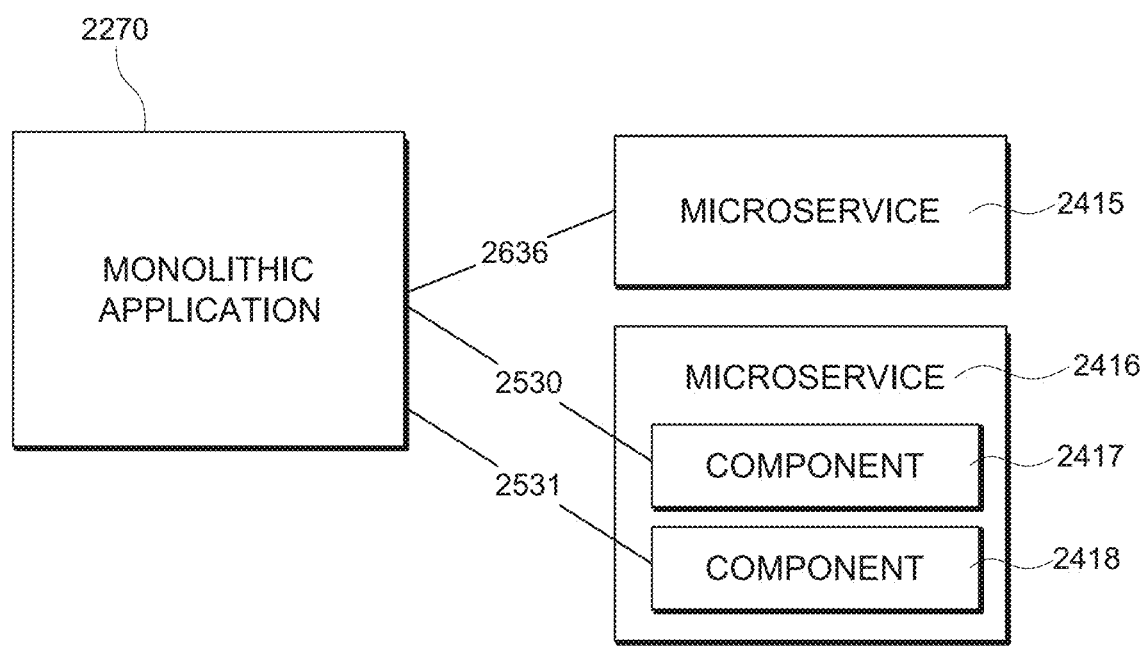

FIG. 26 is a block diagram illustrating an example of the fourth use case, in which only some of the microservices are logically separated into components but the monolithic application 2270 is not. In this example, there is the microservice 2415 that is not logically separated into components as in a previous example, and there is the microservice 2416 that includes components 2417 and 2418 as in a previous example. A call between the monolithic application 2270 and the microservice 2415 can be represented by the edge 2636, a call between the monolithic application 2270 and the component 2417 can be represented by the edge 2530, and a call between the monolithic application 2270 and the component 2418 can be represented by the edge 2531.

Figure 27:
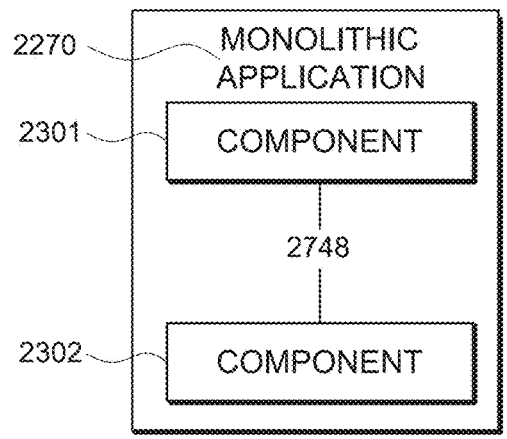

FIG. 27 is a block diagram illustrating an example of the fifth use case, in which there is only the monolithic application 2270 that is logically separated into components (no microservices are included in the client software in this example). In this example, the monolithic application 2270 includes two components 2301 and 2302. A call between the component 2301 and the component 2302 can be represented by the edge 2748.

Figure 28:
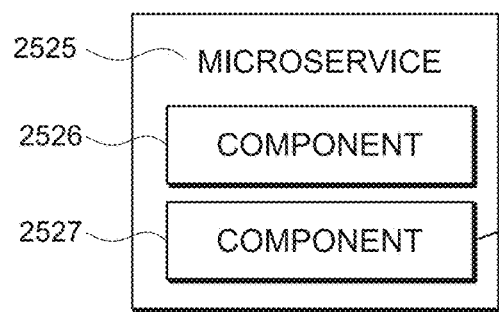
Figure 28:
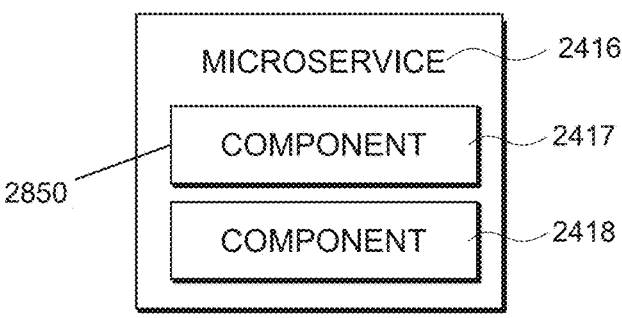

FIG. 28 is a block diagram illustrating an example in which the microservices 2416 and 2525 are logically separated into the components 2417 and 2418 and the components 2526 and 2527, respectively. In this example, calls between the components of the microservices may be made. For example, a call between the component 2417 and the component 2527 can be represented by the edge 2850.

Figure 29:
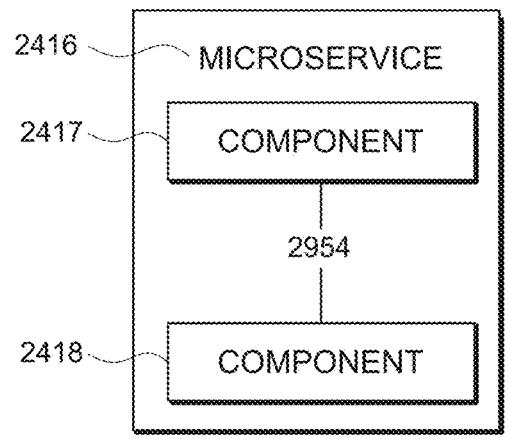

FIG. 29 is a block diagram illustrating an example in which the microservice 2416 is logically separated into the components 2417 and 2418. In this example, calls between the components of the microservice (within the microservice) may be made. For example, a call between the component 2417 and the component 2418 can be represented by the edge 2954.

The component-level spans associated with the examples of FIGS. 23-29 can be used to compute component-level metrics data (using the metric time series data previously disclosed herein) and transmitted to an analytics engine (e.g., the instrumentation analysis system 322 of FIG. 3) for further processing. KPIs and SLIs at the component level can be extracted directly from the metrics data streams (e.g., in real-time) and reported to a user. Alternatively, component-level spans may be used to compute metrics data after the spans have been ingested using the metric events modality. KPIs and SLIs at the component level can be computed using the aggregations made for the metrics events modality discussed above.

Component-level spans can also be used to identify teams of microservices (teams of microservices are discussed above, beginning with the discussion of FIG. 18). In implementations according to the present disclosure, a component-level span is characterized as being associated with a particular component, which is identified as being a part of a particular team. That is, in these implementations, a component-level span is associated with only one component, and each component belongs to a single respective team. As such, the microservice that includes the component can be identified as being a member of that team. Thus, in these implementations, a microservice is not associated with more than one team unless the microservice includes multiple components, and at least one of those components is associated with a team and another one of those components is associated with a different team. Any metrics generated from a component-level span can be attributed to that component and to the microservice and team to which that component belongs: metrics can be collected and aggregated for the component, and also for the microservice and the team comprising the component. If a microservice is not separated into components, then spans associated with the microservice are used directly to determine value of metrics for the microservice and for a team (if any) that includes the microservice, as previously described herein.

Figure 30:
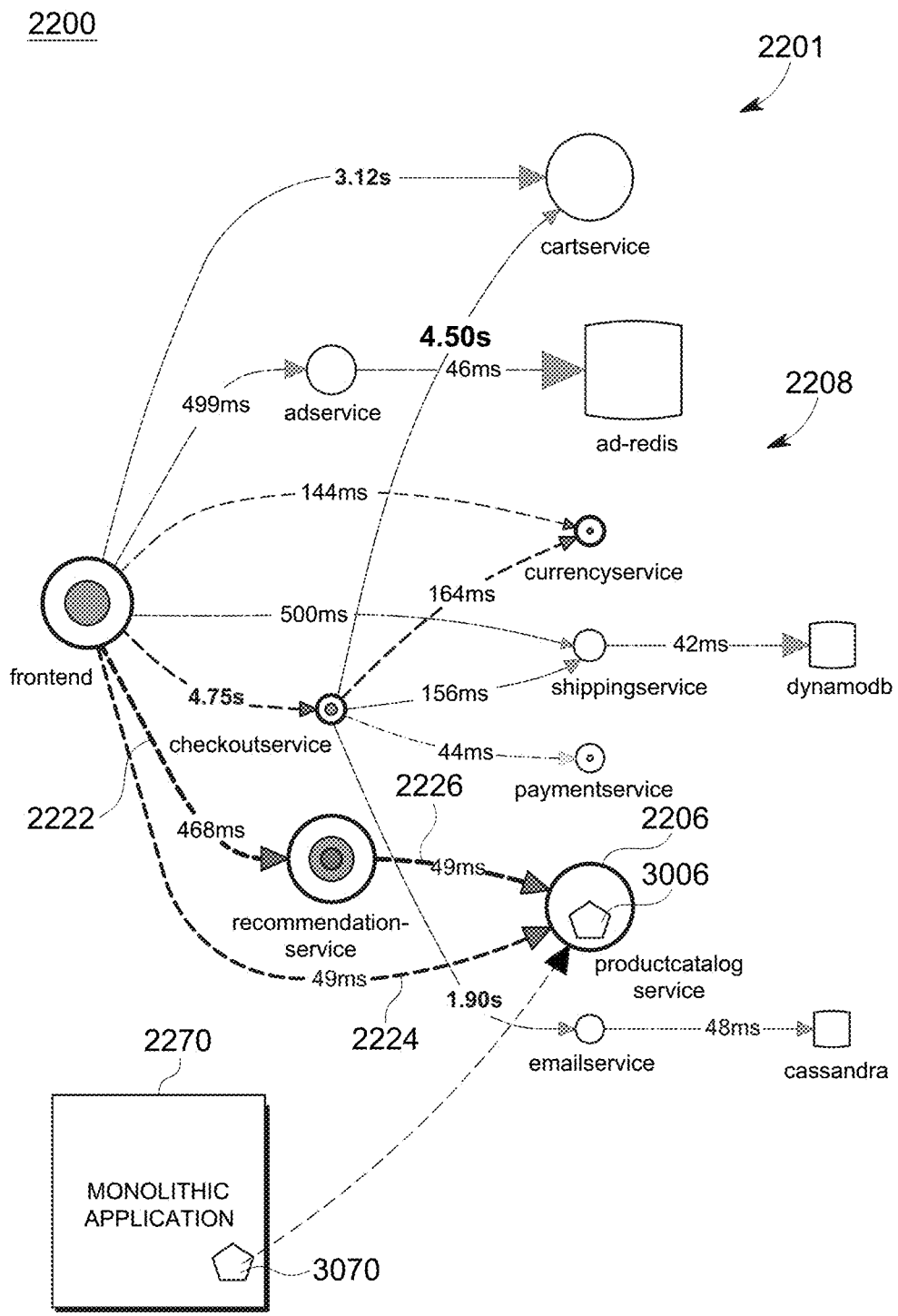
FIG. 30 illustrates an example of an on-screen GUI comprising a topology graph showing component-level nodes in a monolithic application and in a microservices-based application, in implementations according to the present disclosure.

Once a component in the monolithic application 2270 is defined, it can be represented in the GUI 2200 as a single node. FIG. 30 illustrates an example of the on-screen GUI 2200 comprising the topology (service) graph 2201, now showing component-level nodes in a monolithic application and in a microservices-based application in implementations according to the present disclosure. In the example of FIG. 30, the node 3070 represents a component in the monolithic application 2270. Similarly, once a component in a microservice is defined, it can be represented in the GUI 2200 as a single node, also shown in the example of FIG. 30, in which the node 3006 represents a component in the product catalog service 2206. In these examples, the component-level nodes have a shape that is different from the shape of other nodes in the GUI 2200, although this disclosure is not so limited. The component-level nodes can also be labeled in a way that uniquely identifies the associated component, in a manner similar to that used to label microservice nodes in the example of FIG. 22.

By performing computations using the metrics data at the component level, a component-level service graph that visually indicates critical information regarding each component in a microservices-based architecture can be rendered. The component-level service graph provides clients with the ability to visually distinguish between errors that originated at a component as compared with errors that simply propagated through the component. For example, similar to implementations described previously herein, a component-level node can include a solidly filled circular region and a partially filled region, where the solidly filled region represents errors that originated at the component while the partially filled region represents errors that propagated through the component but originated elsewhere.

In implementations, the GUI 2200 comprising a component-level service graph is interactive, thereby allowing access to the metrics values (e.g., SLIs and KPIs) associated with the various nodes and edges within the application by interacting with respective portions of the service graph. Accordingly, in an implementation, a user can select a component-level node to receive and display metrics-related information for that component through a pop-up window or other interface, as described below with reference to FIG. 31.

Figure 31:
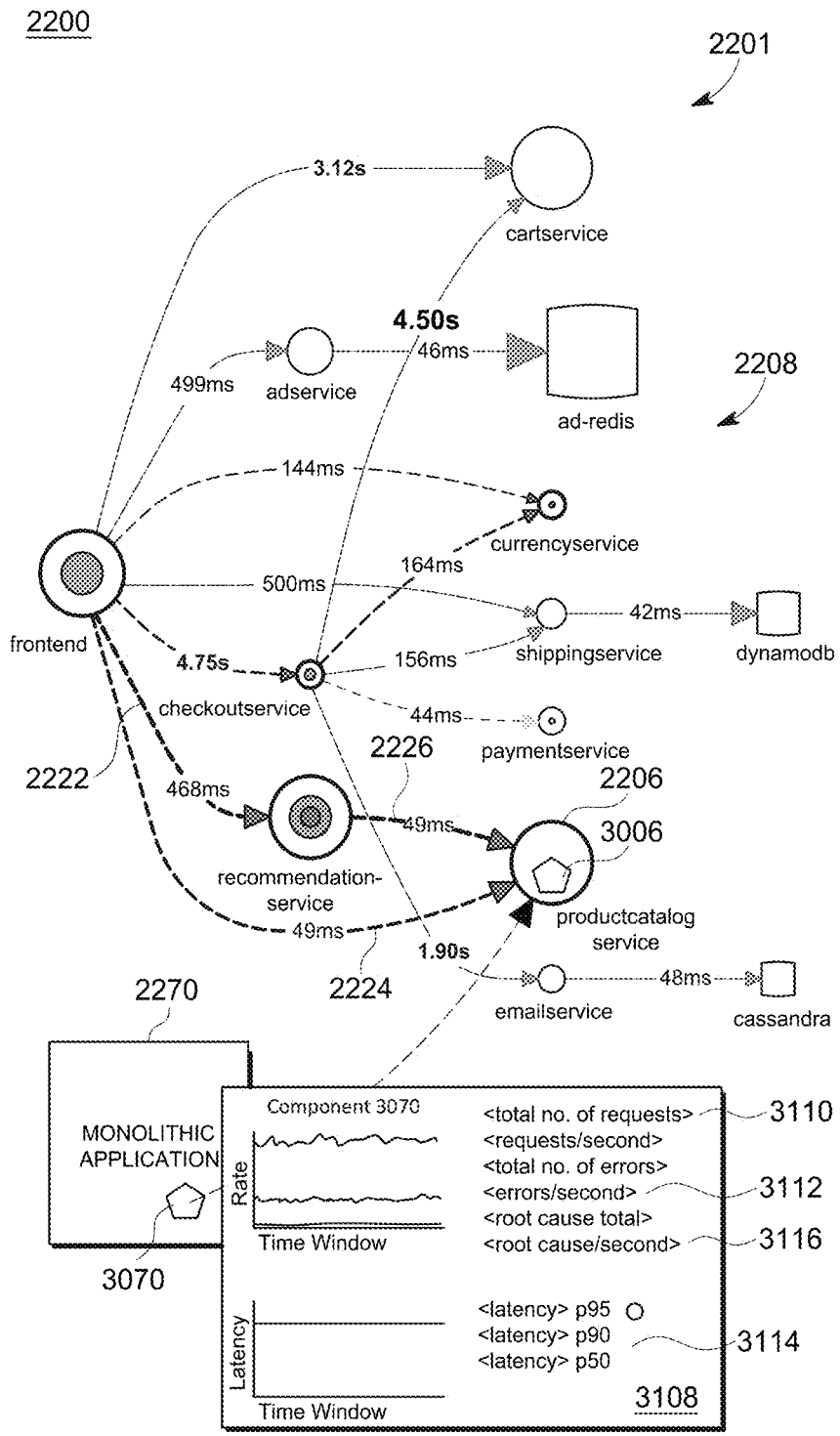
FIG. 31 illustrates an example of an on-screen GUI showing a manner in which a client may access component-level metrics and their values within an interactive topology graph, in implementations according to the present disclosure.

FIG. 31 illustrates an example of the on-screen GUI 2200 showing a manner in which a client may access component-level metrics and their values within an interactive topology (service) graph 2201, in implementations according to the present disclosure. As shown in the example of FIG. 31, when a user selects the node 3070 associated with a component in the monolithic application 2270, a pop-up window 3108 is overlaid on the service graph 2201, comprising team-level SLIs and/or KPIs pertaining to that component. In an implementation, the SLIs/KPIs are aggregated values representing values of metrics at the component level (that is, per component). In this example of FIG. 31, the SLIs/KPIs pertaining to requests 3110, errors 3112, and latency percentiles 3114, and information pertaining to the root cause 3116, are provided for the node 3070. In a similar manner, SLIs/KPIs can be provided for other components including components of a microservice (e.g., the node 3006 represents a component in the product catalog service node 2206).

Different types, categories, workflows, and dimensions of metric values in addition to those included in the example of FIG. 31 can be provided at the component level, and the time duration over which that metrics data is calculated may be adjusted, as previously disclosed herein (e.g., see the discussion of the example of FIG. 20).

Figure 32:
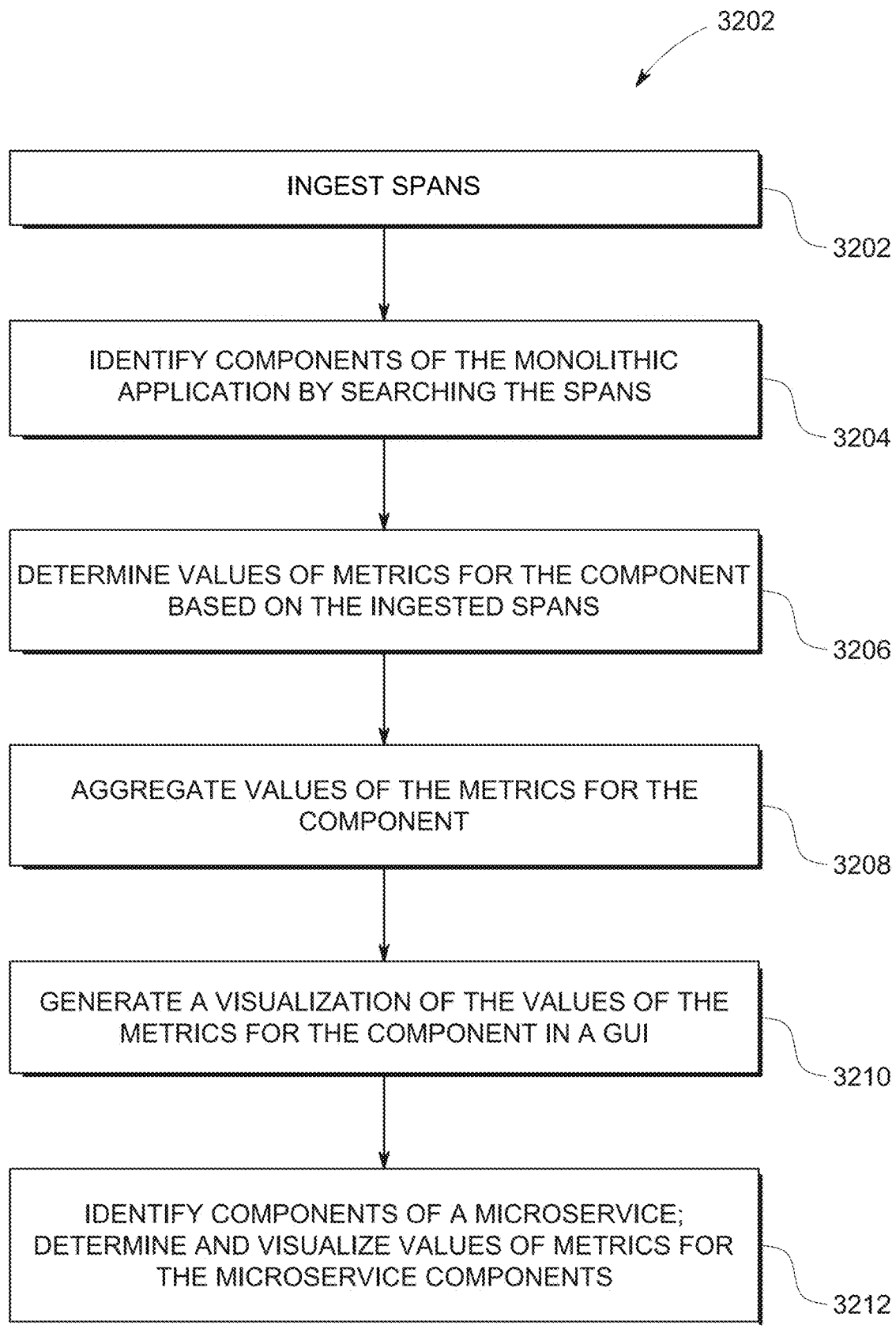
FIG. 32 is a flowchart illustrating an example of a computer-implemented method of generating and presenting metrics data associated with an application at a component level, in implementations according to the present disclosure.

FIG. 32 is a flowchart 3200 illustrating an example of a computer-implemented method of generating and presenting metrics data associated with an application at a component level, in implementations according to the present disclosure. The flowchart 3200 can be implemented at least in part as computer-executable instructions (computer-readable program code) stored in a non-transitory computer-readable medium and executed in or using one or more processing devices. The operations presented in FIG. 32 are not necessarily performed in the order presented. Also, each operation is not necessarily performed a single time before a subsequent operation is performed; in other words, an operation or a combination of operations may be repeated any number of times before a subsequent operation is performed.

In block 3202, spans associated with a monolithic application are ingested.

In block 3204, components of the monolithic application are identified by searching the ingested spans. A component is associated with a respective discrete function performed by the application, and a span is associated with the component. In an implementation, the components are inferred using information in the ingested spans. For example, the ingested spans can be searched to identify a function performed by the monolithic application, and the component can be defined as a logical element that is associated with the function.

In another implementation, the monolithic application includes a codebase with instrumentation, in which case the ingested spans are searched to identify a function performed by the monolithic application; one or more constituents of the codebase that execute when the function is performed are identified based on instrumentation-based information (information that is produced by the instrumentation) included in the spans; and the component is defined as a logical element that comprises the one or more constituents.

In yet another implementation, the monolithic application comprises instrumentation that generates information identifying the components of the monolithic application. In this implementation, spans associated with the components of the monolithic application that are generated when the components execute are ingested, where the spans associated with the components comprise a respective tag including instrumentation-based information that explicitly identifies a component. Then, for each span of the spans associated with the components of the monolithic application, the respective tag is analyzed to identity a component that caused the span to be generated. The information in the tag can be, for example, an identifier for the component or an identifier for a function performed by the component.

In block 3206, values of metrics are determined for the component of the monolithic application based on the ingested spans.

In block 3208, the values of the metrics are aggregated for the component of the monolithic application.

In block 3210, in implementations, a GUI is generated that visualizes (displays) the values of the metrics associated with the component of the monolithic application. The GUI can include a GUI element representing the monolithic application. Components of the monolithic application can be represented as respective GUI elements within the GUI element representing the monolithic application.

In block 3212, in some implementations, information that identifies components of a microservice of a microservices-based application that is coupled to the monolithic application is accessed. Values of metrics of the components of the microservice can then be determined. In these implementations, the GUI further comprises a topology of the microservices-based application, where the microservice is represented in the topology by an element of the GUI. Components of the microservice can be represented as respective GUI elements within the GUI element representing the microservice.

While principles have been described above in connection with the present disclosure, it is to be clearly understood that this description is made only by way of example and not as a limitation on the scope of this disclosure. Further, the foregoing description, for purpose of explanation, has been described with reference to specific implementations and examples. However, the illustrative discussions above are not intended to be exhaustive or to limit this disclosure to the precise forms disclosed. Many modifications and variations are possible in view of the above teachings. The disclosed examples and implementations were chosen and described in order to best explain principles of the present disclosure and its practical applications, to thereby enable others skilled in the art to best utilize this disclosure and its various implementations with various modifications as may be suited to the particular use contemplated.

What is claimed is:

1. A computer-implemented method of generating and presenting metrics data associated with an application comprising a monolithic application coupled to a microservices-based application, the method comprising:
   ingesting a plurality of spans associated with calls between the monolithic application and the microservices-based application;
   identifying a plurality of components within the monolithic application by searching the plurality of spans, wherein each component of the plurality of components is associated with a respective discrete function performed by the monolithic application, and wherein a respective span of the plurality of spans is associated with said each component;
   determining values of metrics for a component of the plurality of components based on the plurality of spans;
   aggregating the values of the metrics; and
   generating, in a graphical user interface (GUI), a visualization of the values of the metrics and a topology of the monolithic application including a visualization of the component.

2. The method of claim 1, wherein identifying the plurality of components of the monolithic application includes inferring the plurality of components using information in the plurality of spans.

3. The method of claim 1, wherein identifying the plurality of components of the monolithic application includes inferring the plurality of components using information in the plurality of spans, wherein the inferring comprises:
   identifying a function performed by the monolithic application by searching the plurality of spans; and
   defining a component of the plurality of components as a logical element that is associated with the function.

4. The method of claim 1, wherein the monolithic application comprises a codebase comprising instrumentation, and wherein the method further comprises:
   identifying a function performed by the monolithic application by searching the plurality of spans;
   identifying, based on instrumentation-based information included in the spans, one or more constituents of the codebase that execute when the function is performed; and
   defining a component of the plurality of components as a logical element that comprises the one or more constituents.

5. The method of claim 1, wherein the monolithic application comprises instrumentation, and wherein the method further comprises:
ingesting a plurality of spans comprising spans associated with the plurality of components of the monolithic application that are generated when the plurality of components execute, wherein the spans associated with the plurality of components comprise a respective tag including instrumentation-based information that identifies a component of the plurality of components; and
identifying a component of the plurality of components that caused the span to be generated by analyzing the respective tag of each span of the spans associated with the plurality of components.

6. The method of claim 1, wherein the monolithic application comprises instrumentation, and wherein the method further comprises:
ingesting a plurality of spans comprising spans associated with the plurality of components of the monolithic application that are generated when the plurality of components execute, wherein the spans associated with the plurality of components comprise a respective tag including instrumentation-based information that identifies a component of the plurality of components; and
identifying a component of the plurality of components that caused the span to be generated by analyzing the respective tag of each span of the spans associated with the plurality of components of the monolithic application;
wherein the information comprises an identifier for the component.

7. The method of claim 1, wherein the monolithic application comprises instrumentation, and wherein the method further comprises:
ingesting a plurality of spans comprising spans associated with the plurality of components of the monolithic application that are generated when the plurality of components execute, wherein the spans associated with the plurality of components comprise a respective tag including instrumentation-based information that identifies a component of the plurality of components; and
identifying a component of the plurality of components that caused the span to be generated by analyzing the respective tag of each span of the spans associated with the plurality of components of the monolithic application;
wherein the information comprises an identifier for a function performed by the component.

8. The method of claim 1, further comprising:
accessing information that identifies components of a microservice of the microservices-based application; and
determining values of metrics for the components of the microservice.

9. The method of claim 1, wherein the GUI further comprises a topology of the microservices-based application, wherein a microservice of the microservices-based application is represented in the topology by an element of the GUI, and wherein the method further comprises:
accessing information that identifies components of the microservice; and
generating a visualization of values of the metrics for the components of the microservice in response to receiving information indicating a selection of the element.

10. The method of claim 1, wherein the GUI further comprises a topology of the microservices-based application, and wherein the method further comprises:
generating a representation of a microservice of the microservices-based application in the topology by a first element of the GUI; and
generating a representation of components of the microservice as respective GUI elements within the first element.

11. The method of claim 1, further comprising:
generating a representation of the monolithic application in the topology by a first element of the GUI; and
generating a representation of the plurality of components of the monolithic application as respective GUI elements within the first element.

12. A non-transitory computer-readable medium having computer-readable program code embodied therein for causing a computer system to perform a method of generating and presenting metrics data associated with an application comprising a monolithic application coupled to a microservices-based application, the method comprising:
ingesting a plurality of spans associated with calls between the monolithic application and the microservices-based application;
identifying a plurality of components within the monolithic application by searching the plurality of spans, wherein each component of the plurality of components is associated with a respective discrete function performed by the monolithic application, and wherein a respective span of the plurality of spans is associated with said each component;
determining values of metrics for a component of the plurality of components based on the plurality of spans;
aggregating the values of the metrics; and
generating, in a graphical user interface (GUI), a visualization of the values of the metrics and a topology of the monolithic application including a visualization of the component.

13. The non-transitory computer-readable medium of claim 12, wherein identifying the plurality of components of the monolithic application includes inferring the plurality of components using information in the plurality of spans.

14. The non-transitory computer-readable medium of claim 12, wherein the monolithic application comprises a codebase comprising instrumentation, and wherein the method further comprises:
identifying a function performed by the monolithic application by searching the plurality of spans;
identifying, based on instrumentation-based information included in the spans, one or more constituents of the codebase that execute when the function is performed; and
defining a component of the plurality of components as a logical element that comprises the one or more constituents.

15. The non-transitory computer-readable medium of claim 12, wherein the monolithic application comprises instrumentation, and wherein the method further comprises:
ingesting a plurality of spans comprising spans associated with the plurality of components of the monolithic application that are generated when the plurality of components execute, wherein the spans associated with the plurality of components comprise a respective tag including instrumentation-based information that identifies a component of the plurality of components; and
identifying a component of the plurality of components that caused the span to be generated by analyzing the respective tag of each span of the spans associated with the plurality of components.

16. The non-transitory computer-readable medium of claim 12, wherein the method further comprises:
   accessing information that identifies components of a microservice of the microservices-based application; and
   determining values of metrics for the components of the microservice.

17. A system for performing a method of generating and presenting metrics data associated with an application comprising a monolithic application coupled to a microservices-based application, the system comprising:
   a processing device communicatively coupled with a memory and configured to:
      ingest a plurality of spans associated with calls between the monolithic application and the microservices-based application;
      identify a plurality of components within the monolithic application by searching the plurality of spans, wherein each component of the plurality of components is associated with a respective discrete function performed by the monolithic application, and wherein a respective span of the plurality of spans is associated with said each component;
      determine values of metrics for a component of the plurality of components based on the plurality of spans;
      aggregate the values of the metrics; and
      generate, in a graphical user interface (GUI), a visualization of the values of the metrics and a topology of the monolithic application including a visualization of the component.

18. The system of claim 17, wherein the processing device is further configured to infer the plurality of components of the monolithic application using information in the plurality of spans.

19. The system of claim 17, wherein the monolithic application comprises a codebase comprising instrumentation, wherein the processing device is further configured to:
   identify a function performed by the monolithic application by searching the plurality of spans;
   identify, based on instrumentation-based information included in the spans, one or more constituents of the codebase that execute when the function is performed; and
   define a component of the plurality of components as a logical element that comprises the one or more constituents.

20. The system of claim 17, wherein the monolithic application comprises instrumentation, and wherein the processing device is further configured to:
   ingest a plurality of spans comprising spans associated with the plurality of components of the monolithic application that are generated when the plurality of components execute, wherein the spans associated with the plurality of components comprise a respective tag including instrumentation-based information that identifies a component of the plurality of components; and
   identifying a component of the plurality of components that caused the span to be generated by analyzing the respective tag of each span of the spans associated with the plurality of components.

* * * * *